(12) United States Patent
Benson et al.

(10) Patent No.: US 7,072,295 B1
(45) Date of Patent: Jul. 4, 2006

(54) ALLOCATING NETWORK BANDWIDTH

(75) Inventors: Kent D. Benson, Granger, IN (US);
Robert B. Magill, Mishawaka, IN (US); Terry J. Hrabik, South Bend, IN (US); John B. Kenney, Granger, IN (US)

(73) Assignee: Tellabs Operations, Inc., Naperville, IL (US)

( * ) Notice: Subject to any disclaimer, the term of this patent is extended or adjusted under 35 U.S.C. 154(b) by 925 days.

(21) Appl. No.: 09/662,194

(22) Filed: Sep. 14, 2000

Related U.S. Application Data

(60) Provisional application No. 60/154,152, filed on Sep. 15, 1999.

(51) Int. Cl.
*H04J 1/16* (2006.01)

(52) U.S. Cl. .................... 370/230; 370/412

(58) Field of Classification Search ......... 370/229, 370/230, 231, 232, 233, 234, 235, 236, 395.1, 370/395.41, 395.43, 412–418
See application file for complete search history.

(56) References Cited

U.S. PATENT DOCUMENTS

| | | | |
|---|---|---|---|
| 5,463,620 A | | 10/1995 | Sriram .................. 370/60 |
| 6,072,772 A | * | 6/2000 | Charny et al. ............ 370/229 |
| 6,246,687 B1 | * | 6/2001 | Siu ..................... 370/395.71 |
| 6,324,165 B1 | * | 11/2001 | Fan et al. ................ 370/232 |
| 6,359,861 B1 | * | 3/2002 | Sui et al. ................ 370/230 |
| 6,408,005 B1 | * | 6/2002 | Fan et al. ................ 370/412 |
| 6,452,933 B1 | * | 9/2002 | Duffield et al. ............ 370/415 |
| 6,469,982 B1 | * | 10/2002 | Henrion et al. ............ 370/230 |
| 6,515,965 B1 | * | 2/2003 | Hou et al. ................. 370/233 |

FOREIGN PATENT DOCUMENTS

| | | |
|---|---|---|
| EP | 0 680 180 A1 | 11/1995 |
| EP | 0 859 492 A2 | 8/1998 |
| EP | 0 901 301 A2 | 3/1999 |
| EP | 0859 492 A3 | 8/1999 |
| EP | 0 901 301 A3 | 7/2000 |
| WO | WO 97/14240 A | 4/1997 |

OTHER PUBLICATIONS

Tzeng et al, A Generic Weight-Based Network Bandwidth Sharing Policy for ATM ABR Service, IEEE, pp. 1492-1499, 1998.*

Panwar et al, Weighted Max-Min Fair Rate Allocation for Available Bit Rate Service, IEEE, pp. 492-497.*

Prabhakar et al, Multicast Scheduling for Input-queued Switches, IEEE, pp. 855-866, 1997.*

McKeown et al. "A Quantitative Comparison of Scheduling Algorithms for Input-Queued Switches," Proceedings IEEE INFOCOM '96, pp. 296-299, San Francisco, 1996.

(Continued)

*Primary Examiner*—Frank Duong
(74) *Attorney, Agent, or Firm*—Fish & Richardson P.C.

(57) ABSTRACT

In allocating bandwidth to data for transfer through a network device, bandwidth is allocated to committed data traffic based on a guaranteed data transfer rate and a queue size of the network device, and bandwidth is allocated to uncommitted data traffic using a weighted maximum/minimum process. The weighted maximum/minimum process allocates bandwidth to the uncommitted data traffic in proportion to a weight associated with the uncommitted data traffic.

92 Claims, 18 Drawing Sheets

OTHER PUBLICATIONS

McKeown, N. "The iSLIP Scheduling Algorithm for Input-Queued Switches," IEEE/ACM Transactions on Networking, vol. 7, No. 2, pp. 188-201, Apr. 1999.

Charny, A. "Providing QoS Guarantees in Input Buffered Crossbar Switches with Speedup," Ph.D. dissertation, Massachusetts Institute of Technology, Aug., 1998.

Stephens, D. "Implementing Distributed Packet Fair Queueing in a Scalable Switch Architecture," M.S. Thesis, Carnegie-Melon University, 1998.

Hedge et al. "Real-Time Adaptive Bandwidth Allocation for ATM Switches," Proceedings IEEE ICC '99, Vancouver, 1999.

Parekh, A. "A Generalized Processor Sharing Approach to Flow Control in Integrated Services Networks," Ph.D. dissertation, Massachusetts Institute of Technology, Feb. 1992.

Hou, et al. "A Weighted Max-Min Fair Rate Allocation for Available Bit Rate Service," IEEE, 1997, pp. 492-497.

Wallmeier, et al. "Traffic Control in ATM Switches with Large Buffers," ITC Specialists Seminar, NL, Leidschendam, KPN Research, vol. Seminar 9, Nov. 7, 1995, pp. 45-60.

PCT International Search Report, Officer Meurisse, W., Jan. 10, 2001.

* cited by examiner

ALLOCATING NETWORK BANDWIDTH

CLAIM TO PRIORITY

This application claims priority from U.S. Provisional Application No. 60/154,152, entitled "Frame-Based Fair Bandwidth Allocation For Input/Output Buffered Switches", filed on Sep. 15, 1999.

TECHNICAL FIELD

This invention relates to allocating network bandwidth among data flows in a network device.

BACKGROUND

Devices in a network use large switching fabrics capable of supporting traffic with a variety of quality of service (QoS) requirements. A high performance, multiple QoS (MQoS) device achieves high throughput and fair resource allocation while providing control over cell loss and delay for individual flows or groups of flows.

Although many scheduling mechanisms suited for an output buffered switch architecture have been shown to provide MQoS support, the cost and complexity of the output buffered fabric is prohibitive for large switch sizes. The crossbar switch fabric used in input buffered switches scales to terabit per second (Tbps) speeds; however, the scheduling control required to match input and output links over a small time interval (internal cell slot) is complex. While recent reductions in matching process complexity have increased throughput, QoS is still an issue.

A hybrid architecture provides a compromise between a costly output buffered switch fabric and the scheduling complexity and QoS management difficulty associated with the input buffered switch. A hybrid architecture typically contains a small amount memory in the switch fabric/outputs with additional memory at the inputs. The memory is used to buffer data flows passing through the switch.

SUMMARY

A scheduling process is described for an input/output buffered network device, such as a switch, that provides relatively high utilization, rate guarantees, and flow-level fairness. Bandwidth across the switch fabric is allocated to groups of flows over a small fixed interval, or frame. The scheduling processes described herein provide QoS support for switch fabrics containing relatively small buffers and simple First-In First-Out (FIFO) or priority based scheduling.

In general, in one aspect, the invention is directed to allocating bandwidth to data traffic flows for transfer through a network device. This aspect features allocating bandwidth to a committed data traffic flow based on a guaranteed data transfer rate and a queue size of the committed data traffic flow in the network device, and allocating bandwidth to uncommitted data traffic flows using a weighted maximum/minimum process.

This aspect may include one or more of the following. The weighted maximum/minimum process allocates bandwidth to the uncommitted data traffic flows in proportion to weights associated with the uncommitted data traffic flows. The weighted maximum/minimum process increases bandwidth to the uncommitted data traffic flows in accordance with the weights associated with the uncommitted data traffic flows until at least one of the uncommitted data traffic flows reaches a maximum bandwidth allocation. The weighted maximum/minimum process allocates remaining bandwidth to remaining uncommitted data traffic flows based on weights associated with the remaining uncommitted data traffic flows. The bandwidth is data cell slots. The bandwidth is allocated to the data traffic flows in discrete time intervals.

In general, in another aspect, the invention is directed to allocating bandwidth to data flows passing through a network device. Each of the data flows has an associated weight. This aspect of the invention features increasing an amount of bandwidth to the data flows in proportion to the weights of the data flows until one port through the network device reaches a maximum value, freezing the amounts of bandwidth allocated to the data flows in the one port, and increasing the amount of bandwidth to remaining data flows passing through the network device in proportion to the weights of the remaining data flows.

This aspect of the invention may also include increasing the amount of bandwidth to the remaining data flows until another port through the network device reaches a maximum value, freezing the amounts of bandwidth allocated to the data flows in the other port, and increasing the amount of bandwidth to remaining data flows passing through the network device in proportion to the weights of the remaining data flows. One or more of the data flows is assigned a minimum bandwidth and the amount of bandwidth allocated to the one or more data flows is increased relative to the minimum bandwidth. The bandwidth may be allocated to the data flows in discrete time intervals.

In general, in another aspect, the invention is directed to a method of allocating bandwidth to data flows passing through a network device. This aspect of the invention features allocating a predetermined amount of bandwidth to one or more of the data flows, and distributing remaining bandwidth to remaining data flows.

This aspect of the invention may include one or more of the following features. The remaining bandwidth is distributed to the remaining data flows using a weighted maximum/minimum process. The weighted maximum/minimum process includes increasing an amount of bandwidth to the remaining data flows in proportion to weights associated with the remaining data flows until one port through the network device reaches a maximum value. The weighted maximum/minimum process may also include freezing the amounts of bandwidth allocated to the remaining data flows in the one port, and increasing the amount of bandwidth to still remaining data flows passing through the network device in proportion to weights of the still remaining data flows.

In general, in another aspect, the invention is directed to allocating bandwidth to data flows passing through a network device. This aspect features determining a character of the data flows, and allocating bandwidth to the data flows in accordance with the character of the data flows. The bandwidth is allocated to data flows according to which data flows have a highest probability of using the bandwidth. The character of the data flows may include peak cell rate, likelihood of bursts, and/or average cell rate.

In general, in another aspect, the invention is directed to allocating bandwidth to data flows passing through a network device. This aspect features allocating the bandwidth using a weighted maximum/minimum process.

This aspect may include one or more of the following. The weighted maximum/minimum process includes assigning weights to the data flows, and allocating the bandwidth to the data flows according to the weights. Allocating the bandwidth according to the weights includes increasing an amount of bandwidth allocated to each data flow in proportion to a weight assigned to the data flow, and freezing the amount of bandwidth allocated to a data flow when either (i) an input port or an output port of the network device reaches a maximum utilization, or (ii) the data flow reaches a maximum bandwidth.

This aspect may also include increasing an amount of bandwidth to remaining data flows passing through the network device until either (i) another input port or output port of the network device reaches a maximum utilization, or (ii) one of the remaining data flows reaches a maximum bandwidth, freezing an amount of bandwidth allocated to the remaining data flow that has reached a maximum bandwidth or to the remaining data flow passing through an input or output port that has reached a maximum utilization, and increasing the amount of bandwidth to still remaining data flows passing through the network device in proportion to weights associated with the remaining data flows.

This aspect of the invention may also include allocating a predetermined amount of bandwidth to one or more of the data flows, and distributing remaining bandwidth to non-frozen remaining data flows by increasing an amount of bandwidth allocated to each remaining data flow in proportion to a weight assigned to the remaining data flow, and freezing the amount of bandwidth allocated to a remaining data flow when either (i) an input port or an output port of the network device reaches a maximum utilization, or (ii) the remaining data flow reaches a maximum bandwidth.

After all of the data flows passing through the network device are frozen, the remaining bandwidth may be distributed at an output port to data flows passing through the output port. The remaining bandwidth may be distributed in proportion to weights of the data flows passing through the output port and/or according to which data flows have a highest probability of using the bandwidth. The bandwidth is allocated/distributed in discrete time intervals.

In general, in another aspect, the invention is directed to allocating bandwidth to data flows through a network device. This aspect features allocating bandwidth to the data flows using a weighted max/min process. The amount of bandwidth allocated to data flows passing through an input port of the network device is greater than an amount of data that can pass through the input port of the network device.

In general, in another aspect, the invention is directed to allocating bandwidth to data flows passing through a network device. This aspect features allocating bandwidth to data flows passing through input ports of the network device using a weighted max/min process. Allocating the bandwidth includes increasing bandwidth allocated to data flows passing through each input port in proportion to a weight assigned to the data flow passing through the input port, and freezing an amount of bandwidth allocated to a data flow passing through an input port when either (i) the input port reaches a maximum utilization, or (ii) the data flow reaches a maximum bandwidth. This aspect may further include continuing to increase the bandwidth allocated to non-frozen data flows in proportion to weights of the data flows until an amount of bandwidth is frozen at all of the data flows.

In general, in another aspect, the invention is directed to allocating bandwidth to data flows through a network device. This aspect features allocating bandwidth to the data flows passing through output ports of the network device using a weighted max/min process.

This aspect may include one or more of the following features. Allocating the bandwidth includes increasing an amount of bandwidth allocated to data flows passing through each output port in proportion to a weight assigned to a data flow passing through an output port, and freezing the amount of bandwidth allocated to the data flow passing through the output port when either (i) the output port reaches a maximum utilization, or (ii) the data flow reaches a maximum bandwidth. This aspect may also include continuing to increase the amount of bandwidth allocated to non-frozen data flows in proportion to weights of the data flows until the amount of bandwidth allocated to all data flows is frozen.

In this aspect, the amount of bandwidth is allocated to the non-frozen data flows until the bandwidth reaches a predetermined maximum amount. After the amount of bandwidth assigned to all output ports is frozen, the remaining bandwidth is distributed at an output port to data flows passing through the output port. The bandwidth may be distributed in proportion to weights of the data flows and/or according to which data flows have a highest probability of using the bandwidth. The bandwidth is allocated/distributed in discrete time intervals.

This aspect may also include allocating bandwidth to committed data traffic based on a guaranteed data transfer rate. Bandwidth is allocated to the committed data traffic in response to a request for bandwidth such that any request that is greater than, less than, or equal to the guaranteed data transfer rate is granted. The bandwidth is allocated to uncommitted data traffic and, for committed data traffic, bandwidth is allocated based on a guaranteed transfer rate. Remaining bandwidth, not allocated to the committed data traffic, is allocated to the uncommitted data traffic.

In general, in another aspect, the invention is directed to transferring data traffic flows through a network device. This aspect features transferring a committed data traffic flow through the network device using a guaranteed bandwidth, determining an amount of bandwidth that was used during a previous data traffic flow transfer, and allocating bandwidth in the network device to uncommitted data traffic flows based on the amount of bandwidth that was used during the previous data traffic flow transfer. Allocating the bandwidth may include determining a difference between the amount of bandwidth that was used during the previous data traffic flow transfer and an amount of available bandwidth and allocating the difference in bandwidth to the uncommitted data traffic flows.

Other features and advantages of the invention will become apparent from the following description and drawings.

DETAILED DESCRIPTION

In a network, data may enter at certain points and exit at certain points. Assume that a path through the network is set up for each entry/exit pair. Each such path is called a flow. In a packet switched network it may be desirable to prevent some subset of the network links (also called ports or nodes) from being overwhelmed with data. The sums of the rates of data flows passing through these links should be limited to less than or equal to the capacity of the links.

Some switches can be modeled in the foregoing manner. They include hybrid architecture switches having a number of input ports with significant buffering and a number of output ports with very limited buffering. If data is flowing into an output port faster than data is leaving the output port, data will build up in the output port buffer until the buffer overflows and data is lost. The processes described herein determine allowed rates for each data flow in the network to reduce data loss and maintain a predetermined QoS for a network.

Figure 1:
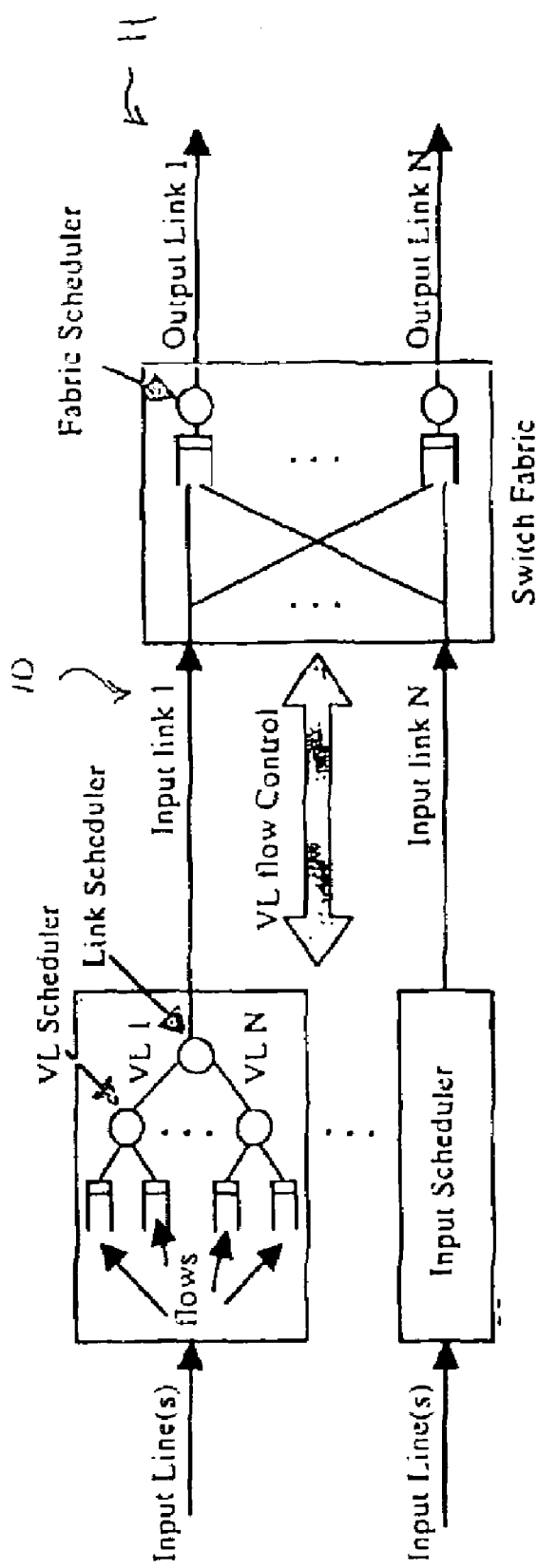
FIG. 1 is a block diagram of a switch.

FIG. 1 illustrates a hybrid switch architecture. In hybrid architectures such as FIG. 1, flow control between the input 10 and output 11 links is used to ensure that the switch fabric memory is not overloaded. Flows originating from the same input and destined to the same output are assigned to one group referred to as a virtual link (VL). The techniques described herein can also be used with connections or sets of connections.

FIG. 1 shows an N×N switch where each input contains N (N≧1) VLs with a scheduling hierarchy that includes one link scheduler, choosing among VLs, and N VL schedulers, choosing among flows in a VL. The present approach to providing MQoS support in a hybrid switch unites flow control and fabric scheduling functions into a rate assignment that is valid for a small fixed time interval, or frame. For every frame, each VL requests some number of cell slots. Cell slots in this case refers to data cells being transferred and corresponds to data flow bandwidth. A Virtual Link Rate Assignment (VLRA) process grants cell slots to VLs according to predetermined delay, throughput and fairness goals. The input schedulers distribute the granted cell slots to individual flows according to their QoS requirements.

Relatively high utilization, fairness and delay guarantees are achieved through the use of guaranteed rates and WFQ techniques. Since the present approach uses small fabric queues, the fabric schedulers can be simple FIFOs or priority queues, while the complexity is shifted to the rate assignment process. By updating the rate assignment over intervals that are longer than one cell slot, communication bandwidth and scheduler complexity are reduced from that required by an input buffered switch. Described below are several VLRA processes.

1.0 Explicit Rate Assignment Process

In an input buffered switch, input and output links are matched based on queue information sent from the inputs. For a simple matching process that does not consider QoS, one bit is used to indicate a backlogged/idle status for the input/output pair. When the number of cell slots per frame, T, is greater than one, more information than a backlogged/idle status is needed. For a frame length of small duration the actual queue size of the virtual links can be used as state information. For longer frame lengths, queue size prediction may be necessary to achieve acceptable delay.

The explicit rate assignment (ERA) process keeps two queue size states per VL: a committed traffic queue state (CBR {Constant Bit Rate}, rt-VBR {RealTime-Variable Bit Rate}, nrt-VBR {Non-RealTime-Variable Bit Rate}, and the minimum rate of ABR {Available Bit Rate} and GFR {Guaranteed Frame Rate}), and an uncommitted traffic queue state (UBR {Unidentified Bit Rate}, ABR and GFR above the minimum rate).

Each VL has a guaranteed rate, measured in cell slots per frame, to support delay and cell loss bounds for its constituent flows. Fractional cell slots are accumulated from frame to frame to support a large variety of rates. The guaranteed rate is large enough for the VL scheduler to give sufficient delay guarantees to real-time traffic and to ensure average rate throughput for non-real-time committed traffic. The ERA process operates in two phases.

1.1 First Phase

In the first phase, the ERA process allocates cell slots to the committed traffic in a request/grant format based on the guaranteed rates and the queue sizes. For the VL between input i and output j ($VL_{ij}$), let $r_{ij}^{guar}$ represent the guaranteed rate for the committed traffic and let $q_{ij}^C[n]$ represent the amount of committed traffic queued at the beginning of update interval n. Let $F_{ij}^C[n]$ represent the fractional cell slots available for committed traffic in interval n. Assuming that $$\sum_{i \text{ or } j} r_{ij}^{guar} \leq T$$

at both the input and output links, the ERA process grants committed traffic cell slots, $r_{ij}^C[n+1]$, for $VL_{ij}$ in interval n+1 by $$r_{ij}^C[n+1] = \min\{Q_{ij}^C[n], r_{ij}^{guar}\} \quad (1)$$

where $Q_{ij}^C[n]$ is the requested number of cell slots. $Q_{ij}^C[n]$ can be defined in many ways. One definition that yields minimal complexity is $Q_{ij}^C[n] = q_{ij}^C[n]$. For better throughput, the committed traffic cell slots for frame n, $r_{ij}^C[n]$, may be subtracted from $q_{ij}^C[n]$ to yield, $Q_{ij}^C[n] = q_{ij}^C[n] - r_{ij}^C[n]$. For even higher throughput with additional computation, $Q_{ij}^C[n]$ may be defined as $Q_{ij}^C[n] = q_{ij}^C[n] - r_{ij}^C[n] - F_{ij}^C[n]$.

1.2 Second Phase

The second phase allocates cell slots by a request/grant format to the uncommitted traffic from the slots that remain after the first phase. Ideally, flow-level fairness and high throughput can be supported within a frame using a weighted maximum-minimum (max/min) approach. Several examples of weighted max/min processes for allocating bandwidth to data flows are described in detail below in section 6 below. The processes described in section 6 may be used in connection with the ERA process or independently thereof.

Weighted max/min processes use a weighted max/min fairness approach to distributing network bandwidth. In this approach each data flow is associated with a weight. A flow's weight is related to the amount of bandwidth it needs. This, in turn, is a function of both a flow's delay and average rate requirements. These weights are used to distribute the bandwidth fairly among the competing flows.

In one weighted max/min process for allocating bandwidth, each VL is granted cell slots in proportion to its weight, $\Phi_{ij}$, until its input link or its output link reaches 100% allocation or until it is granted enough cell slots to serve its uncommitted queue size. VLs meeting one of these conditions are "frozen". The remaining VLs receive additional cell slots until all VLs are frozen.

A VL's weight for uncommitted traffic may be unrelated to its guaranteed rate. The rate should reflect the priority of the currently active uncommitted flows; e.g., the number of such flows in the VL. Thus, the weight provides fairness for uncommitted flows, but is not needed to guarantee delay for real-time traffic. One way to implement this approach involves up to N (N≧1) iterations between input and output links with one input and output link reaching the frozen state on each iteration. This is described in greater detail below in section 6.1.

In practice, realizing a weighted max/min fair allocation for each frame using N iterations may not always be the best solution. Instead, a one iteration request/grant process for each frame may be used.

Briefly, on each input link, excess cell slots are allocated in a weighted fair way until either the link is 100% allocated or all requested cell slots are satisfied. Let $q_{ij}^U[n]$, $F_{ij}^U[n]$, $r_{ij}^U[n]$ and $Q_{ij}^U[n]$ represent the queue size, the fractional cell slots, the allocated rate, and the requested bandwidth, respectively, for the uncommitted traffic of $VL_{ij}$. An expansion factor $x_i$ is defined for input link i such that $$r_{ij}^U(x,n+1) = \min\{\phi_{ij}x, Q_{ij}^U[n]\} \quad (2)$$

Let $$D_i[n+1] = T - \sum_j r_{ij}^C[n+1]$$

represent the leftover bandwidth for input link i. An expansion coefficient $x_i$ is defined for input link i such that when $$\sum_j Q_{ij}^U[n] \geq D_i[n+1],$$

$$D_i[n+1] = \sum_j r_{ij}^U(x_i^*, n+1) \quad (3)$$

Figure 2:
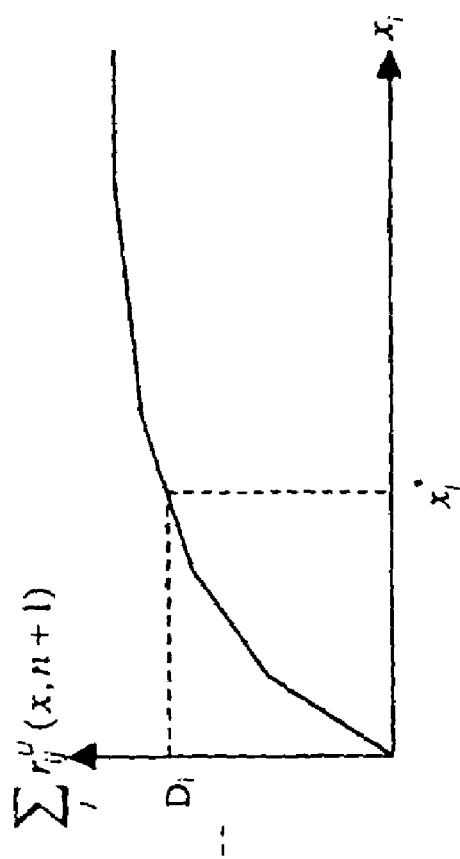
FIG. 2 is a plot showing bandwidth allocation.

Thus, $x_i^*$ represents the minimum expansion factor yielding 100% bandwidth allocation. FIG. 2 illustrates a typical plot of $$\sum_j r_{ij}^U(x, n+1)$$

versus x.

A closed form solution for $x_i^*$ in equation (3) does not exist. A search technique may be used to find the solution. For example, define $$s_{ij}(x) = \begin{cases} \phi_{ij} & x < Q_{ij}^U[n]/\phi_{ij} \\ 0 & \text{otherwise} \end{cases} \quad (4)$$

and $$m_{ij}(x) = \begin{cases} 0 & x < Q_{ij}^U[n]/\phi_{ij} \\ q_{ij}^U[n] & \text{otherwise} \end{cases}, \quad (5)$$

such that $x_i^*$ is the root of gi(x) in the equation $$g_i(x) = D_i - x\sum_j s_{ij}(x) - \sum_j m_{ij}(x). \quad (6)$$

Now, the well-known Newton-Raphson method may be used to iteratively find $x_i^*$ by $$x_i^k = \frac{D - \sum_j m_{ij}(x_i^{k-1})}{\sum_j s_{ij}(x_i^{k-1})} \quad (7)$$

where the process is halted after a fixed number of iterations, such as log(N) iterations.

Figure 3:
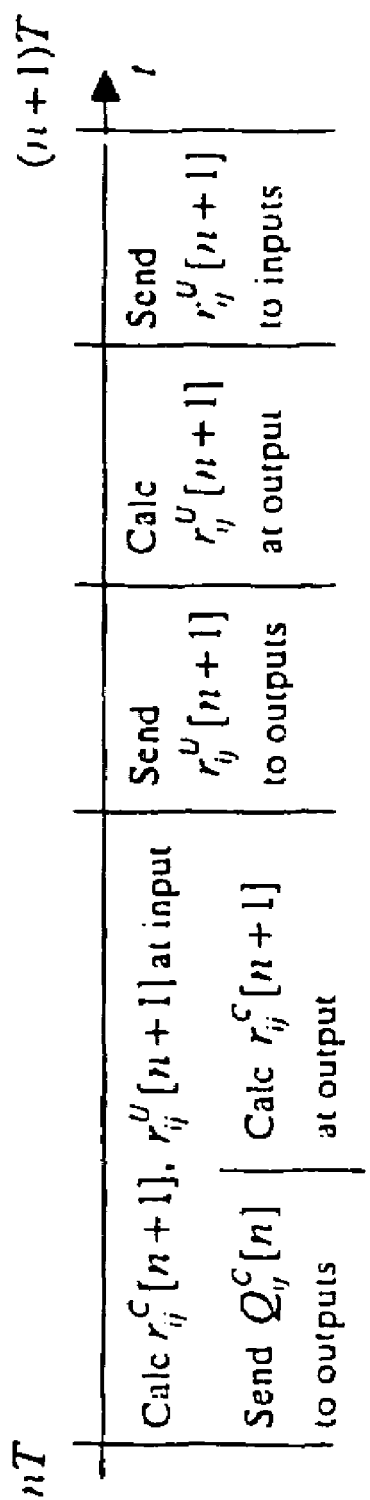
FIG. 3 is a table showing request/grant phases in a bandwidth allocation process.

The uncommitted allocation is given by equation (2) using the $x_i^k$ value obtained in equation (7). The request/grant phases in a frame for a distributed implementation are described with respect to FIG. 3.

First, the committed bandwidth requests, $Q_{ij}^C[n]$, are sent to the output ports (outputs) of the switch. While this information is being sent, the input ports (inputs) perform both the committed and uncommitted bandwidth allocation. The inputs send the resulting uncommitted granted allocations, $r_{ij}^U[n+1]$ to an output. The output uses the $r_{ij}^U[n+1]$ as the requested rates, or, $Q_{ij}^U[n]$ in equations (2) and (5), and sums over the inputs in equation (7) to determine the $x_j^k$ values for the uncommitted bandwidth. The resulting output link granted rates, $r_{ij}^U[n+1]$, are returned to the inputs. Granting of the committed traffic requests is calculated at the input ports, and does not need to be returned by output ports. Thus, the committed and uncommitted granted rates used in frame n+1 are the $r_{ij}^C[n+1]$ values calculated at the input ports and the $r_{ij}^U[n+1]$ values returned by the output ports.

2.0 Fairness Between VLs But Not Flows

The complexity of the uncommitted bandwidth distribution process is a function of N and the number of iterations in equation (7). More than one iteration may not be optimal for small T values or for large N values. To reduce the complexity at the cost of sacrificing fairness between flows, one may weight the uncommitted VLs by their requested rates as described in "Real-Time Adaptive Bandwidth Allocation for ATM Switches", M. Hegde, O. Schmid, H. Saidi, P. Min, Proc. IEEE ICC '99, Vancouver, 1999. This eliminates the piece-wise linear structure of the curve in FIG. 2 and allows equation (3) to simplify to $$r_{ij}^U[n+1] = D_i[n+1] \times \frac{Q_{ij}^U[n]}{\sum_j Q_{ij}^U[n]} \qquad (8)$$

The committed traffic is handled as given in equation (1). If a VL is restricted to requesting no more than T cell slots per frame, it can be shown that, over multiple frames, the VLs receive bandwidth according to equations (2) and (7) with all $\Phi_{ij}$ equal and $Q_{ij}^U[n]$ equal to the VL's average rate expressed in cells/frame. In this sense, fairness is achieved by equally dividing the extra bandwidth among the VLs requesting it. Although fairness is achieved between VLs, it is not achieved between flows because VLs may contain different numbers of constituent flows.

3.0 Reducing Delay for Committed Traffic (Immediate Grant)

Figure 4:
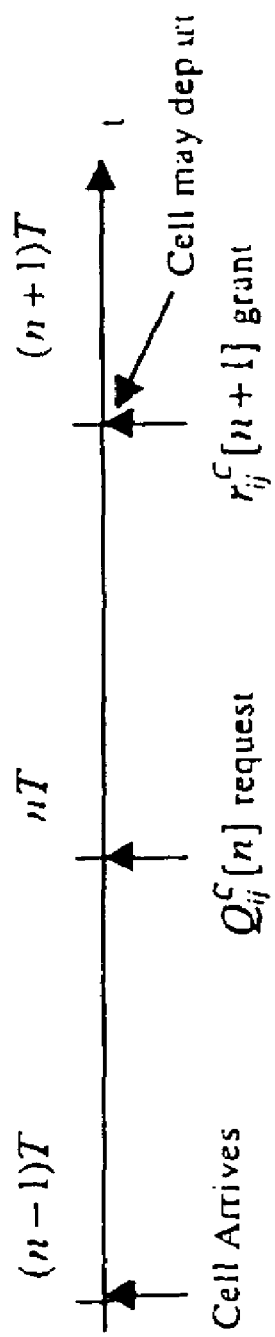
FIG. 4 is a timeline showing cell delay.

Arriving committed traffic may wait as much as 2T before receiving cell slots from the ERA process of section 1.0. FIG. 4 demonstrates this latency. For large T values, it may be desirable to reduce this transition delay. The immediate grant process, explained here, reduces the transition delay by pre-allocating the guaranteed rate to the committed traffic at the expense of larger buffer requirements in the fabric. For the committed traffic, set $r_{ij}^C[n]=r_{ij}^{guar}$ in each frame. Thus, the granted rate for the committed traffic is simply the guaranteed rate, $r_{ij}^{guar}$. For the uncommitted traffic, however, let $Q_{ij}^C[n]$ equal the amount of committed traffic sent in the previous frame rather than the amount requested for the next frame, and use this new $Q_{ij}^C[n]$ to calculate $r_{ij}^C[n+1]$ equation (1) and, thus, $D_i[n+1]$ in the equation $$D_i[n+1] = T - \sum_j r_{ij}^C[n+1].$$

This $D_i[n+1]$ value can be used with the processes of sections 1.2 and 2.0 when calculating the uncommitted bandwidth allocation. By virtue of this process, it is possible for the output links to receive more than T cells in a frame.

The guaranteed rate creates a constant rate channel, with bounded jitter, between an input and output link for the committed traffic. This channel is available whenever committed traffic is backlogged. Thus, with a WFQ VL scheduler, for example, and the appropriate accounting for switch fabric delays, worst case delay guarantees can be made for committed traffic using the techniques presented in "A Generalized Processor Sharing Approach to Flow Control in Integrated Services Networks", A. Parekh, Ph.D. dissertation, Massachusetts Institute of Technology, February 1992.

4.0 Queue Size Requirements in Fabric

Queue sizes in the fabric produced by the processes described in sections 1 and 2.0 are bounded for any input scheduler obeying the allocated cell slots per frame. Assume that, for every frame, a VLRA process fills per-VL token queues with the frame's allocation. In each cell slot, the input scheduler can choose a given VL only if both the cell and token queues are backlogged. In the worst case, the input schedulers send cells such that all T cells for an output link arrive at the end of one frame followed by all T cells for the same output link arriving at the beginning of the next frame. Since only N cells can arrive in a single slot, these arrivals are actually spread out over $2\lceil T/N \rceil$ cell slots. Therefore, because $2\lceil T/N \rceil -1$ departures occur over this interval, the queue depths produced by the worst case input scheduling for the processes in section 2.0 and 3.0 are $$2T-(2\lceil T/N \rceil -1) \qquad (9)$$

In the immediate grant process of section 3.0, the two frame delay shown in FIG. 4 means that the uncommitted rate allocated for the $k^{th}$ update interval is based on the number of committed cells that were sent during the $(k-2)^{nd}$ update interval. In the worst case, when $$\sum_j r_{ij}^{guar} = T,$$

the immediate grant reservation of committed traffic can produce as many as T committed and T uncommitted cells at an output queue during a given update interval. This may occur two update intervals in a row. If 2T cells arrive to the output queue at the end of one interval and 2T cells arrive at the beginning of the next interval, with no more than N cells arriving in the same slot, the worst-case queue depth is given by $$4T-(2\lceil 2T/N \rceil -1) \qquad (10)$$

Notice that the immediate grant process eliminates the 2T delay shown in FIG. 4, but may cause an extra 2T delay in the fabric. Priority queuing in the fabric can eliminate the extra 2T worst-case delay. Decorrelating inputs that send cells to the same output can produce significantly lower worst-case queue bounds, and proper spacing of the cell slots within a frame can reduce burstiness.

5.0 Simulation Results

Simulation results for the processes of sections 1.0 to 4.0 are presented here to indicate their expected performance. Three traffic types, CBR, VBR and UBR are passed through a 16×16 switch with T=128 cell slots. The VBR and UBR sources are bursty with PCR equal to 10 times the average rate and a maximum burst size of 100 cells. For all loads, every input and output link contains ¼ CBR, ¼ VBR and ½ UBR; however, individual VLs contain a variety of traffic mixes. The loading is increased by adding connections according to the traffic percentages. The switch fabric schedulers serve committed traffic with strict priority over uncommitted traffic.

Figure 5:
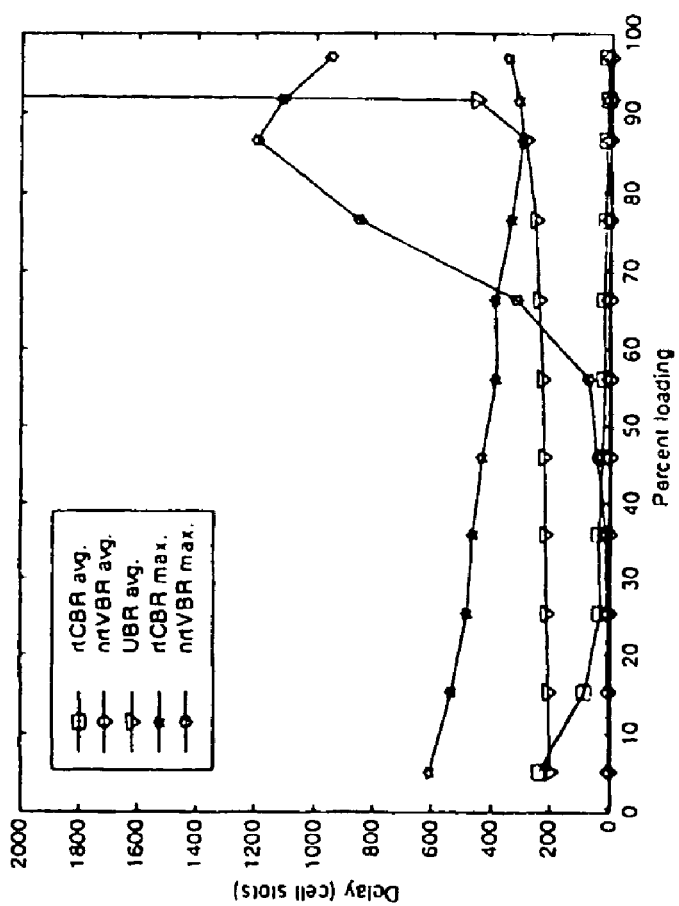
FIG. 5 is a graph showing delays for data traffic types.

FIG. 5 illustrates the average delays for all three traffic types and the worst case delays for CBR and VBR using immediate grant accounting for committed traffic and a one-iteration, weighted fair allocation for uncommitted traffic. CBR is allocated enough bandwidth to allow a WFQ VL scheduler to always deliver a cell within 5 frames (640 cell slots or 113 µs at OC-48). VBR traffic is given a large guaranteed rate, enough to yield a worst case delay guarantee of 1.5 ms at 95% loading on OC-48 links with a WFQ VL scheduler.

As shown in FIG. 5, the CBR and VBR cells are completely isolated from the UBR traffic. The maximum CBR delay decreases as more connections are added (statistical multiplexing gain), while the maximum VBR delay increases due to less guaranteed bandwidth per connection. The unused guaranteed rate is effectively captured and distributed to the UBR traffic. The process produces acceptable average UBR delays at 92% loading for this scenario.

Figure 6:
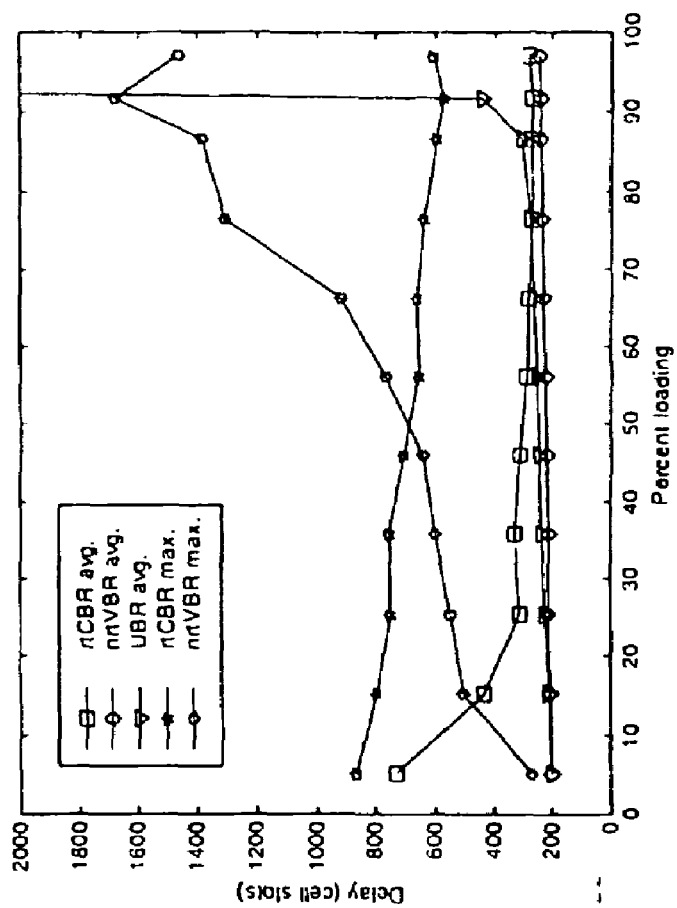
FIG. 6 is a graph showing delays for data traffic types that have received bandwidth allocated according to the request/grant process described herein.

FIG. 6. illustrates the same graphs for the request/grant process for allocating committed traffic using a one-iteration, weighted fair allocation for uncommitted traffic. The worst case CBR delay is approximately 2T (256 cell slots) worse than that of the immediate grant process, and the average delay is 1.5T worse. The UBR performs approximately the same as in FIG. 5, indicating that the advantage of sending extra traffic into the fabric is offset by larger delays from the fabric scheduler. A sixteen-iteration, weighted fair process for the uncommitted traffic was run on the same traffic scenario. No significant difference in average UBR delays occurred until 90% loading. The average UBR delay at 98% loading for the 16-iteration process was 238 µs as compared to 2.4 ms for the 1-iteration process.

For N=16 and T=128, the worst case queue depths given by equations (9) and (10) are 241 and 481, respectively. A round robin link scheduler may be employed with priority of committed traffic over uncommitted traffic. The worst case queue sizes yielded by the simulations were 86 cells for the immediate grant process and 43 cells for the request/grant process of committed bandwidth allocation.

Figure 7:
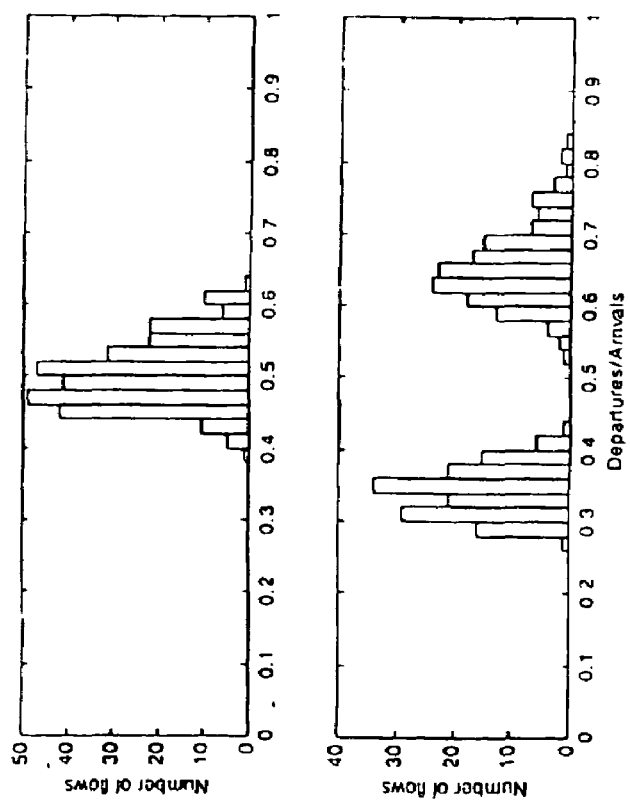
FIG. 7 includes two bar charts that show a per-flow throughput comparison for uncommitted data traffic.

FIG. 7 gives a per-flow throughput comparison for the uncommitted traffic achieved by explicit weights versus weighting by equation (8). We set the sum of the UBR traffic going to one output link at 200% loading with some VLs containing twice as many flows as others. FIG. 7 indicates the ratio of arrivals to departures for each flow. It demonstrates that explicit weights, based on the number of connections, produces approximately fair bandwidth allocation between flows, whereas weighting by desire allows some flows to capture more bandwidth than others. The flows receiving more bandwidth were members of VLs with a smaller number of constituent flows.

6.0 Weighted Min/Max Network Rate Assignment

The following weighted max/min processes assign rates to the various data flows as fairly as possible (e.g., in proportion to their weights), and improve on the "perfect fairness" solution by allowing some connections to transmit data at rates above their "fair" allocation. This increases the network's throughput without reducing the data flows below their "fair" rates. Maximum rates for data flows may also be specified for flows that do not need bandwidth beyond predetermined limits. The sums of the allowed data rates at some of the links are not constrained to the capacity of those links. This gives the links more freedom to choose which flows to service.

These processes prevent data from overwhelming certain links of a packet switched network while increasing the network throughput and satisfying delay QoS commitments. When applied correctly, these processes can be used to prevent queue overflow in a core of a switch or other network device while allowing the throughput of the switch to remain relatively high. If traffic arrives at an output link too quickly, the queue lengths quickly grow beyond the buffer capacity and information is lost. These processes keep the throughput of the system high by dynamically redistributing bandwidth to the data flows that are backlogged. Thus, bandwidth is given to flows that need it, rather than to flows that are idle or need only a small amount of bandwidth. This dynamic redistribution of switch capacity allows the system to more easily meet varying QoS requirements.

To summarize, in the first phase of one weighted max/min process, all flows start with a rate (i.e., bandwidth) of zero. Their rates are slowly increased in proportion to their weights. Thus, a flow with a weight of 0.6 will get twice as much bandwidth as a flow with a weight of 0.3. The increasing continues until one of the links in the network reaches capacity. At this point, the rates of all of the flows passing through the saturated link are frozen.

All of the non-frozen flows can then be proportionally increased again until another link saturates. This pattern continues until all of the flows are frozen by a saturated link. This approach yields the weighted max/min solution to the rate assignment problem. This solution has the property that in order to increase any rate above its max/min rate, the rate of at least one data flow with an equal or lower rate to weight ratio must be decreased.

Thus, the max/min solution is the solution that-maximizes the minimum rate to weight ratios. It should be noted, however, that on some links, the sum of the allocated rates may be less than capacity. This can happen if all of the flows passing through the link are bottlenecked elsewhere.

Because of practical constraints the max/min rates cannot be updated instantaneously when the traffic conditions change. This means that after the rates are determined they must be used for some period of time. Certain variations on the basic process may, therefore, be useful. For instance, depending on the traffic mix, it may be advantageous to give each flow a minimum rate and then give out the extra bandwidth based on the flow weights. Some flows may have a maximum bandwidth requirement. In these cases, a flow would not use any bandwidth beyond this amount. Therefore, the flow is frozen if it reaches its maximum rate. The weighted max/min process can be modified to take these minimum and maximum rates into account.

Weighted max/min concepts are also extended in order to increase the throughput of the network. This extension is based on the observation that, in many cases, the actual traffic patterns in the network differ from the predicted patterns upon which the rate assignments were based. In these situations, it is useful to give the links ranges for each data flow rate. Then, if one flow is not using its bandwidth, the link could give it to another flow. Using this approach, it is possible to overbook some links. If more data is coming in to a link than can be sent out, the traffic is either transmitted or dropped according to well-defined and agreed-upon rules. Some subset of links can be chosen to always have the potential for full utilization but not for overloading. If, after allocating rates using the weighted max/min rules, the links are not fully committed, the extra bandwidth is distributed to the flows passing through the link, even if this causes other links to be overbooked. This serves to maximize the throughput of the network while protecting this subset of links from overflow.

In an input buffered switch, the output ports would not be overloaded while the input ports could be overbooked. This would allow a scheduler at the input port to decide how fast to serve each flow while filling the input port's capacity. Since this scheduler has access to the current make-up of the queued traffic (non-real-time vs. real-time, which flow is bursting, etc.) it can make a more appropriate decision on rates than the original rate assignment. The output ports, however, are protected from overload.

Figure 8:
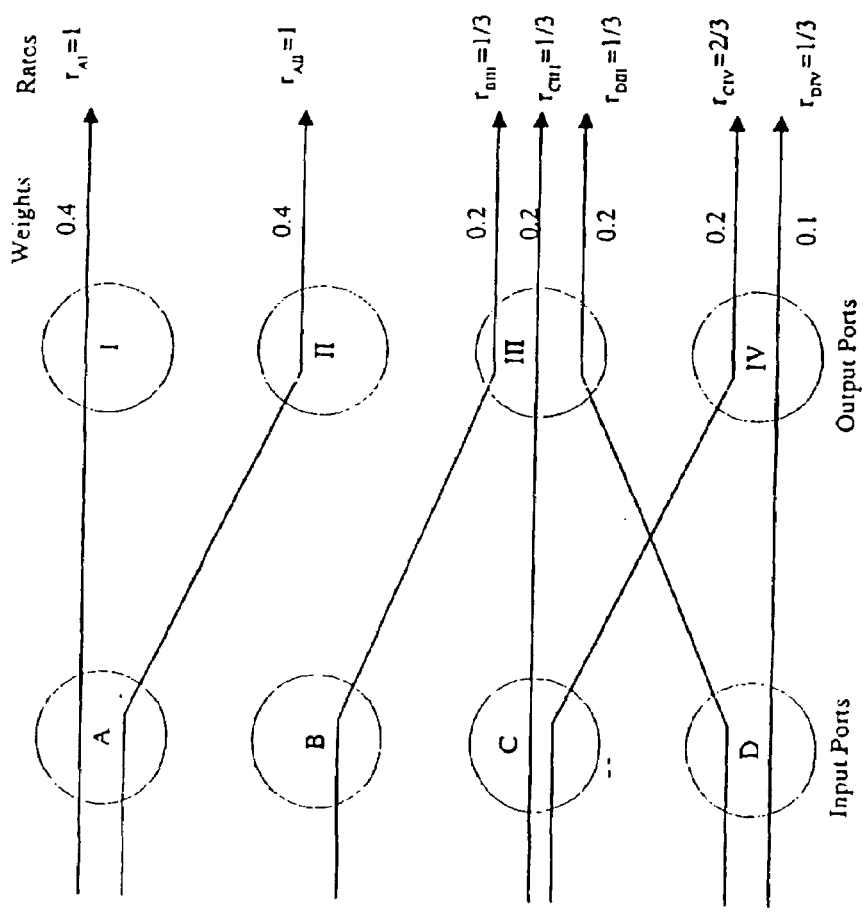
FIGS. 8 to 20 are block diagrams showing switch input/output node/port configurations and data flows passing through the input output nodes/ports.

FIG. 8 shows an example of a switch with max/min fair rates, input port overbooking, and output ports always booked to full capacity. In this example, the capacities of all of the input and output ports are assumed to be unity and none of the flows have an associated minimum or maximum rate. Flows AI and AII both have a weight of 0.4. Under normal max/min fairness each of these flows would have received a rate of 0.5, making the sum of the allowed rate through input port A equal to its capacity. This would leave both output ports I and II underbooked, each with a capacity of 0.5. If the traffic arriving at port A was exclusively headed for port I, it would have to be sent on with a rate of 0.5. With the overbooking shown here, this data could be sent on at a rate of 1, increasing the throughput of the switch.

Port III demonstrates one aspect of max/min fairness. Since port III is the first port to bottleneck, the rates assigned to each flow are proportional to their weights. Since all of their weights are the same, all of the rates are the same. Now examine port C. With $r_{ciii}$ frozen at 1/3, $r_{civ}$ is free to expand up to a maximum of 2/3. Because port IV is not heavily loaded, that happens. Thus, although both flows passing through port C have the same weight, the flow passing through the heavily loaded output port only receives a rate of 1/3 while the flow passing through the less heavily loaded output port receives a rate of 2/3.

6.1 Generalized Processor Sharing

Generalized Processor Sharing (GPS), which is a type of fair queueing, is a service method used to multiplex traffic from a number of sources onto a single line. GPS deals with multiplexers or networks of multiplexers. In some switch architectures, the input and output nodes act as multiplexers, but there is very little buffering before the output nodes. Accordingly, care must be taken to limit the amount of traffic coming to each output node. In fact, it is advantageous to think of the switch as an entire unit rather than as a collection of independent nodes. Some of the ideas of GPS may be used in this process. These are described in the multi-stage (e.g., two stage) GPS section, where Extended GPS (EGPS) is introduced. GPS is referred to herein as single node GPS to differentiate it from multi-stage GPS.

In prior art GPS, rate recalculations are performed instantaneously whenever needed. In the present process, this is not necessarily the case. How often the bandwidth allocations can be re-determined will have an effect on how complicated the bandwidth allocation process is, what information is needed, and how well the system performs.

6.1.1. Single Node (Stage) GPS

Figure 9:
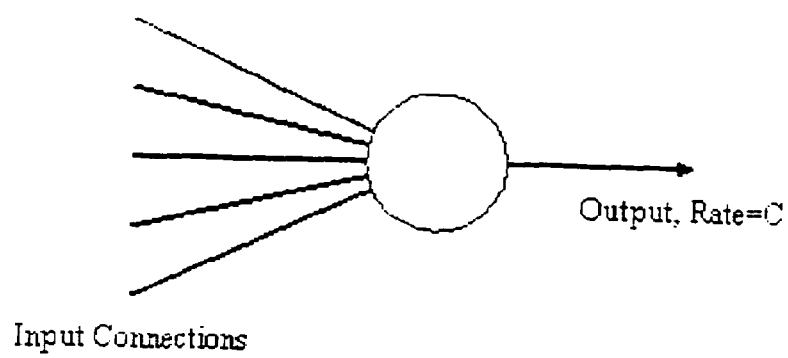

Consider the single node (normal) GPS server shown in FIG. 9. Several connections, each queued separately, are being multiplexed onto a line with a capacity of C. At a given time, a connection may be either idle, if no cells are waiting to be served, or backlogged, if there are one or more cells waiting. Flows that are idle receive no bandwidth, since they have no cells to send. The server's bandwidth is divided between the backlogged flows in proportion to a set of weights. These weights are key to one of the aspects of GPS, its notion of fairness.

Each connection is assigned a weight pi. The GPS notion of fairness is a weighted fair bandwidth distribution between the backlogged connections. If two connections, i and j, are backlogged and are assigned rates $r_i$ and $r_j$ respectively, then the rates are fair if the rates are in proportion to the ratio of their weights. That is, $$\frac{r_i}{r_j} = \frac{\phi_i}{\phi_j}. \tag{11}$$

Equation (11) must hold true for any number of backlogged connections. Any number of rate sets will satisfy this constraint. One set of rates is the set that sums up to the server's capacity. For example, letting B be the set of connections that are backlogged (and therefore will receive non-zero rates), the rate of a connection in B is $$r_i = \frac{\phi_i}{\sum_{j \in B} \phi_j} C = \frac{C}{\sum_{j \in B} \phi_j} \phi_i = b \times \phi_i \tag{12}$$

where $b = C/\sum_{j \in B} \phi_j$ is the expansion factor. Any non-zero rate can be determined as $r_k = b\phi_k$. This satisfies the GPS notion of fairness since $$\frac{r_i}{r_k} = \frac{b\phi_i}{b\phi_k} = \frac{\phi_i}{\phi_k}. \tag{13}$$

This also forces the sum of the rates to be equal to the server capacity. To see this, write $$\sum r_j = \tag{14}$$

$$\sum_{j \in B} r_j + \sum_{j \in B^C} r_j = \sum_{j \in B} b\phi_j + \sum_{j \in B^C} 0 = b\sum_{j \in B} \phi_j = \frac{C}{\sum_{j \in B} \phi_j} \sum_{j \in B} \phi_j = C.$$

Finally, note that the rates are re-determined any time the set B changes, which could be quite often.

One way of thinking about what is happening is to give each backlogged connection a rate $r_i = \epsilon \cdot \phi_i$. By starting $\epsilon$ at zero and slowly increasing its value, the bandwidth assigned to each flow slowly expands. At all times, the bandwidths are GPS fair because each one is proportional to its weight $\phi_i$. $\epsilon$ can be increased until the sum of the rates reaches the capacity of the server. The $\epsilon$ for which $\Sigma r_i = C$ is b.

The next issue is how to calculate the weights, $\phi$. For real-time connections, one way to calculate the weights is to consider the minimum service rate necessary for connection to meet its QoS contract. For instance, if a connection is leaky bucket constrained (maximum burst of $\sigma$, average rate of $\rho$) and all cells need to be served in $\tau$ seconds, the connection needs a minimum rate of $(\sigma/\tau)$ no matter what other traffic may be at the server. In GPS, a connection will receive its smallest rate when every connection is backlogged. Thus, the minimum rate a connection receives is $$r_i^{min} = \frac{\phi_i C}{\sum_{j=1}^{N} \phi_j} \tag{15}$$

where N is the number of connections. By constraining the sum of the weights to be one or less, $$r_i^{min} = \frac{\phi_i C}{\sum_{j=1}^{N} \phi_j} \leq \phi_i C. \tag{16}$$

So, in order to accept the $(N+1)^{th}$ connection, calculate $\phi_{N+1} = (\sigma_{N+1}/\tau_{N+1}C)$. Now, if $$\sum_{j=1}^{N+1} \phi_j \leq 1,$$

the connection can be admitted. Otherwise, the connection should be rejected.

For non-real-time connections the weight $\phi$ is less important. It determines the amount of bandwidth a flow receives during periods when many connections are backlogged. Non-real-time connections can be given little or no bandwidth for short periods of time (when there is delay sensitive traffic to send) as long as they eventually receive enough bandwidth to support their long-term average rates, $\rho$.

As long as the server is not overbooked, that is, as long as $$\sum_{j=1}^{N} \rho_j < 1,$$

every connection will receive enough service to support its long-term average rate. It should be noted that the bandwidth a connection (real-time or non-real-time) receives will not be constant. In fact, to receive 50% of the server's bandwidth, a connection may receive a very small percent of the bandwidth while other traffic is present and then receive 100% of the bandwidth for a period of time. There is no peak rate constraint on the output of the server.

6.1.2. Multi-Stage GPS

6.1.2.1 GPS Fair Rate Allocation

Figure 10:
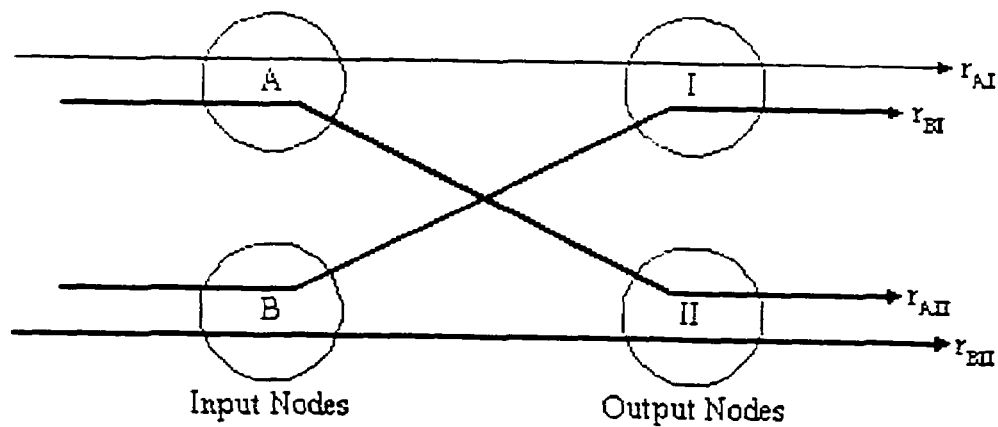

Consider the two input, two output switch shown in FIG. 10. Four data paths or flows exist, AI, AII, BI, and BII with rates $r_{AI}$, $r_{AII}$, $r_{BI}$, and $r_{BII}$ respectively. To assign a set of rates to the flows in a switch, the sums of all of the rates through each of the nodes (input and output) must be less than or equal to the capacity of each of the nodes. That is, for a node Y, the sum of the rates of the flows through Y must be less than the capacity of the node Y. For the switch to be stable, this should true for each node in the switch.

In the architecture of concern here, if cells are arriving at an input node at a rate higher than the rate the flow has been assigned, the cells are queued at the input node. The output nodes are assumed to have minimal queuing, as noted above. This could be an N×N switch.

One problem is how to pick the input and output flow rates for the cells. One way to pick the rates is to extend the ideas of GPS to this two stage model, where "input" is one stage and "output" is the other stage. Assume that each flow has a weight associated with it, $\phi_x$. Note that each flow gets one weight, not a different weight at an input node and another at an output node.

If a node in the switch is "GPS fair" (also called "weighted fair"), then the rates of all of the flows passing through this node are in proportion to the weights of the flows. If all of the rates in a switch are in proportion to the assigned weights, then the entire switch is GPS fair.

With two levels, there should be GPS fairness among all of the flows. This should be true even though many flows do not share a node. Thus, to be GPS fair $r_{AI}/r_{BII} = \phi_{AI}/\phi_{BII}$. To determine the maximum rates that are still GPS fair, the bandwidth assignments of each of the flows are slowly increased as in the single node case. Assign each backlogged flow a rate $r_x = \epsilon \cdot \phi_x$. Starting at zero, slowly increase $\epsilon$. As long as $\Sigma r_x < C_Y$ for all nodes, keep increasing $\epsilon$ (where the sum is over the flows through any node Y and $C_Y$ is the capacity of that specific node). Eventually one of the nodes will saturate. That is, for one (or more) nodes, $\epsilon$ will get large enough such that $\Sigma r_x = C_Y$ for some node Y.

At this point, stop increasing $\epsilon$ and let $b_1^c$ be this specific $\epsilon$ value. The node(s) that saturate(s) is (are) known as the bottleneck node(s). These rates, using $b_1^c$ as the expansion factor, give the switch the largest throughput possible while still being GPS fair. Any increase in the rates through the bottleneck node will cause the bottleneck node to be unstable, but increasing the rate of some connection while not increasing the rates of the flows through the bottleneck node will cause the rates of the flows to no longer be GPS fair. One way to calculate $b_1^c$, the first breakpoint, is to consider each node in isolation and calculate b for each one. The smallest b is $b_1^c$.

Figure 11:
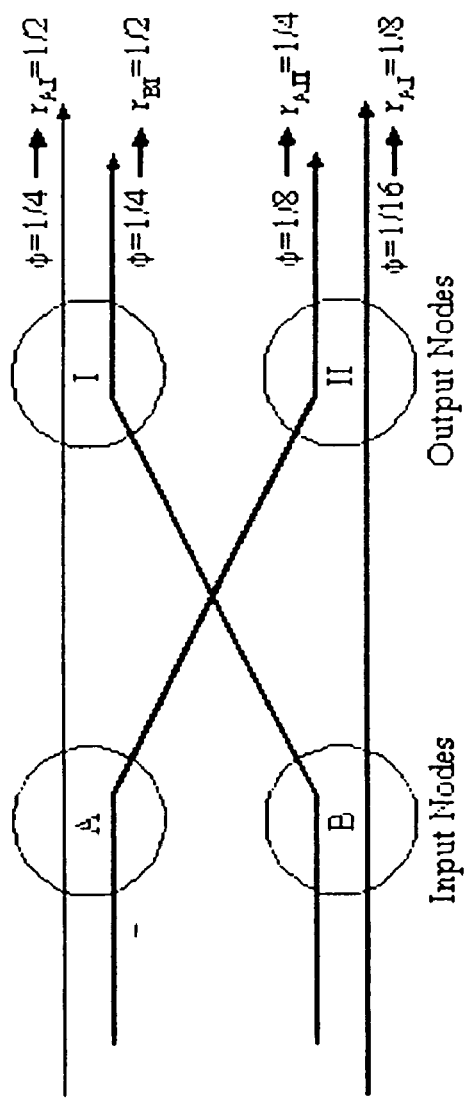

As an example, consider the 2×2 switch shown in FIG. 11. Assume all of the flows are backlogged so that they receive bandwidth proportional to their weights $\phi_{AI} = 1/4$, $\phi_{AII} = 1/8$, $\phi_{BI} = 1/4$, and $\phi_{BII} = 1/16$. Assume the output capacity of each node is 1. For these values, $b_1^c$ is 2, which make $r_{AI} = 1/2$, $r_{AII} = 1/4$, $r_{BI} = 1/2$, and $r_{BII} = 1/8$. The bottleneck node is node I. The total throughputs of each of the nodes are $$\text{Node } A: \sum_A r_x = r_{AI} + r_{AII} = 1/2 + 1/4 = 3/4 \tag{17}$$

$$\text{Node } B: \sum_B r_x = r_{BI} + r_{BII} = 1/2 + 1/8 = 5/8$$

$$\text{Node } I: \sum_I r_x = r_{AI} + r_{BI} = 1/2 + 1/2 = 1$$

$$\text{Node } II: \sum_{II} r_x = r_{AII} + r_{BII} = 1/4 + 1/8 = 3/8.$$

6.1.2.2 Extended GPS Fair Rate Allocation

In the example of FIG. 11, three nodes have leftover capacity. While the bandwidths of the flows passing through node I cannot be increased, it is certainly possible to increase the bandwidth between node A and node II and node B and node II. In this case, the rates would no longer be GPS fair. Increasing the rates through node II would not hurt any of the flows through node I, however. This leads to a new strategy for rate allocation: be GPS fair for as long as possible and then parcel out the remaining bandwidth in a manner that does not harm any connections. That is, first expand all the rates to $b_1^c \phi_x$, then increase various rates while never decreasing any rate below $b_1^c \phi_x$. This approach will make every rate $b_1^c \phi_x$ at a minimum, while preserving the potential to make some rates higher.

The question now becomes how should the extra bandwidth be allocated. Any allocation method may be used. One method continues to distribute the bandwidth in proportion to the $\phi$'s. Conceptually, this means freezing the rates of the flows through the bottleneck node(s) at $b_1^c \phi_x$ and then slowly increasing $\epsilon$ beyond $b_1^c$ so that the non-frozen rates can increase. $\epsilon$ should be increased until the next node(s) bottlenecks. Call this value of $\epsilon$ $b_2^c$. By freezing the rates of the flows through these new bottleneck nodes (except for the flows that have already been frozen), $\epsilon$ can again be increased until another node(s) saturates. This pattern can be repeated until all of the flows are frozen. The aim of this allocation process is to be fair to as many flows for as long as possible. For a given node Y, all of the connections that were first constrained by node Y will have rates that are GPS fair relative to each other.

It should be noted that while $b_1^c$ is equal to the smallest b value, $b_2^c$ is not necessarily the second smallest b value. The second bottleneck node may not even be the node with the second smallest b value. This is because the original b was determined assuming all of the nodes were independent. As soon as one node bottlenecks, and the bandwidth of the flows passing through it are frozen, the other nodes will saturate at a potentially larger $\epsilon$ value. If a node has a frozen flow passing through it, the rates of the other flows will grow larger than they otherwise would have been able to grow. Thus, the node will saturate later than it would if it were independent of the other nodes.

Figure 12:
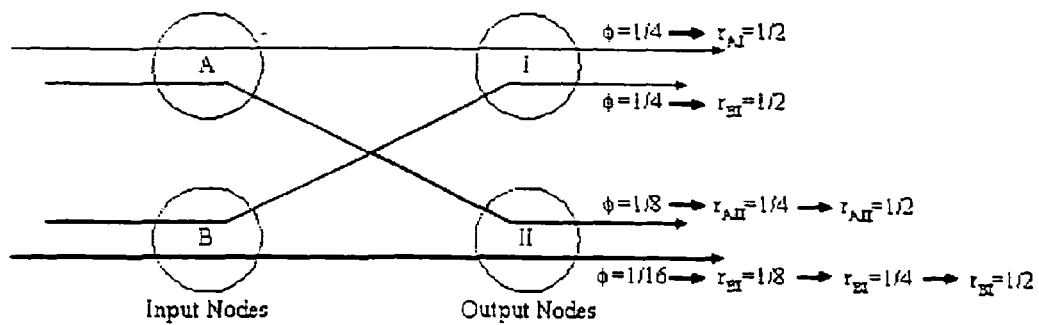

Returning to the example of FIG. 10, the rates $r_{AI}$ and $r_{BI}$ need to be frozen but $r_{AII}$ and $r_{BII}$ can be increased. The next node to bottleneck is A when $r_{AII}=1/2$. At this point, $r_{BII}=1/4$. See FIG. 12 for these rates. This still leaves $\Sigma_B r_x = 3/4$ and $\Sigma_{II} r_x = 3/4$. Since $r_{BII}$ is not frozen, it can be increased until node B and/or node II saturate. In fact, they saturate at the same point, when $r_{BII}=1/2$. This makes all of the rates 1/2 and all of the nodes fully loaded. FIG. 12 shows these rates also.

An earlier example demonstrated that a GPS fair rate allocation does not maximize the throughput of a switch. Extended GPS (EGPS) fair rate allocation can, in many instances, increase the throughput of a switch, but EGPS need not necessarily maximize the throughput of a switch.

Figure 13:
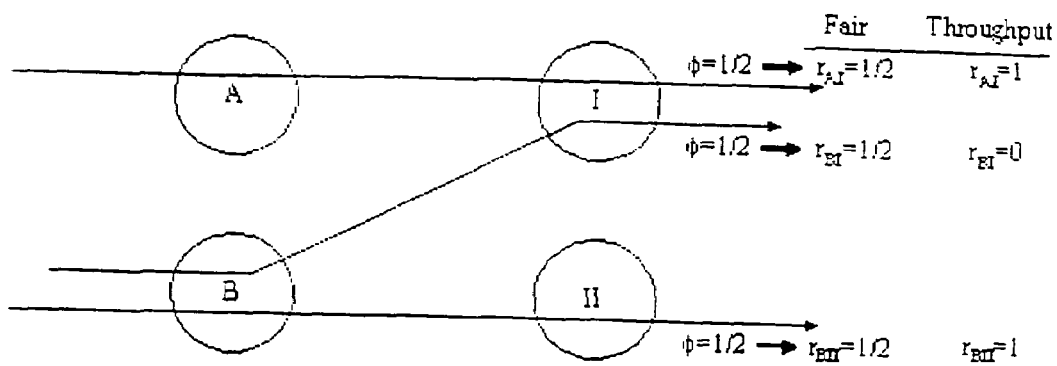

Consider FIG. 13. The GPS fair allocation and the EGPS fair allocation of rates assign each flow a rate of 1/2 for a total switch throughput of 1.5. A close examination of the situation reveals, however, that assigning flows AI and BII rates of 1 and flow BI a rate of 0 gives a throughput of 2.

If all of the connections entering a single node GPS server are leaky bucket constrained $(\sigma,\rho)$, a connection is guaranteed its average throughput if $\Sigma\rho_i < C$. This does not depend on the size of the connection's $\rho$ value. In heavily congested periods of time, real-time connections (where $\rho_i/\Sigma\rho_j < \phi_i/\Sigma\phi_j$ in most cases) tend to dominate and so take more than their long-term share of the bandwidth. This is to ensure that their delay QoS constraints are met. Non-real-time connections receive rates less than their long-term average rates since these cells can wait longer without violating their contracts. Because the real-time traffic is leaky bucket constrained, the period of time that real-time connections can be backlogged is bounded. When the real-time flows become idle, all of the bandwidth is split amongst the non-real-time traffic. At this point the non-real-time traffic flows receive large amounts of bandwidth.

Figure 14:
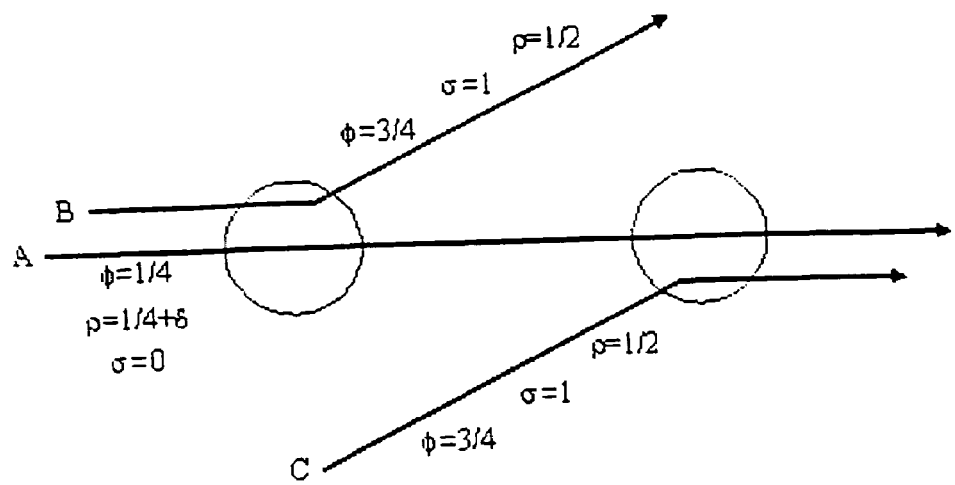

In two stage EGPS, the foregoing is not the case. Even if every node is under-loaded, it is still possible for a connection not to receive an average throughput equal to its long-term average rate. The following example shows a case where this may occur. FIG. 14 shows the long-term average rates ($\rho$), maximum bucket sizes ($\sigma$), and weights ($\phi$) for three flows passing through two nodes. At each node, the sum of the long-term rates is less than the capacity of the nodes (assumed to be 1), since $\delta$ is small. For this example, fluid flow approximations are used for the queues and the servers, and it is assumed that the incoming links have infinite bandwidth. This approximation simplifies the math greatly without affecting the general problem.

Assume at $t=0^-$ that both servers are idle. At $t=0$, a maximum burst of 1 cell arrives from connection B and cells from connection B begin arriving at a rate of 1/2. Also at $t=0$, cells from A begin arriving at a rate of $1/4+\delta$. While both A and B are backlogged at the first node, connection A receives service at a rate of 1/4 while connection B receives service at a rate of 3/4. Since cells from connection B are arriving at a rate of 1/2 but are served at a rate of 3/4, the backlog of cells waiting to be served is reduced at a rate of 1/4. Since this backlog began at $t=0$ at one cell, the queue for connection B empties after $1/(1/4)=4$ seconds. During this time, cells from connection A arrive at a rate of $1/4+\delta$ and are served at a rate of 1/4. Thus, for 4 seconds the queue of A grows at a rate of $\delta$. Starting from 0, this queue reaches a depth of $4\delta$ at $t=4$.

At $t=4$, connection A should begin receiving a larger amount of bandwidth from the first server because connection B is no longer backlogged at this time. However, at $t=4$, connection C, silent until this time, sends a cell and begins transmitting at a rate of 1/2. While C is backlogged, from $t=4$ to $t=8$ (note that B and C have identical parameters) connection A receives service at a rate of 1/4. In a normal multi-server network, the first node can transmit connection A cells at a rate higher than the second node can serve and the extra cells can be buffered at the second node. In the architecture of concern here, this is not the case. Since the bandwidth a connection receives is the minimum of the bandwidths available at each node, connection A is served at a rate of 1/4 in both nodes and the extra cells are queued at the first node. Thus, from $t=4$ to $t=8$, the queue of connection A cells at the first node grows from $4\delta$ to $8\delta$.

If connection B stopped sending cells at $t=4$, it could begin to replenish its bucket at a rate of 1/2. In 4 seconds it could save up $4(1/2)=2$ tokens. Since the bucket size is 1 cell, however, only one token can be kept. Assuming connection B did stop sending cells at $t=4$, by $t=8$ connection B can burst 1 cell. At $t=8$, it does send an entire cell and begin to transmit at a rate of 1/2. As at $t=0$, connection A is limited to a rate of 1/4 for 4 seconds and its queue grows by $4\delta$. At $t=8$, connection C becomes silent so, as with connection B before, it saves up enough credit to burst a cell at $t=12$. By having connections B and C alternately bursting and then being quiet, connection A can be held to a rate of 1/4 indefinitely, below the average arrival rate of $1/4+\delta$. Since the queue is growing at a rate of $\delta$, this means that the queue for A can grow without bound.

A connection will receive its long-term average rate if the sum of the average rates of all of the connections passing through both the input and output nodes that the connection passes through is less than the capacity of the links. In the example, the sum of $\rho_A$, $\rho_B$, and $\rho_C$ is $1+\delta>1$.

The example of FIG. 14 demonstrates that, unlike the single node GPS case, the average rates of connections must be considered when assigning $\phi$ values. Typically, $\phi$ values are assigned to guarantee connections at a minimum rate during congested periods. Starting with the maximum burst size of a connection, $\sigma$, and the maximum delay parameter, $\tau$, a minimum $\phi$ value can be found. Since $\sigma$ cells need to be served in $\tau$ seconds, the minimum rate of a connection is $\sigma/\tau$. Normalizing this rate by the link rate, $(\sigma/\tau)/C$, gives the minimum fraction of the link bandwidth that the flow must be guaranteed. Assigning this number to $\phi$ ensures that the real-time constraints will be met, as long as the sum of the $\phi$'s at the node sum to one or less. With EGPS and a multi-stage architecture, $\phi$'s need to be assigned to ensure a minimum bandwidth at all times. Thus, the weight for a connection must be at least $\rho/C$. Because of this, the bound on the sum of the weights will be reached much sooner than in the single node case. This will result in lower utilization.

One consequence of this is that real-time and non-real-time traffic must be carefully balanced to maximize utilization. By coupling real-time traffic, which requires a large amount of bandwidth for delay purposes but cannot consistently utilize this bandwidth because of a low average rate, with non-real-time traffic, which has a large average rate but a high delay tolerance, a given amount of bandwidth between two ports may be kept consistently full while ensuring that delay bounds will be met. By sharing the bandwidth between these ports and giving the real-time traffic strict priority over the non-real-time traffic, the real-time delay requirements may be met and the bandwidth may be utilized more efficiently.

More generally, consider the necessary bandwidth ("BW") between two ports due to real-time ("rt") connections between the ports $$BW_{rt}^{min} = \sum_{rt\ flows} (\sigma_j / \tau_j), \qquad (18)$$

and the bandwidth necessary due to the average rates of all of the connections $$BW_{\rho}^{min} = \sum_{all\ flows} \rho_j. \qquad (19)$$

The weight necessary to support these connections is $$\phi = \frac{\min\{BW_{rt}^{min}, BW_{\rho}^{min}\}}{C}. \qquad (20)$$

Utilization of the bandwidth can be 100% if $BW_\rho^{min} \geq BW_{rt}^{min}$. Thus, high utilization depends on having enough non-real-time traffic.

In single node GPS, the available server bandwidth is divided among backlogged connections. Thus, if a connection goes from idle to backlogged, the previously backlogged connections have their rates reduced. This is not always the case in multi-, e.g., two, stage GPS.

Figure 15:
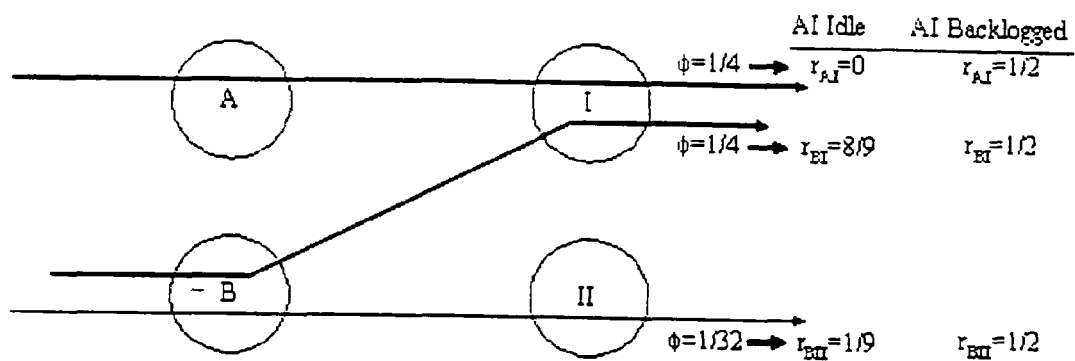

Consider the switch shown in FIG. 15, where the node capacities are assumed to be one (1). Assume initially that flow AI is idle. Node B is the bottleneck node and the two backlogged flows receive the rates $r_{BI}$=8/9 and $r_{BII}$=1/9. Now assume flow AI becomes backlogged. Node I is the bottleneck node so $r_{AI}$ and $r_{BI}$ are each limited to 1/2. Flow BII, being the only non-frozen node, expands to fill the available bandwidth and is assigned a rate of 1/2. Thus, when AI becomes backlogged, the rate assigned to BII goes from 1/9 to 1/2. This occurs because the newly active flow, AI, does not share a node with BII. It is possible for yet another connection that does not pass through either nodes B or II to become backlogged and cause the rate of BII to be reduced. In particular, if another flow through A becomes active and limits the rate of AI to less than 1/2, then $r_{BI}$ becomes greater than 1/2 and $r_{BII}$ ends up less than 1/2.

Figure 16:
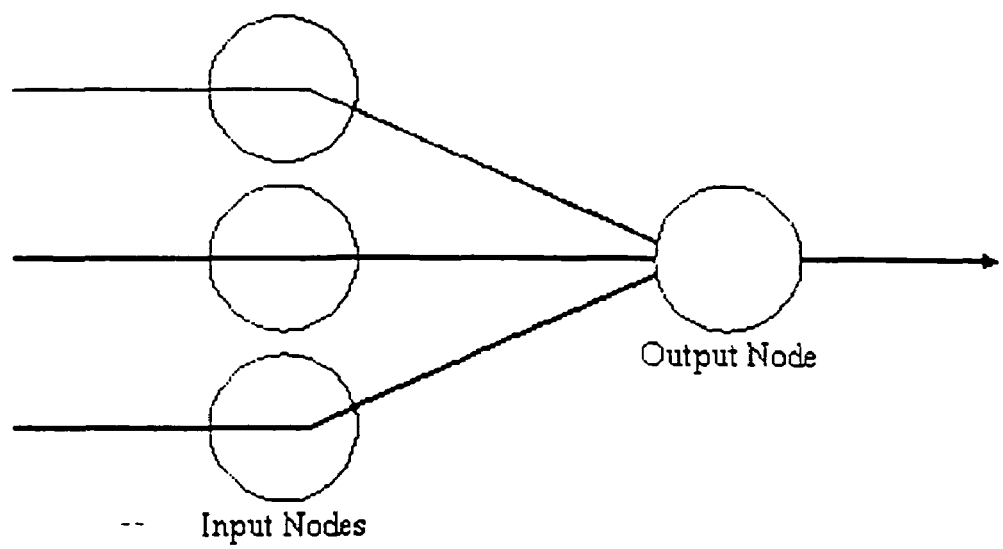

The following illustrates how multi-stage architectures running EGPS act under certain connection patterns. For instance, in FIG. 16, all of the input nodes flow through a single output node. In this case, the output node will be the bottleneck node and the input nodes will accept whatever bandwidth the output node will allow them. The output node will distribute the rates in a GPS fair manner. Thus, the output node will act like a single node GPS server. This example shows that it will approximate the GPS process exactly under the correct circumstances.

Figure 17:
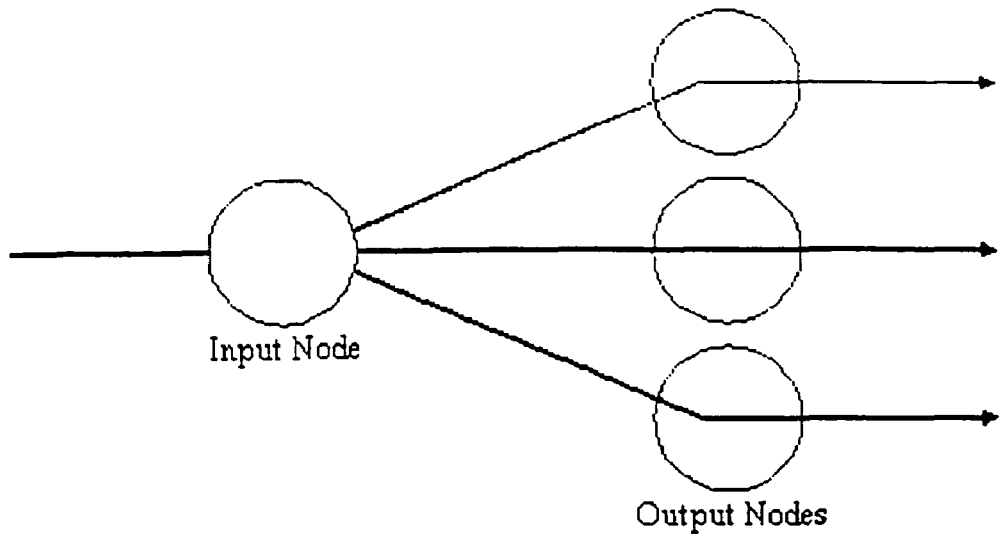

In FIG. 17, all of the flows pass through a single input node. If the incoming link has a bandwidth equal to the bandwidth available leaving the node, there should not be many scheduling decisions because cells are sent out as they come in. Since none of the output nodes have traffic from other input nodes, they can handle all of the traffic the input node can send them. If, however, the incoming link has a peak rate higher than the service rate of the input node, then cells may come in faster than they can be served and multiple flows may become backlogged. The average rate of arrival is bounded by the input node service rate.

At this point the input node must decide how to serve the backlogged connections. Since the output nodes can devote 100% of their bandwidths to the flows, they are not the bottlenecks. The input node, which is the bottleneck node, distributes bandwidth based on the weights of the backlogged connections. Thus, the input node is acting like a single node GPS server. As before, EGPS becomes GPS.

6.2. Rate Assignments for an Interval

One of the assumptions underlying GPS is that the rates at which the flows are being served are re-determined instantaneously when any connection goes from idle to backlogged or backlogged to idle. This may be impractical, especially in a multi-stage architecture using a process such as EGPS where nodes not independent. This interdependence means that nodes need to communicate with each other, which makes instantaneous recalculations difficult.

One alternative to recalculating rates instantaneously is to calculate them on a fixed interval. At predetermined time intervals, the necessary data about each connection is examined and the rates are adjusted.

One issue is how often the rates must be re-determined. Consider what happens as the recalculation interval grows from very short, where the expected performance of the process is close to the performance of the process with instantaneous rate recalculations, to very long. A single node server will be considered to simplify the analysis.

6.2.1 Very Short Intervals

First consider the interval to be very short. How short is very short is not set, but it could be as short as one or two cell slots. At the longest, a very short time interval is a small fraction of the delay tolerance of the real-time traffic. For very short intervals, the GPS process may be used without modification. This means that each connection has only two states—backlogged and idle, and the weights are fixed. Bandwidth is assigned to the backlogged connections in proportion to these weights and each backlogged connection is given as much bandwidth as possible.

Figure 18:
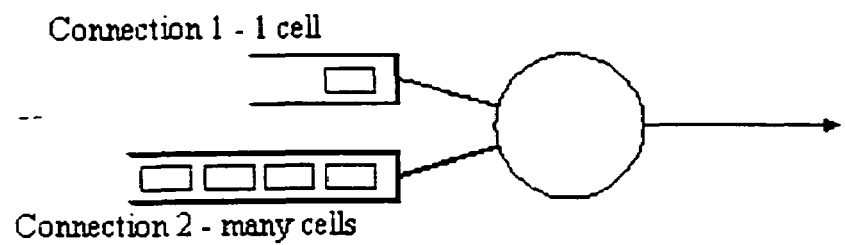

For instance, consider FIG. 18. Assume that both connections have the same priority, so they have identical φ values. Connection one (1) has one cell queued and connection two (2) has many cells queued. In standard GPS with instantaneous rate recalculation, both connections would get 50% of the server's bandwidth. Connection 1 would only need it for a short while, until its single cell was served, and then the connection would be idle. At this point the rates would be re-determined. Since flow 2 is the only backlogged connection, flow 2 would receive 100% of the server's bandwidth and the cells in flow 2 would then be served at a high rate.

Now assume the rates are re-determined every 4 slots. In this case, each connection would receive two sending opportunities. Flow 2 would use both of its opportunities but flow 1 would only use one opportunity. Thus, one slot would go unused. After four slots, the rates would be re-determined.

Since connection 2 is the only backlogged flow, it would receive all of the slots for the next interval.

6.2.2 Short Intervals

Consider the example from above, assuming that the interval between rate recalculations is longer but still relatively short. For the purposes of this example, relatively short is 20 slots or thereabouts. If each of the connections above is given 50% of the slots, then connection 1 will waste nine slots. The overall efficiency of the server is rather poor. One way around this problem is to assign bandwidth not simply based on a static weight and a binary state (idle/backlogged), but rather to incorporate the queue depths into the rate assignments. For instance, in the above example, connection 1 would be given a rate such that one or two cells would be served over the interval. The remaining slots would be given to connection 2. Thus, using the current system state information, a higher utilization can be achieved.

6.2.3 Long Intervals

Now assume the interval is even longer. What if connection 1 is assigned a small rate and then a large number of connection 1 cells arrive? These cells would be forced to wait until the end of the interval. Only then would the rate assigned to connection 1 be increased. The last cells to arrive would still have to wait until the earlier cells were served. Thus, cells could easily have to wait almost 2 intervals before they are served. With a short interval, this may not be a problem. If this interval is long, e.g., a large fraction of the delay is bound for a real-time connection, this may not be acceptable. In these cases, it may be necessary to predict what the upcoming traffic will look like or plan for the worst case arrival pattern. For a CBR connection with a rate of r, the connection is given a rate of r, even if there are currently no cells from the connection queued. Likewise, a real-time VBR connection may need to be given enough bandwidth to handle a maximum burst in order to ensure that if a burst does occur, the node can handle it.

One way is to assign bandwidth to connections based on a minimum bandwidth needed to meet real-time delay bounds and a weight to determine how the leftover bandwidth should be divided amongst flows. The minimum rate, $r_i^{min}$, should be the bandwidth needed by the real-time connections. The weight, $\beta_i$, could be based on queue depth, average rate of the non-real-time traffic, and other parameters. The bandwidth a connection receives is given by $$r_i = r_i^{min} + b\beta_i \tag{21}$$

where b is the expansion factor common to all of the connections. It is set so the sum of all of the connections rates is equal to the bandwidth of the server. Thus, $$C = \sum_j r_j = \sum_j r_j^{min} + b\sum_j \beta_j \tag{22}$$

which, rearranged, gives $$b = \frac{C - \sum_j r_j^{min}}{\sum_j \beta_j}. \tag{23}$$

Using the process of section 6.1, a CBR connection can be given a $r_i^{min}$ value equal to its average rate (assuming it didn't need any extra bandwidth for delay purposes) and a $\phi_i$ value of zero. This would ensure that the connection received all the bandwidth it needed, but no more (which would be wasted). A non-real-time connection, in contrast, would receive $r_i^{min}=0$ but a large $\phi_i$ value. This connection would surrender bandwidth to real-time connections if necessary, but it will take a large portion of any available extra bandwidth.

A number of other variations may be used. For instance, if a connection does not require bandwidth beyond a certain amount, then an $r_i^{max}$ value may be set. Additional bandwidth would not be awarded to a connection past $r_i^{max}$. If $\Sigma r_j^{max} < C$ then a second set of weights can distribute the extra bandwidth for UBR traffic.

6.2.4 Very Long Intervals

As the interval between rate recalculations becomes very long, it becomes increasingly difficult to make predictions about the state of the switch during the interval. While the queue may be quite full at the beginning of the interval, it may empty and fill several times before the rates are re-determined. It is difficult to justify giving a flow a low rate based on the fact that its queue is currently empty when it may burst many times before its rate is increased. Actually, if the flow has not burst recently, then it may have stored up some burst credits and may be more likely to burst in the future. In this set-up, rates are assigned based on permanent parameters, such as maximum burst size and long-term average rate.

6.3 Assigning Peak Rates

The rates assigned to flows can be viewed as peak cell rates (PCR) and the sum of these rates can exceed the capacity of an input node. In this process, a rate does not guarantee a flow a certain amount of service, but instead is an upper bound on the amount of service a flow could receive. If the sum of the rates of the flows passing through an output node is less than or equal to the capacity of the node, then the output buffers will not overflow. If the sum of the rates of the flows passing through an input node is greater than the capacity of the node, data loss will not likely occur since these rates do not control how fast traffic is arriving. The input node cannot serve the flows at these rates, but it has the freedom to serve the flows at any combination of rates such that the sum of the actual service rates is equal to (or even less than) the capacity of the node and each of the individual flow rates is less than or equal to its assigned peak rate.

There are situations where assigning peak rates is quite useful from the standpoint of both increasing throughput and decreasing the time it takes cells to pass through the system. These situations involve assigning rates to flows for an interval of time when the interval of time is long enough that it is necessary to predict which flows might have cell arrivals. The following examples assume that a rate must be assigned to each flow for an interval of time. All of the nodes are assumed to have a capacity of C.

EXAMPLE 1

Figure 19:
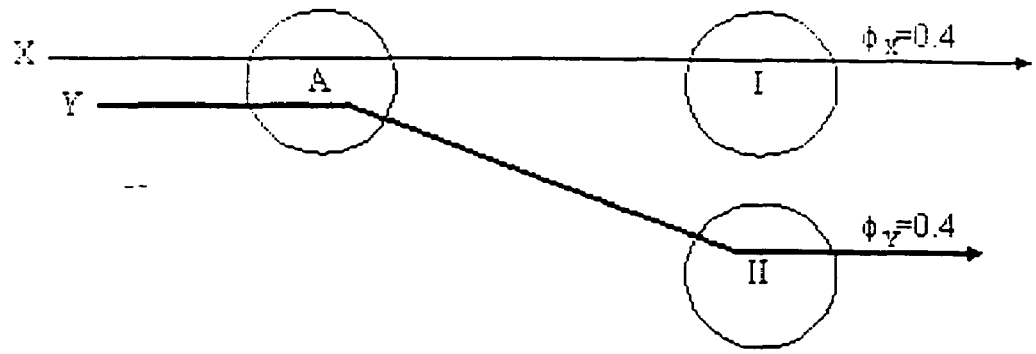

FIG. 19 shows a two-stage switch with two connections. All of the connections pass through the same input node (A) but different output nodes (I and II). All of the connections have the same weight (0.4) so they are all equally important by some measure. For this example, assume that both connections X and Y have a large number of cells queued at A waiting to be served (enough so that neither connection will run out of cells during an interval—even if one of the connections is allowed to send cells at a rate of C for the entire interval). Since the connections have the same weights, each flow is assigned a rate of C/2.

EXAMPLE 2

Predicting Cell Arrivals

Using the same switch set-up as in example 1, assume that neither connection has any cells queued. It is likely that some cells will arrive on one or both of the connections, however, so assigning rates of zero to each of the flows is not a good idea. At first, the most reasonable set of rates appears to be $r_X=r_Y=C/2$, since the two connections have the same weights. A further examination reveals another possibility, however. First, note that the weights of the connections, and even the long-term average rates of the connections, $\rho_X$ and $\rho_Y$, do not give much information about what the traffic mix will be in the short term. It is possible that the incoming traffic mix will be 50% X and 50% Y, but it is also possible that the mix will be 75% X, 15% Y, and 10% unused or even 0% X and 100% Y. Second, note that nodes I and II serve only connections X and Y respectively. Thus, as far as these output nodes are concerned, there is no downside to giving either flow a rate of C. Since I and II are not receiving traffic from any node but A, there is no chance of overwhelming either of them. Combining these two fact leads to the conclusion that the best scheduling rule for node A is to not schedule cells at all, just send them on as they come in. Since each output can handle cells at a rate C, and cells cannot arrive at the input faster than C, it is not possible to overload the output nodes.

Equivalent to this scheduling rule is assigning PCR rates of $r_X=r_Y=C$ to the flows. Even if 100% of the incoming traffic was destined for one of the outputs, it could be sent on at a rate of C, which translates into never queuing a cell. This means better throughput and lower delay for cells. If traffic does arrive in a pattern of 50% X and 50% Y, the traffic would still be handled first come first served with no cells being queued. Note that even though $r_X+r_Y=2C>C$ at the input node, there will not be any problems. Traffic still can enter node A at a rate of C. In contrast, consider what would happen if $r_X=r_Y=C/2$ and 100% of the arriving traffic is destined for output X. Since connection X is only entitled to every other departure opportunity, every other cell departure opportunity would be unused while connection X cells are waiting to be served. Both node A and node I are greatly underutilized.

EXAMPLE 3

Example 1 Revisited

Now reconsider the situation in example 1 with a PCR rate assignment approach. If nodes I and II were to assign flows X and Y PCR rates, they would set $r_X=r_Y=C$. Node A cannot send to each of the output nodes at a rate of C, since this would mean it was serving cells at a rate of 2C. Node A can, however, make its own scheduling decisions and serve both X and Y at rates that seem fair to node A as long as the rates node A assigns to the connections are less than or equal to the PCR rates that the output nodes have assigned to the flows (in this case, this can be done since the PCR's are equal to the capacity of the input node). It seems reasonable for the input node to divide up its available bandwidth equally between the two flow since $\phi_X=\phi_Y$. If the weights were not equal, it would be reasonable for node A to divide up the bandwidth in proportion to the weights. In fact, it is even possible for the input node to change the bandwidth assignments in the middle of an interval if one of the queues becomes empty. Because the input node is acting independently of the output nodes and the other input nodes, it does not need to communicate with them when deciding on service rates. Thus the communications delay problem, the problem that led to interval rate assignments in the first place, has been removed to some degree.

As long as the input nodes serve connections at rates less than the assigned PCR's, they can change their rates whenever it is convenient to do so and to whatever they think is fair. It is this freedom that allows the input nodes to maximize their throughput. The PCR rates still need to be fixed for an interval of time, since setting them still requires communication (state variables from the inputs to the outputs and rates from the outputs to the inputs).

EXAMPLE 4

Figure 20:
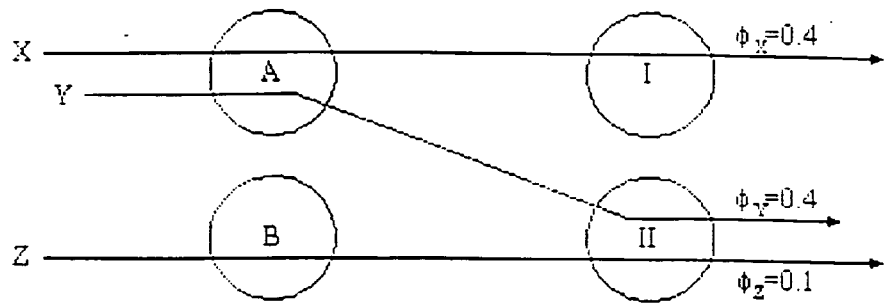

FIG. 20 shows a 2×2 switch with three connections. There are several ways of assigning rates based on what is to be maximized and what is the predicted input pattern of the traffic. For instance, if throughput is to be maximized and the queues for flows X and Z are fairly deep (and/or we expect a lot of traffic to arrive for these connections), the following assignments could be made: $r_X=r_Z=C$ and $r_Y=0$. A fairer solution would be to assign $r_X=r_Y=r_Z=C/2$, but this would come at the expense of some throughput.

Examining the problem from a PCR point of view gives some insights. Initially, there is no reason not to assign $r_X=C$, since node A would be free to serve flow X at a slower rate if flow Y has traffic. Then, the question is what PCR's to assign to flows Y and Z. To avoid the possibility of overflowing node II, we must have $r_Z+r_Y\leq C$. At this point, the flows depend on probabilities. For instance, if connection Z is a very regular CBR stream arriving dependably with a rate of 0.1C, while connection Y is a VBR stream that fairly regularly bursts at rates near C, the rate assignment process gives Z a PCR of 0.1C, since Z will use all of this bandwidth but never any additional bandwidth, and gives Y a PCR of 0.9C, since Y might use it. Even though node A already has a sum of rates greater than its capacity ($1+r_Y$), flow Y is still more likely to use the bandwidth than flow Z. If, on the other hand, Y needed 0.4C consistently and Z were bursty, it makes sense to assign $r_Y=0.4C$ and $r_Z=0.6C$.

If both Y and Z are mildly bursty, then $r_Y=0.8C$ and $r_Z=0.2C$ could be assigned. If it turns out that Z has a large burst and Y does not, then the switch throughput may have had been greater if $r_Y=0.4C$ and $r_Z=0.6C$. It also might happen that the optimal weights are $r_Y=0.9C$ and $r_Z=0.1C$.

In general, if we are passing out bandwidth at output II, and we have $r_Y=y$ and $r_Z=z$, where $x+z=C-\epsilon$ so far, we must decide which connection gets the final $\epsilon$ of bandwidth. A question to ask is which connection is more likely to use this bit of bandwidth without regard to the sum of the rates in the various input nodes. Whichever flow has a higher probability of using this bandwidth should receive it.

Thus, the above examples show the advantages of assigning PCR rates to connections instead of normal rates. This does mean that the input nodes must run some type of rate assignment process to determine exactly what rate various backlogged flows receive, but this freedom allows the input nodes to optimize themselves to a certain extent. This has potentially significant advantages for certain connection configurations.

6.4 Rate Assignment: Process A

This process is designed to calculate the rates assigned to each connection in a switched system. This process uses an estimate of the number of cells each connection is expected to have arrive during the upcoming frame to predict the amount of bandwidth desired by each connection. Bandwidth is then distributed in a globally optimal way similar to the EGPS process to ensure max/min weighted fairness between connections.

The following are the general rules used for process A:

- The process is interval based. Rates assigned to connections are valid for the duration of the interval.
- The intervals are synchronous. All of the rates are updated simultaneously and are valid for the same period of time.
- Bandwidth is distributed in a weighted fair manner. If two connections are being assigned rates, the ratio of the rates is kept equal to the ratio of the weights as long as possible.
- The bandwidth a connection receives is capped by the expected amount of bandwidth it would use over the course of the interval. The number of cells queued for a connection added to the expected number of cells to arrive during the interval dictates the maximum rate a connection should be given.
- At least initially, neither input nodes nor output nodes should be oversubscribed.
- The process is run in a central location.
- After assigning rates in the above manner, any excess bandwidth in the output nodes is distributed to the connections passing through them. This extra bandwidth is distributed without worrying about overloading input nodes or exceeding the expected bandwidth desires of the connections.

The actual process is an interval-based version of EGPS (section 6.1.2.2). Before assigning rates, an estimate of how many cells each connection will have is made. Dividing these numbers by the interval length gives the maximum rates that will be assigned to each of the connections. Once a connection reaches this bandwidth, it is not assigned any additional bandwidth until the overbooking phase. A connection can also be frozen if an input or output node it passes through saturates. After all of the connections have been frozen, the output nodes are examined. If an output node has not saturated, then the excess bandwidth is distributed between the connections that pass through it. This occurs even if the new rates exceed the maximum rates of the connections or if the sum of the rates at an input node exceed the capacity of the inputs. The additional bandwidth is only used if the input node does not have enough other traffic to send.

6.4.1 Maximum Bandwidth For A Connection

One of the features of process A is that it estimates the bandwidth that each connection would use if it could. Let $q_k$ be the number of cells in the queue of connection k at the beginning of the time interval. Let $a_k$ be the expected number of arrivals over the next interval. Thus, if connection k had the opportunity to send as many cells as it could over the next interval, it would expect to send $q_k + a_k$ cells, unless this number was greater than the number of slots in the interval. If the interval was T units long (seconds, cell slots, whatever is most convenient) then the maximum bandwidth process A will give a connection is $$BW_k^{\max} = \frac{q_k + a_k}{T}. \tag{24}$$

Bandwidth in excess of this value may be assigned to this connection if all of the connections are frozen.

6.4.2 Expansion Factors

Recall that in single node GPS (section 6.1.1), each connection is assigned a weight $\phi_i$. The GPS notion of fairness is a weighted fair bandwidth distribution between the backlogged connections. If two connections, i and j, are backlogged and they are assigned rates $r_i$ and $r_j$ respectively, then the rates are fair if the rates are in proportion to the ratio of their weights. That is, $$\frac{r_i}{r_j} = \frac{\phi_i}{\phi_j}. \tag{25}$$

This must be true for any pair of backlogged connections. Any number of rate sets will satisfy this constraint. One set of rates is the set that sums up to the server's capacity.

So, letting B be the set of connections that are backlogged (and therefore will receive non-zero rates), the rate of a connection in B is $$r_i = \frac{\phi_i}{\sum_{j \in B} \phi_j} C = \frac{C}{\sum_{j \in B} \phi_j} \phi_i = b \times \phi_i \tag{26}$$

where $b = C/\sum_{j \in B} \phi_j$ is the expansion factor. Any (non-zero) rate can be determined as $r_k = b\phi_k$. Notice that this satisfies the GPS notion of fairness since $$\frac{r_i}{r_k} = \frac{b\phi_i}{b\phi_k} = \frac{\phi_i}{\phi_k}. \tag{27}$$

Note that the rates must be re-determined any time the set B changes, which could be quite often.

A useful way of thinking about what is happening is to give each backlogged connection a rate $r_i = \epsilon \cdot \phi_i$, where $\epsilon$ is an expansion factor. By starting $\epsilon$ at zero and slowly increasing it, the bandwidth assigned to each flow slowly expands. At all times, the bandwidths are GPS fair because each one is proportional to its weight $\phi_i$. $\epsilon$ can be increased until the sum of the rates reaches the capacity of the server. The $\epsilon$ for which $\Sigma r_i = C$ is b.

The situation considered here is different from the single node GPS server in two ways. First, this is a two-level system, so nodes cannot act in isolation. Steps are taken to ensure that the sum of the rates entering an output node does not exceed the node's capacity. Second, rates are assigned for an interval. This means that the rates assigned to flows do not change when the set of backlogged connections changes.

In this case, there is no single expansion factor for the system. Instead, each connection is assigned its own expansion factor. All of these factors start at zero and are increased together until one of the nodes saturates or one of the connections is maximized. At this point, the expansion factor(s) of the affected connection(s) (the connections that pass through the saturated node or the connection that is maximized) is (are) frozen. The non-frozen expansion factors are then increased until another node saturates or another connection is maximized. Using expansion factors is convenient because all of the non-frozen factors are equal and are increased by the same amount in each iteration. The process stops when all of the connections are frozen. At this point, any connection y, with expansion factor $b_y$ and weight $\phi_y$, is assigned a rate $r_y = b_y \phi_y$.

6.4.3 Process Steps

The following quantities are used in process A.

L: set of connections passing through the switch
$L^{frozen}$: set of connection that have been frozen
$L^{alive} = L \backslash L^{frozen}$: set of connections whose bandwidth can be increased
(backslash, \, denotes the difference between two sets. For two sets E and F, $E\backslash F = \{x : x \in E \text{ and } x \notin F\}$.)
N: set of nodes, both input and output frozen
$N^{frozen}$: set of nodes that have reached their capacity
$N^{alive} = N \backslash N^{frozen}$: set of nodes that have not reached capacity
$C_j$: capacity of node j
$L_j$: set of connections that pass through node j Note that L and N are fixed sets. $L^{frozen}$ and $N^{frozen}$ start at $\{\phi\}$ (the null set) and grow towards L and N. $L^{alive}$ and $N^{alive}$ start at L and N and shrink towards $\{\phi\}$ with every iteration.

Process A proceeds as follows.

Step 0:

$$L^{alive} = L \quad (28)$$

$$N^{alive} = N \quad (29)$$

Calculate $BW_k^{max}$ (the maximum bandwidth) for every connection. For every connection, $b_k^{max} = BW_k^{max}/\phi_k$, $b_k^{remaining} = b_k^{max}$, and $b_k^c = 0$. $b_k^{max}$, a fixed quantity, is the amount connection k may expand before it equals $BW_k^{max}$. $b_k^{remaining}$ shrinks to zero with every iteration. $b_k^c$ is the current expansion coefficient for each connection. The expansion coefficients of all non-frozen connections grow at the same rate. When connection k is frozen, $b_k^c$ is frozen.

For every node $$b_j^n = \frac{C_j}{\sum_{k \in L_j} \phi_k}. \quad (30)$$

This is the amount each of the connections passing through a node may expand before the node reaches its capacity. This quantity changes with every iteration.

Step 1:
Find the minimum $b_j^n$ of all the nodes in $N^{alive}$. Find the minimum $b_k^{remaining}$ of all the connections in $L^{alive}$. Define $b^{min}$ as the lesser of these two minima. This is how much the non-frozen connections can expand before either a node saturates or a connection is maximized.

Step 2:
For all connections in $L^{alive}$ $$b_k^c := b_k^c + b^{min} \quad (31)$$

and $$b_k^{remaining} := b_k^{remaining} - b^{min}. \quad (32)$$

This updates the $b_k^c$ values for all of the non-frozen connections.

Step 3:
For each node in $N^{alive}$ calculate $$b_j^n = \frac{C_j - \sum_{k \in L_j} b_k^c \phi_k}{\sum_{k \in L_j \cap L^{alive}} \phi_k} \quad (33)$$

If node j bottlenecks on this iteration (the previous value of $b_j^n$ equaled $b^{min}$) then the new $b_j^n$ (determined in this step) will be zero.

Step 4:
Define $N^{bn} = \{\text{nodes for which } b_j^n = 0\}$ (bn for bottlenecked) and $$L^{bn} = \bigcup_{j \in N^{bn}} L_j.$$

$L^{bn}$ is the set of connections that pass through a bottlenecked node.

Define $L^{max} = \{\text{connections for which } b_k^{remaining} = 0\}$ This is the set of connection that have received all the bandwidth they expect to need.

Now $$L^{frozen} = L^{bn} \cup L^{max}, \quad (34)$$

and $$N^{frozen} = \{\text{node where } L_j \subset L^{frozen}\}. \quad (35)$$

So $$L^{alive} = L \backslash L^{frozen} \quad (36)$$

and $$N^{alive} = N \backslash N^{frozen}. \quad (37)$$

Most of this work is done because a node can be frozen without being bottlenecked. This can occur when all of the connections passing through a node are frozen for some other reason.

This step constructs these sets each time. It may be simpler to just update these sets each iteration.

Step 5:
If $L^{alive} \neq \{\phi\}$ (an empty set) then GO TO Step 1.

Step 6:
If an output node is not bottlenecked then it has capacity that has no chance of being utilized. The $BW^{max}$ value for each connection is based on an estimate, however, so the actual traffic needing to be served will most likely be different. If the excess capacity of an output node is distributed, then the input nodes have the opportunity to adjust their rates to maximize the throughput of the system based on the actual traffic arrival pattern. There are many possible ways of passing out this extra bandwidth. One way is to award it based on the weights of the connections. To do this, calculate, for each output node, $$b_j^{n,extra} = \frac{C_j - \sum_{k \in L_j} b_k^c \phi_k}{\sum_{k \in L_j} \phi_k}. \tag{38}$$

(This will be zero for bottlenecked nodes.) Thus, the new expansion factor for connection k, which passes through output node j, is $$b_k^{PCR} = b_k^c + b_j^{n,extra}. \tag{39}$$

Step 7:

For any connection there are two rates. The first, $r_k$, is the rate a connection should receive as long as it has cells to send. The second, $r_k^{PCR}$, is the maximum rate a connection should receive. These rates are $$r_k = b_k^c \phi_k \tag{40}$$

and $$r_k^{PCR} = b_k^{PCR} \phi_k. \tag{41}$$

Some special cases have been ignored in the above process. For instance, if no connections pass through a node then this node should be placed in $N^{frozen}$ at the start of the process and eq. (26) should not be determined for this node. In addition, if $BW^{max}$ is zero for some connection, it can be placed in $L^{frozen}$ in step zero.

6.4.4 An Extension For Assigning Minimum Rates

One extension to process A is to assign each connection a minimum rate, such as zero. As long as the minimum rates at a node sum to less than the capacity of the node, redefine the initial capacity of the node (used in step 0) to be $$C_j = C_j - \sum_{k \in L_j} r_k^{min}. \tag{42}$$

The value of $b_k^{max}$ must be defined as $b_k^{max} = (BW_k^{max} - r_k^{min})^+/\phi_k$ (where $x^+$ is the maximum of 0 and x). The final rates given to the connections are $$r_k = r_k^{min} + b_k^c \phi_k \tag{43}$$

and $$r_k^{PCR} = r_k^{min} + b_k^{PCR} \phi_k. \tag{44}$$

Representative computer code to implement process A is shown in the attached Appendix.

6.5 Rate Assignment: Process B

The rate assignment processes described above have been optimized in terms of fairness and, to a lesser extent, throughput. Process B is a GPS fair process, which requires relatively fewer calculations than those described above.

Process B assigns rates to flows passing through one or more bottleneck points. Specifically, process B is used when the following general conditions apply:

Bandwidth is to be assigned to all of the connections at the same time.

The bandwidth is to be used for a specific period of time known as the "scheduling interval". At the end of this interval, all of the connections are to receive new bandwidth assignments.

The bandwidth is to be distributed in an EGPS fair manner.

Connections may have maximums placed on their bandwidth allocations.

Several variations on the general process are presented based on whether a single node is scheduling among several connections or whether a central location is scheduling input/output pairs. In this context, "connection" means VC's, VP's, or any of several varieties of VL's. In addition, "node" means some bottleneck point where cells must be scheduled. These might be input and output switch core links or they might be some other locations the switch.

The basic idea of process B is to pass out bandwidth in a distributed weighted round-robin manner. Since switches can only send whole cells, fluid flow models, which tell us to serve all of the head-of-line cells simultaneously at fractions of the link rate, are approximations. Since a single cell is the smallest unit a switch can actually transmit, then the smallest unit of data to consider is a single cell. In addition, a natural unit of time is the time it takes to send a single cell.

Consider the number of cell departure opportunities in a scheduling interval. Call this number Max_Slots. Assigning bandwidth to flows for use over the scheduling interval is equivalent to awarding connections departure opportunities (slots) so that the total number of slots awarded is Max_Slots. It is possible to convert between slots and bandwidth using the number of bits in a cell and the overall link bandwidth.

In order to award cell slots in a fair manner, a calendar with a length equal to Max_Slots can be constructed. If each connection has a weight $\phi_i$, such that the sum of the $\phi_j$ sum up to 1 or less, then each connection will receive $(\phi_i)\cdot$(Max_Slots) (rounded to an integer) entries in the calendar. These entries are placed in the calendar so that each connection is as evenly distributed as possible, e.g., one entry per calendar slot. Each calendar slot is referred to as a "day", though this is a reference unit only and does not mean a 24 hour period. In addition, any empty calendar slots are distributed evenly. By advancing day-by-day through the calendar, and awarding slots to whichever connection occupies each day, it is possible to achieve a relatively fair distribution of bandwidth. A weighted round-robin linked list can be used instead of a calendar.

6.5.1 Single Node Process B

First consider an isolated node distributing bandwidth among several different connections. A total of Max_Slots slots are to be distributed among the connections. Each connection x will accept a maximum of Max(x) slots. The following quantities are used in the single node process B.

| | |
|---|---|
| Max(x): | maximum number of slots that connection x will accept (proportional to $BW^{max}$). |
| Slots(x): | number of slots that have been assigned to connection x. Starts at 0 and increases to at most Max(x). |
| Total: | total number of slots that have been awarded. Starts at 0 and increases to Max_Slots. |
| Day: | next slot in calendar to be considered. |
| Calendar_Entry(k): | entry in the calendar for day k. |
| Calendar_Length: | length of the calendar. Usually equal to Max_Slots. |

The process is as follows. It is assumed that the calendar has already been constructed and the variable "Day" already has some value. Unless this is the first run of the process, the value should be left from the last interval.

Step 1:
  Calculate Max(x) for each connection
  Slots(x)=0 for each connection
  Total=0

Step 2:
  IF ΣMax(x)≦Max_Slots (sum over all connections)
  THEN Slots(x)=Max(x) for all connections, END
  This step prevents the process from entering an infinite loop. Without this step, there is a possibility that all of the connections could reach their Max values before Total reached Max_Slots.

Step 3:
  Flow=Calendar_Entry(Day); Flow equals the connection that occupies the current day
  IF Slots(Flow)<Max(Flow) AND Flow≠"Empty"
  THEN Slots(Flow)=Slots(Flow)+1, Total=Total+1
  If Slots(Flow)=Max(Flow) or the calendar slot is empty, then do nothing and move on to the next day in the calendar.

Step 4:
  Day=(Day+1) MOD Calendar_Length
  Increment the current day but wrap around to day 1 when the end of the calendar is reached.

Step 5:
  IF Total=Max_Slots
  THEN END
  ELSE GOTO Step 3

6.5.2 Single Node Process Example

This example shows how the single node process B of section 6.5.1 works in practice.

Weights: $\phi_A$=0.4, $\phi_B$=0.2, $\phi_C$=0.1, and $\phi_D$=0.1. Note that $\Sigma\phi_i \leq 1$.
Scheduling interval: 20 cells.
Calendar slots: A=8, B=4, C=2, and D=2.
Maximums: Max(A)=3 cells slots, Max(B)=20, Max(C)=10, and Max(D)=3.

| $^1$A | $^2$B | $^3$C | $^4$A | 5 | $^6$A | $^7$B | $^8$D | $^9$A | 10 | $^{11}$A | $^{12}$B | $^{13}$C | $^{14}$A | 15 |
|---|---|---|---|---|---|---|---|---|---|---|---|---|---|---|
| $^{16}$A | $^{17}$B | $^{18}$D | $^{19}$A | 20 | | | | | | | | | | |

Day pointer: Day 6.
Process steps:

0) Slots(A) = Slots(B) = Slots(C) = Slots(D) = Total = 0
1) Day = 6, Slots(A) = 1, Total = 1
2) Day = 7, Slots(B) = 1, Total = 2
3) Day = 8, Slots(D) = 1, Total = 3
4) Day = 9, Slots(A) = 2, Total = 4
5) Day = 10, empty
6) Day = 11, Slots(A) = 3, Total = 5
7) Day = 12, Slots(B) = 2, Total = 6
8) Day = 13, Slots(C) = 1, Total = 7
9) Day = 14, Slots(A) = Max(A) so slot refused
10) Day = 15, empty
11) Day = 16, Slots(A) = Max(A) so slot refused
12) Day = 17, Slots(B) = 3, Total = 8
13) Day = 18, Slots(D) = 2, Total = 9
14) Day = 19, Slots(A) = Max(A) so slot refused
15) Day = 20, empty
16) Day = 1, Slots(A) = Max(A) so slot refused
17) Day = 2, Slots(B) = 4, Total = 10
18) Day = 3, Slots(C) = 2, Total = 11
19) Day = 4, Slots(A) = Max(A) so slot refused
20) Day = 5, empty
21) Day = 6, Slots(A) = Max(A) so slot refused
22) Day = 7, Slots(B) = 5, Total = 12

-continued

| $^1$A | $^2$B | $^3$C | $^4$A | 5 | $^6$A | $^7$B | $^8$D | $^9$A | 10 | $^{11}$A | $^{12}$B | $^{13}$C | $^{14}$A | 15 |
|---|---|---|---|---|---|---|---|---|---|---|---|---|---|---|
| $^{16}$A | $^{17}$B | $^{18}$D | $^{19}$A | 20 | | | | | | | | | | |

Day pointer: Day 6.
Process steps:

23) Day = 8, Slots(D) = 3, Total = 13
24) Day = 9, Slots(A) = Max(A) so slot refused
25) Day = 10, empty
26) Day = 11, Slots(A) = Max(A) so slot refused
27) Day = 12, Slots(B) = 6, Total = 14
28) Day = 13, Slots(C) = 3, Total = 15
29) Day = 14, Slots(A) = Max(A) so slot refused
30) Day = 15, empty
31) Day = 16, Slots(A) = Max(A) so slot refused
32) Day = 17, Slots(B) = 7, Total = 16
33) Day = 18, Slots(D) = Max(D) so slot refused
34) Day = 19, Slots(A) = Max(A) so slot refused
35) Day = 20, empty
36) Day = 1, Slots(A) = Max(A) so slot refused
37) Day = 2, Slots(B) = 8, Total = 17
38) Day = 3, Slots(C) = 4, Total = 18
39) Day = 4, Slots(A) = Max(A) so slot refused
40) Day = 5, empty
41) Day = 6, Slots(A) = Max(A) so slot refused
42) Day = 7, Slots(B) = 9, Total = 19
43) Day = 8, Slots(D) = Max(D) so slot refused
44) Day = 9, Slots(A) = Max(A) so slot refused
45) Day = 10, empty
46) Day = 11, Slots(A) = Max(A) so slot refused
47) Day = 12, Slots(B) = 10, Total = 20 = Max_Slots Final totals: Slots(A)=3, Slots(B)=10, Slots(C)=4, and Slots(D)=3.

Day pointer (starting point of next interval): Day 13.

Ideally, using EGPS and assuming a fluid flow model, connection A would receive 3 cell slots, connection B would receive 9.33 cells slots, connection C would receive 4.67 cell slots, and connection D would receive 3 cell slots. At first, it would appear that it would be closest to ideal if connection C had received 5 slots and connection B had received 9 slots (4.67 rounds to 5, 9.33 rounds to 9). This should only happen two out of every three times, however. B should receive 10 and C receive 4 one out of every three times. The Day pointer for the next interval is pointing to Day 13, a C day. This ensures that C will receive 5 slots in the next interval (in the next interval Slots(B)=9, Slots(C)=5).

6.5.3 Single Node Process: Modification 1

This is the first of two modifications that may reduce the complexity of the single node process B of section 6.5.1. This modification stems from the fact that the process will make it around the calendar at least once, assuming Calendar_Length=Max_Slots. If Max_Slots is a multiple of Calendar_Length, the process might make it around several times. This makes it possible to skip the first trip around the calendar and assign the connections the values they would have received. Thus, taking Calendar_Slots(x) to be the number of entries that connection x has in the calendar, insert this step into the single node process B of section 6.5.1 between steps 2 and 3:

Step 2.5:
  Slots(x)=min{Calendar_Slots(x), Max(x)} for each connection
  Total=ΣSlots(x) (sum over all connections)

In the example, the process could be "jump-started" with Slots(A)=3, Slots(B)=4, Slots(C)=2, Slots(D)=2, and Total=11. Day would remain at 6. The process would then continue starting at step 2.

6.5.4 Single Node Process: Modification 2

This modification checks the possibility that the process might get around the calendar several times before Total hits Max_Slots. As long as Total stays less than Max_Slots, keep adding Calendar_Slots(x) to Slots(x). This alternative step 2.5 shows how this modification works:

Step 2.5:
Temp_Slots(x)=min{Slots(x)+Calendar_Slots(x), Max (x)} for each connection,
Temp_Total=ΣTemp_Slots(x) (sum over all connections)
IF Temp_Total≦Max_Slots
THEN Slots(x)=Temp_Slots(x) for all connections, GOTO Step 2.5
Total=ΣSlots(x) (sum over all connections)

This modification would be most useful for sparse calendars, or when many of the connections have low maximums bandwidths. In both of these cases, many passes through the calendar would be necessary to reach Max_Slots. In the previous example, this step 2.5 would run three times (in the last run Temp_Total would exceed Max_Slots so Temp_Slots would be discarded) and then skip to step 4.

6.5.5 Multiple Node Process B

When multiple input and output nodes are being jointly and simultaneously assigned rates, a different variation of process B is needed. The key fact here is that there is not a single variable Total but rather a variable Total(y) for each node. No connection passing through node y can accept additional slots if Total(y)=Max_Slots. In fact, each node may have a different Max_Slots value, Max_Slots(y). Each connection is associated with both an input and an output node. Thus, the call to Calendar_Entry(Day) will return two pieces of information, Flow_From, the input node a connection passes through, and Flow_To, the output node a connection passes through.

In order for a connection to accept a slot, three things should be true. The input node a connection passes through must not be saturated, the output node a connection passes through must not be saturated, and the connection must be below its maximum bandwidth. These conditions are equivalent to Total(Flow_From)<Max_Slots(Flow_From), Total(Flow_To)<Max_Slots(Flow_To), and Slots(x)<Max (x). If all of these are true, then the slot is accepted and Total(Flow_From), Total(Flow_To), and Max(x) are all incremented.

Stopping the process is more complex, since there is no single Total value to compare with Max_Slots. The process shouldn't stop when the first Total reaches its Max_Slots value and it may need to stop before all of the Total values reach their Max_Slots value. There are several possible stopping rules. First, as in process A, it is possible to keep a set of active connections. When a connection reaches its Max value, it is removed from this set. If a node reaches its Max_Slots value, all of the connections passing through it are removed from the set. As long as this set is non-empty, there is at least one connection accepting slots and the process should continue. When the active connection set is empty, the process should stop.

A second stopping rule involves keeping track of when the last slot was accepted. If the process makes an entire pass through the calendar without a slot being accepted, then the process should stop. Implementing this stopping rule means defining a variable Last_Day, which is set to the current day whenever a slot is accepted by some connection. When Day=Last_Day and the connection occupying Day is not accepting slots, then the process is stopped.

There are several ways of constructing the calendar in the multi-node case. One method is to use one large, unified calendar, which contains all of the connections. Each entry has an input and an output associated with it. Note that this calendar is longer than Max_Slots. If there were N input nodes and N output nodes and each node had a capacity of Max_Slots, then the calendar would most likely be N·Max_Slots long. Another method uses a separate calendar for each input or output node. Entries in each calendar represent output or input nodes. Days from each of the calendars are examined in a round-robin fashion. A day is examined from calendar 1, then a day from calendar 2, etc.

6.5.6 Multiple Node Process Modifications

If there are open slots in the calendar, then new, or expanding old, connections can claim them. This is one reason to distribute any empty slots evenly. That way, if any connections are added, they can be distributed. After adding and removing enough connections, the distributions of the slots may become uneven. When this measure exceeds a predetermined threshold, a new calendar may be constructed.

Constructing a new calendar can be done during the time between process runs. Still, reconstructing the calendar should be avoided if possible, since the process' fairness increases as more runs are performed using the same calendar.

The next issue involves two kinds of minimum bandwidths. The first is the smallest bandwidth a connection may receive. At this point, this minimum bandwidth is 1 slot per scheduling interval. Increasing the scheduling interval will cause this minimum bandwidth to decrease, but the ability of the process to react to bursty traffic will suffer as this interval grows. The second minimum bandwidth involves guaranteeing a certain number of slots to certain connections. This feature can be added by inserting a new step at the beginning of the process. This step would set Slots(x)=Min(x) for each connection (Min(x) being the minimum number of slots for connection x). Total would then be updated.

Finally, there is the issue of PCR rates, or bandwidth above what a connection or node expects to be able to handle. After the multi-node process has stopped, it would be a simple matter to restart the process with the saturated output node [Total(Flow_To)=Max_Slots(Flow_To)] being the only reason a connection would not accept a slot.

6.6 Rate Assignment: Process C

The foregoing rate assignment processes depend on a central scheduler making global rate calculations for all input and output ports. This may not be feasible in all cases. There is a need for processes that can make rate calculations in a distributed manner. Process C makes such calculations. Process C attempts to be GPS fair to all of the connections, but since no central scheduler oversees the rate assignment process, there may be situations where inequities occur.

Process C includes two phases, a phase at the input nodes and a phase at the output nodes. In the first phase (the input phase), each input node independently determines the bandwidth (the rate) it would give each of its connections if it were the only bottleneck in the system. These rates depend on an estimate of the amount of bandwidth each connection would use if it were to receive all of the bandwidth it desired and a set of fixed weights for the connections. These input node rates and maximum bandwidth estimates are forwarded on to the appropriate output nodes.

In the second phase of process C, each output node determines a rate for the connections passing though it. These rates are independent of the rates the other output nodes calculate. These rates depend on the maximum bandwidth estimates and the input node bandwidth estimates, however.

Within a node, the rates are determined based on a set of fixed weights and a set of thresholds. The weights, $\phi_x$, are used in the normal GPS way—as proportionality constants when dividing up bandwidth in a weighted fair manner. The thresholds form a series of plateaus for the bandwidth of each connection. Each connection x passing through a node has a series of thresholds $T_1(x)$, $T_2(x)$, etc. Bandwidth is distributed to a connection in a weighted fair fashion (GPS fair way, proportional to the weights) until the connection reaches the next threshold. When a connection reaches a threshold, say $T_2(x)$, it is temporarily frozen and the connection stops accumulating bandwidth. When all of the other connections reach their $T_2$ thresholds, then all of the connections can begin accumulating bandwidth again.

Thus, all of the connections start with zero bandwidth and build up to their $T_1$ threshold. None of the connections advance beyond their $T_1$ threshold until all of the connections have reached their $T_1$ threshold. All of the connections then advance towards their $T_2$ values. After all of the connections have reached their $T_2$ thresholds, the connections advance towards their $T_3$ thresholds, and so on.

6.6.1 Input Node Phase

As in processes A and B, process C determines the estimated bandwidth that each connection would use if it could. This value, Max(x) for a connection x, is based on the queue length and recent cell arrival pattern of each connection. The bandwidth is split up between connections in a weighted fair manner with thresholds. The thresholds for the Input Node Phase are as follows:

$T_1(x) = \text{Min}(x)$ $T_2(x) = \text{Max}(x)$ $T_3(x) = C$ where Min(x) is the minimum bandwidth for connection x. The sum of the minimum bandwidths is less than the capacity of the node, which is value C for all of the nodes. Note that it is possible for a connection to receive a rate greater than Max(x), which occurs when $\Sigma\text{Max}(x) < C$. In pseudo-code this phase can be written as follows:

IF $\Sigma T_1(y) \geq C$
   THEN BW_In(x)=0 for all x, Distribute(BW=C, Threshold=$T_1$) {See note 1 below}
   ELSE IF $\Sigma T_2(y) \geq C$
     THEN BW_In(x)=$T_1(x)$ for all x, Distribute(BW=(C−$\Sigma T_1(y)$), Threshold=$T_2$) {See note 2 below}
     ELSE BW_In(x)=$T_2(x)$ for all x, Distribute(BW=(C−$\Sigma T_2(y)$), Threshold=$T_3$) {See note 3 below}

BW_In(x) is the input node's estimate of the bandwidth available for connection x. After BW_In(x) has been determined, it is sent, along with Max(x), to the output node that connection x passes through.

Note 1: In this case, there is not enough bandwidth available to give every connection the amount of bandwidth that is equal to their $T_1$ threshold. So, all connections start with no bandwidth and the Distribute subroutine divides the bandwidth C among the connections in a fair manner. The Distribute subroutine will not award any connection more bandwidth than its $T_1$ value, so any given connection "x" will end up with an amount of bandwidth between 0 and $T_1(x)$.

Note 2: In this case, there is enough bandwidth to give every connection at least an amount of bandwidth equal to its $T_1$ threshold, but not enough to give every connection the amount of bandwidth equal to its $T_2$ threshold. Every connection starts with an amount of bandwidth equal to its $T_1$ threshold and the Distribute subroutine passes out the remaining bandwidth, (C−$\Sigma T_1(y)$), in a fair manner. No connection will end up with bandwidth exceeding its $T_2$ threshold. Any given connection "x" will end up with an amount of bandwidth between $T_1(x)$ and $T_2(x)$.

Note 3: In this case, there is enough bandwidth to give every connection at least an amount of bandwidth equal to its $T_2$ threshold, but not enough to give every connection amount of bandwidth equal to its $T_3$ threshold. Every connection starts with an amount of bandwidth equal to its $T_2$ threshold and the Distribute subroutine passes out the remaining bandwidth, (C−$\Sigma T_2(y)$), in a fair manner. No connection will end up with bandwidth exceeding its $T_3$ threshold. Any given connection "x" will end up with an amount of bandwidth between $T_2(x)$ and $T_3(x)$.

The subroutine Distribute(BW=R, Threshold=$T_j$) distributes an amount of bandwidth equal to R in a weighted fair manner, allowing no connection to exceed its $T_j$ threshold. The subroutine starts with whatever the current BW_In values are and adds bandwidth to them. If needed, the actual bandwidth calculations can be done in some low complexity manner, such as process B.

6.6.2 Output Node Phase

At the output node, all of the input node bandwidth estimates and the connection bandwidth need estimates are collected. The output node determines bandwidth allotments for each connection based on the following thresholds:

$T_1(x) = \text{Min}(x)$ $T_2(x) = \text{Min}\{BW\_In(x), \text{Max}(x)\}$ $T_3(x) = \text{Max}(x)$ $T_4(x) = \text{Max}\{BW\_In(x), \text{Max}(x)\}$ $T_5(x) = C$ In pseudo-code, BW_Out(x) can be determined as follows.
IF $\Sigma T_1(y) \geq C$
   THEN BW_Out(x)=0 for all x, Distribute(BW=C, Threshold=$T_1$) {See note 1 below}
   ELSE IF $\Sigma T_2(y) \geq C$
     THEN BW_Out(x)=$T_1(x)$ for all x, Distribute (BW=(C−$\Sigma T_1(y)$), Threshold=$T_2$) {See note 2 below}
     ELSE IF $\Sigma T_3(y) \geq C$
       THEN BW_Out(x)=$T_2(x)$ for all x, Distribute(BW=(C−$\Sigma T_2(y)$), Threshold=$T_3$) {See note 3 below}
       ELSE IF $\Sigma T_4(y) \geq C$
         THEN BW_Out(x)=$T_3(x)$ for all x, Distribute (BW=(C−$\Sigma T_3(y)$), Threshold=$T_4$) {See note 4 below}
         ELSE BW_Out(x)=$T_4(x)$, for all x, Distribute (BW=(C−$\Sigma T_4(y)$), Threshold=$T_5$) {See note 5 below}

BW_Out(x) is then sent back to the appropriate input. The inputs should be careful not to allow any connection to exceed its BW_Out rate.

Note 1: In this case, there is not enough bandwidth available to give every connection amount of bandwidth equal to their $T_1$ threshold. So, all connections start with no bandwidth and the Distribute subroutine divides the bandwidth C among the connections in a fair manner. The Distribute subroutine will not award any connection more bandwidth than its $T_1$ value. Therefore, any given connection "x" will end up with a an amount of bandwidth between 0 and $T_1(x)$.

Note 2: In this case, there is enough bandwidth to give every connection at least an amount of bandwidth that is equal to its $T_1$ threshold, but not enough to give every connection amount of bandwidth equal to its $T_2$ threshold. Every connection starts with an amount of bandwidth equal to its $T_1$ threshold and the Distribute subroutine passes out the remaining bandwidth, $(C-\Sigma T_1(y))$, in a fair manner. No connection will end up with bandwidth exceeding its $T_2$ threshold. Any given connection "x" will end up with an amount of bandwidth between $T_1(x)$ and $T_2(x)$.

Note 3: In this case, there is enough bandwidth to give every connection at least an amount of bandwidth equal to its $T_2$ threshold, but not enough to give every connection amount of bandwidth equal to its $T_3$ threshold. Every connection starts with an amount of bandwidth equal to its $T_2$ threshold and the Distribute subroutine passes out the remaining bandwidth, $(C-\Sigma T_2(y))$, in a fair manner. No connection will end up with bandwidth exceeding its $T_3$ threshold. Any given connection "x" will end up with an amount of bandwidth between $T_2(x)$ and $T_3(x)$.

Note 4: In this case, there is enough bandwidth to give every connection at least an amount of bandwidth equal to its $T_3$ threshold, but not enough to give every connection amount of bandwidth equal to its $T_4$ threshold. Every connection starts with an amount of bandwidth equal to its $T_3$ threshold and the Distribute subroutine passes out the remaining bandwidth, $(C-\Sigma T_3(y))$, in a fair manner. No connection will end up with bandwidth exceeding its $T_4$ threshold. Any given connection "x" will end up with an amount of bandwidth between $T_3(x)$ and $T_4(x)$ Note 5: In this case, there is enough bandwidth to give every connection at least an amount of bandwidth equal to its $T_4$ threshold, but not enough to give every connection amount of bandwidth equal to its $T_5$ threshold. Every connection starts with an amount of bandwidth equal to its $T_4$ threshold and the Distribute subroutine passes out the remaining bandwidth, $(C-\Sigma T_4(y))$, in a fair manner. No connection will end up with bandwidth exceeding its $T_5$ threshold so any given connection x will end up with an amount of bandwidth between $T_4(x)$ and $T_5(x)$.

As in the input node, it is not expected that $\Sigma Min(y) \geq C$. $T_2$ makes sure that bandwidth is going to connections that both think they need it (as represented by the Max(x) term) and think their input node will let them use it (as represented by the BW_In(x) term). After this second threshold, the bandwidth the output node is passing out may not be used by connections because either they do not need it (BW_Out(x) >Max(x)) or their input nodes will not allow them to use it (BW_Out(x)>BW_In(x)).

$T_3$ is a value judgment. It is more likely that the BW_In(x) value will be below the actual bandwidth the input node could give a connection than the Max(x) value will be below the bandwidth a connection could use. BW_In is often low because some connections will have BW_Out(x)<BW_In (x). This will free up some of the bandwidth that has been tentatively set aside for these connections. This freed up bandwidth can be claimed by connections with BW_Out(x) >BW_In(x). It would, of course, be possible to make $T_3$=BW_In(x) or even remove $T_3$ entirely.

6.6.3 Process C Modifications

Each of the nodes does not have to have capacity C. If node z has capacity $C_z$, it would be a simple change to use the node specific $C_z$ values in the process. It is possible to use different sets of weights between each pair of thresholds. This would require each connection to have several weights but it certainly could be done.

6.7 Rate Assignment: Process C+

Process C+ is related to process C, as described below. A distributed hardware architecture is also described below for implementing processes C and/or C+.

Process C+ approximates the bandwidth allocations of VLs (or connections or sets of connections) produced by process A with a lower computational complexity. Process C+ is designed around the assumptions that the VL rates are updated synchronously, the update period is fixed, and there is a central location where all, or most, of the calculations take place.

Process C+ determines the PCRs for all of the VLs using several steps. First, each VL creates an estimate of how many cells it would like to send in the next update interval. These rates are known as the desired rates, $r^{des}$. Second, these rates are sent to a central location where most of the rate calculations take place. Third, using the desired rates, the available bandwidth of each input port is distributed fairly among the VLs passing through the port, in effect creating the requested rates, $r^{req}$. A single parameter per input port, the requested rate factor, x*, is found. The requested rates can be determined from this quantity. Fourth, using the desired and requested rates, the bandwidth of each output port is distributed fairly among the VLs, creating the granted rates, $r^{gnt}$. Fifth, the granted rates are sent from the central location to the input ports.

Figure 21:
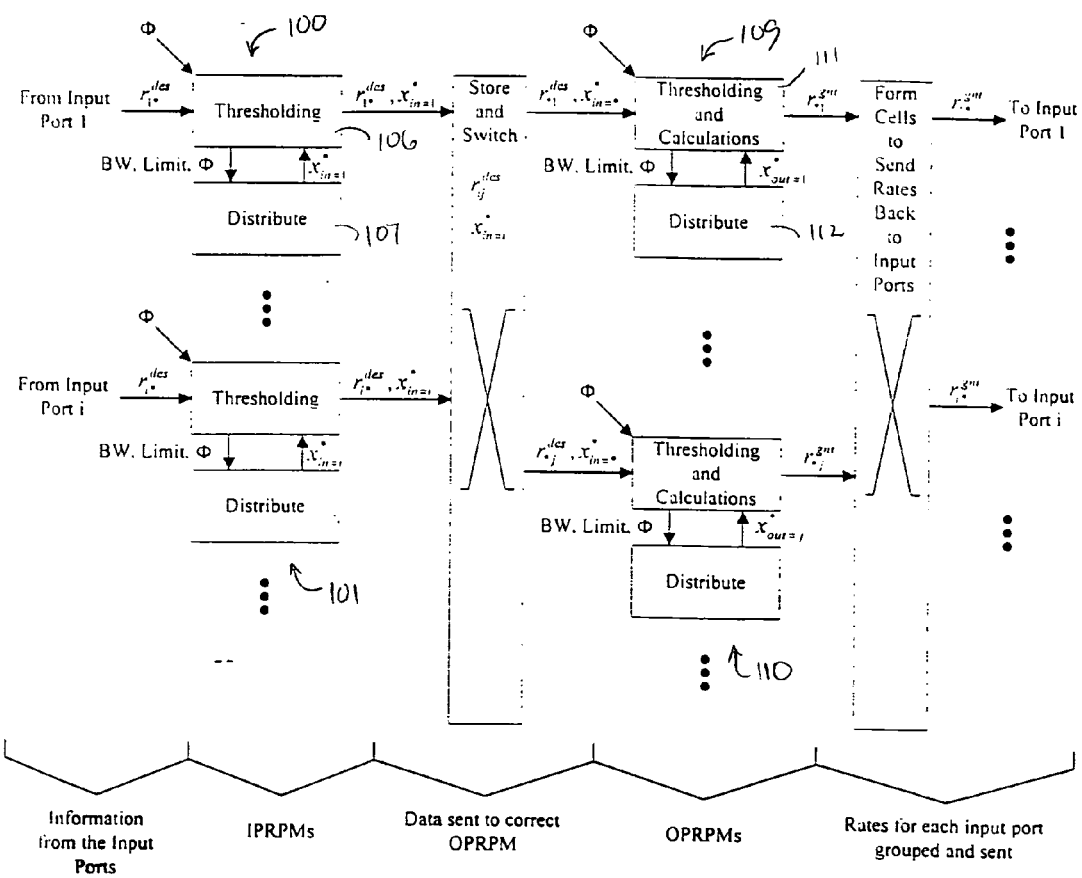
FIG. 21 is a block diagram for a process C+Central Rate Processing Unit (CRPU) (process C+described below).

FIG. 21 shows a block diagram for a process C+ Central Rate Processing Unit (CRPU), where most of process C+ may be performed. The notation will be explained in the sections that follow. The asterisk is used in FIG. 21 to mean "all." Thus, $r_{i,*}^{des}$ symbolizes the desired rates for VLs from input port i to all of the output ports. This usage should not be confused with the asterisk in x* below. Information in FIG. 21 flows from left to right. At the far left, the desired rates arrive from the input ports, where each input port determines a desired rate for each VL that originates at that port. This information enters an Input Port Rate Processing Modules (IPRPM) 100,101, each of which includes a Thresholding block 106 and a Distribute block 107. The IPRPMs, one for each port, find the rate factor values, x*, that define the requested rates. These x* values and the desired rates are sent to appropriate Output Port Rate Processing Modules (OPRPM) 109,110.

The OPRPMs (one for each output port) include Thresholding/Calculation blocks 111 and Distribute block pairs 112. These blocks use the desired rates and the requested rates, which they calculate from the requested rate factors, to calculate their own rate factor values, which they then convert to granted rates. The granted rates are grouped appropriately and sent to the input ports.

This particular architecture features an amount of redundancy. All of the Distribute blocks are identical. All of the IPRPMs are identical, as are the OPRPMs. It may be possible to use fewer IPRPMs and OPRPMs by reusing these blocks for multiple input or output ports. This would increase the run time of processes C and C+.

6.7.1 The Desired Rates

At the start of the rate update process, the VLs calculate a desired rate. One factor affecting a VL's desired rate is the amount of traffic queued at the input port for that VL. If a VL has a lot of traffic waiting to be served, its desired rate will be high. If a VL has a small amount of traffic waiting, its desired rate will be lower. The relationship between a VL's queue depth and its desired rate may be linear or it may be a more complicated non-linear function. Another quantity that may factor into the desired rate is a minimum rate. Certain connections may be so important that they require some non-zero rate even if they have no traffic currently queued. If the update interval is long, then prediction may play a part in the desired rate as well. For example, if the update interval is only 256 cell slots, then prediction may not be necessary and the few minimum rates needed will be small.

As an example, consider a VL going through input node i and output node j. Assume that the VL has a queue depth of q and a minimum rate of m. Letting M be the interval length, one possible desired rate formula would be $$r^{des}(i,j)=\min\{M,\max\{m,q\}\} \quad (45)$$

The min{ } term in equation (45) prevents the VL from asking for more cell sending opportunities than there are in an interval.

6.7.2 Sending Desired Rates to A Central Location

After all of the VLs at an input port have determined their desired rates, the desired rates must be sent to the central location (the CRPU) where the rate determinations take place. The data may be of any format. It should be capable of handling every VL requesting M slots. At the CRPU, each IPRPM needs information from only one input port. So, the payload of each cell received by the CRPU only needs to be routed to a single IPRPM.

6.7.3 IPRPM Calculations—the Requested Rates

Process C+ considers each input port independently even though the desired rates from all of the VLs are all at one location. In contrast, process A considers all of the information from all of the ports simultaneously. The independence of process C+ reduces the number of operations that process C+ needs to perform and allows this portion of process C+ to be operated in a parallel manner.

At each IPRPM, the data from one input port is used. The desired rates of the VLs passing through the port are examined and the bandwidth of the input port is divided among the VLs. Each VL will be awarded a requested rate, $r^{req}(i,j)$. The sum of these rates is equal to, or less than, the capacity of the input BTM link, C. These rates represent how the input port would divide up its bandwidth if the output ports were not a concern. When examining a specific input node, the set of desired rates plays a role. If the sum of the desired rates is equal to, or less than, C, then all of the requested rates equal the desired rates. If the sum of the desired rates is greater than C, then the bandwidth of the input node is divided up in a weighted fair manner (using a fixed set of weights $\{\phi_{ij}: i,j=1,\ldots,N\}$) among the VLs, with no VL receiving more than its desired rate.

The following pseudo-code shows how this phase of the process works. The subroutine Distribute(BW=R, Limit=L, Weights=$\phi$) returns a single parameter, $X_{in=i}^*$, known as the requested rate factor. The requested rate for each VL can be determined from this factor as $$r^{req}(i,j)=\min\{\phi_{ij}x_{in=i}^*,r^{des}(i,j)\}. \quad (46)$$

The Distribute subroutine distributes an amount of bandwidth equal to R in a weighted fair manner, using the weight vector $\phi$, allowing no VL to accept additional bandwidth exceeding its entry in a limit vector L. The inner workings of this subroutine are discussed below. For input port i, IF $\Sigma_{j=1}^{N} r^{des}(i,j) \geq C$
   THEN $x_{in=i}^*$=Distribute(BW=C, Limit=$r^{des}$, Weights=$\phi$)
   ELSE $x_{in=i}^*$=very large number If $\Sigma_{j=1}^{N} r^{des}(i,j) < C$, then the sum of all the desired bandwidth is less then the bandwidth available. So, every VL should get a requested rate equal to its desired rate. Since $r^{req}(i,j)=\min\{\phi_{ij}x_{in=i}^*,r^{des}(i,j)\}$, setting $x^*$ high means $r^{req}=r^{des}$ (this corresponds to the ELSE clause). If there is not enough bandwidth to let $r^{req}=r^{des}$ for every VL, then the THEN clause calls the Distribute subroutine to divide the available bandwidth, C, among the VLs. The Distribute subroutine does this by finding the optimal $x^*$ value.

The single parameter $x^*$ is used because it is quicker and easier to pass than numerous requested rate values. In FIG. 21, the IF-THEN statement above is performed by Thresholding block 106. If needed, this block passes any necessary information into Distribution block 107, which performs the Distribution subroutine.

6.7.4 OPRPM Calculations—The Granted Rates

At this point, the desired rates and requested rate factors are sent to the OPRPMs. At an OPRPM, the requested rates are determined for the VLs terminating at the port from the requested rate factors. Now, armed with estimates of what rates all the VLs could use (the $r^{des}$ rates), and what each input node could give each VL (the $r^{req}$ rates), it is time to calculate the rates the output ports will grant to the VLs. These rates are the granted rates, $r^{gnt}$. The output port phase of the process uses the four sets of thresholds shown below for output port j.

$$T_0(i)=0$$

$$T_1(i)=\min\{r^{req}(i,j),r^{des}(i,j)\}$$

$$T_2(i)=r^{des}(i,j)$$

$$T_3(i)=C$$

When passing out the bandwidth of an output port, all of the VLs must reach any threshold before any VL moves beyond the threshold. For instance, if the capacity of a port lies between the sum of the first threshold and the sum of the second threshold ($\Sigma T_1 < C \leq \Sigma T_2$), then all of the VLs will start at $T_1$ and increase in proportion to their weights from there. If a VL reaches $T_2$, it is frozen and does not move beyond $T_2$. In pseudo-code, the granted rate factor, $x_{out=j}^*$, can be determined as follows.

IF $$\sum_{i=1}^{N} T_1(i) \geq C$$

THEN k=0 {Case 0 below}
ELSE IF $$\sum_{i=1}^{N} T_2(i) \geq C$$

THEN k=1 {Case 1 below}
ELSE k=2 {Case 2 below}
Now, $$x_{out=j}^*=\text{Distribute}(BW=C-\Sigma T_k, \text{Limit}=T_{k+1}-T_k, \text{Weights}=\phi) \quad (47)$$

and $$r^{gnt}(i,j)=T_k(j)+\min\{\phi_{ij}x_{out=j}^*,T_{k+1}(j)-T_k(j)\}. \quad (48)$$

The object of the foregoing pseuodcode is to have the granted rates for all of the VLs fall between the same pair of thresholds. That is, all VLs passing through the same output port should get a granted rate that is between their $T_0$ and $T_1$, $T_1$ and $T_2$, or $T_2$ and $T_3$ thresholds. There should not be a VL with a granted rate between its $T_0$ and $T_1$ thresholds and another with a granted rate between its $T_1$ and $T_2$ thresholds. The IF-THEN-ELSE statements in the pseudocode determine if all of the granted rates will be between $T_0$ and $T_1$ (case 0), $T_1$ and $T_2$ (case 1), or $T_2$ and $T_3$ (case 2). To fall under case k, there must be enough bandwidth to give each VL at least a granted rate equal to its $T_k$ value, but not enough to give each VL a granted rate equal to its $T_{k+1}$ value. Thus, every VL starts with a bandwidth equal to its $T_k$ value and the remaining bandwidth of $(C-\Sigma T_k)$ is divided among the VLs by the Distribute subroutine in a fair way. Each VL may receive at most additional bandwidth of $T_{k+1}-T_k$, since no VL may exceed its $T_{k+1}$ threshold. The granted rates are calculated using equation (47).

The IF-THEN-ELSE code is performed by the Thresholding/Calculation blocks in FIG. 21. These blocks pass the necessary information to the Distribute blocks, which find the granted rate factors $x_{out=j}^*$. The Thresholding/Calculation blocks 109 then determine the granted rates.

6.7.5 Sending Granted Rates to Input Ports

After all of the granted rates have been determined, the granted rates must be sent back to the appropriate input port, where they can be used by the local schedulers. The granted rates for each input port are gathered together before they can be sent to the input port, since each input port has a granted rate at every OPRPM. The data may be of any format.

6.7.6 The Distribute Subroutine

The main computational burden of process C+is in the Distribute subroutine (a.k.a. the Averaged Generalized Processor Sharing, or AGPS, process). Since the Distribute subroutine runs many (e.g., 2N times where N is the number of ports) times per update interval, this subroutine forms the heart of process C+. If this subroutine can be performed quickly, then process C+ can be performed quickly.

There are some differences between the way the Distribute subroutine has been defined here and the way it is defined in later sections, even though the basic purpose of the subroutine remains unchanged. Most importantly, the Distribute subroutine described here returns a rate factor (x*) that can be used to calculate rates. Versions of the subroutine that are described later determine x*, but then determine and return all of the rates.

A hardware implementation may be used to implement the Distribute subroutine. The Distribute Subroutine Module (DSM) architecture described here performs the Distribute subroutine operations in parallel. Before discussing this architecture, however, it is necessary to describe what the Distribute subroutine does.

Figure 22:
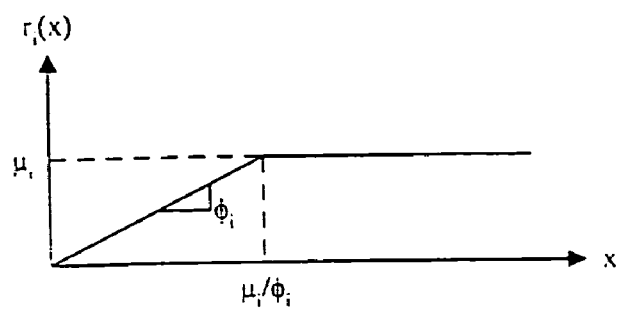
FIGS. 22 and 23 are graphs showing bandwidth/rate $\{R(x)\}$ allocations.

Fundamentally, the equation underlying the Distribute subroutine is constructed of N functions of the form $$r_i(x)=\min\{\phi_i x, \mu_i\}, \quad (49)$$

where each function corresponds to a VL and i denotes the VL bound for output port i if this calculation is being done in an IPRPM or the VL coming from input port i if this calculation is being done in an OPRPM. μ equals the bound on the amount of additional bandwidth the VL can accept before it hits its limiting threshold ($\mu_i$=Limit(i)=$T_{k+1}$(i)−$T_k$(i)) while φ is the weight of the VL. The basic shape of one of these functions is shown in FIG. 22.

Summing the N functions results in a new function that determines how the port's bandwidth will be divided, $$R(x) = \sum_{i=1}^{N} r_i(x). \quad (50)$$

Figure 23:
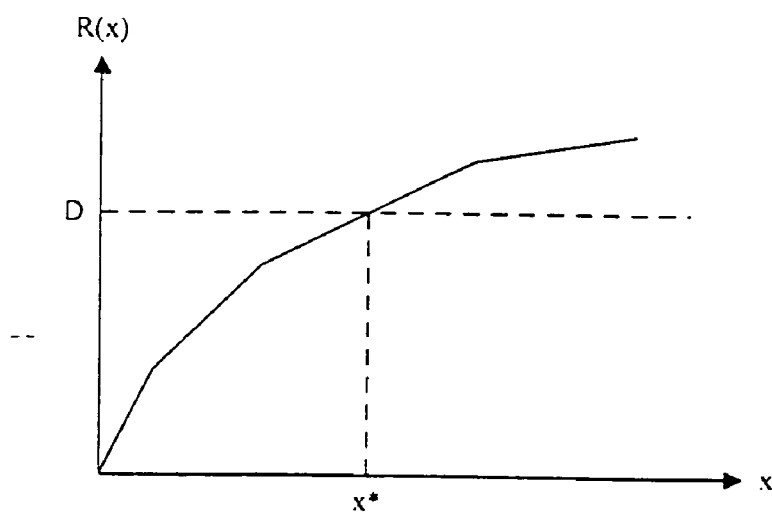

The Distribute Subroutine finds the value of x for which R(x) equals the amount of bandwidth that needs to be passed out, D. This function is shown in FIG. 23. As x is increased, a VL accepts bandwidth at a rate proportional to its weight (the $\phi_i x$ term in eq. (49)) until it reaches its limit (the $\mu_i$ term in eq. (49)), after which it does not accept any additional bandwidth, no matter how large x becomes. Thus, the slope of R(x) decreases with x because more VLs are frozen for larger x values. When R(x)=D, all of the free bandwidth has been passed out. A closed form solution to this problem does not exist.

The most convenient form to write the problem in is $$g(x)=D-R(x). \quad (51)$$

In this form, the fundamental task becomes finding the root of the function of eq. (5). Let x* be the value of x such that g(x*)=0. Once x* has been found, the amount of extra bandwidth VL i receives is $r_i(x^*)$. Note that g(x) is not differentiable at the points where $x=\mu_i/\phi_i$. To deal with this, the slope of $r_i(\mu_i/\phi_i)$ will be taken as zero. Otherwise this finite set of points will be ignored.

6.7.7 Reformulating R(x)

The first step towards finding x* in a parallel manner is to reformulate R(x). To this end, examine $r_i(x)=\min\{\phi_i x, \mu_i\}$. Note that the cut-off, where the minimum shifts from $\phi_i x$ to $\mu_i$, occurs at $x=\mu_i/\phi_i$ (see FIG. 1 also). Thus, $r_i(x)$ can be written as $$r_i(x)=s_i x+m_i \quad (52)$$

where $$s_i(x) = \begin{cases} \phi_i & x < \mu_i/\phi_i \\ 0 & \text{otherwise} \end{cases} \quad (53)$$

and $$m_i(x) = \begin{cases} 0 & x < \mu_i/\phi_i \\ \mu_i & \text{otherwise.} \end{cases} \quad (54)$$

Note that $s_i$ and $m_i$ are functions of x even though this dependence will often be suppressed. Now, rewriting R(x) gives $$R(x) = \sum_{i=1}^{N} r_i(x) \quad (55)$$
$$= \sum_{i=1}^{N} [s_i x + m_i]$$
$$= x \sum_{i=1}^{N} s_i + \sum_{i=1}^{N} m_i.$$

By writing R(x) this way, only a single multiplication, instead of N multiplications, is needed.

6.7.8 Newton-Raphson Method

One method for finding the roots of an equation is Newton's method (i.e., the Newton-Raphson method). This method involves a sequence of guesses of x which approach x*. The update formula is $$x_{k+1} = x_k - \frac{f(x_k)}{f'(x_k)}, \qquad (56)$$

where f(x) is the equation to solve.

To find the root of g(x) (eq. (51)) start by rewriting g(x) using equation (56), $$g(x) = D - R(x) = D - x\sum_{i=1}^{N} s_i - \sum_{i=1}^{N} m_i. \qquad (57)$$

Now the derivative of g(x) with respect to x is $$g'(x) = -\sum_{i=1}^{N} s_i. \qquad (58)$$

Thus, $$\begin{aligned}
x_{k+1} &= x_k - \frac{g(x_k)}{g'(x_k)} \\
&= x_k - \frac{D - x_k \sum_{i=1}^{N} s_i - \sum_{i=1}^{N} m_i}{-\sum_{i=1}^{N} s_i} \\
&= x_k - \frac{-x_k \sum_{i=1}^{N} s_i}{-\sum_{i=1}^{N} s_i} - \frac{D - \sum_{i=1}^{N} m_i}{-\sum_{i=1}^{N} s_i} \\
&= x_k - x_k + \frac{D - \sum_{i=1}^{N} m_i}{\sum_{i=1}^{N} s_i} \\
&= \frac{D - \sum_{i=1}^{N} m_i(x_k)}{\sum_{i=1}^{N} s_i(x_k)}
\end{aligned} \qquad (59)$$

So given $x_k$, $s_i$ and $m_i$ are determined for VLs 1 through N by determining whether $x_k$ is greater than or less than $\mu_i/\phi_i$. After summing the $s_i$ and $m_i$ values, $x_{k+1}$ can be determined using equation (59). This process can be performed in parallel by determining all of the $s_i$ and $m_i$ values simultaneously.

6.7.9 Block Diagram of Distribute Subroutine

Figure 24:
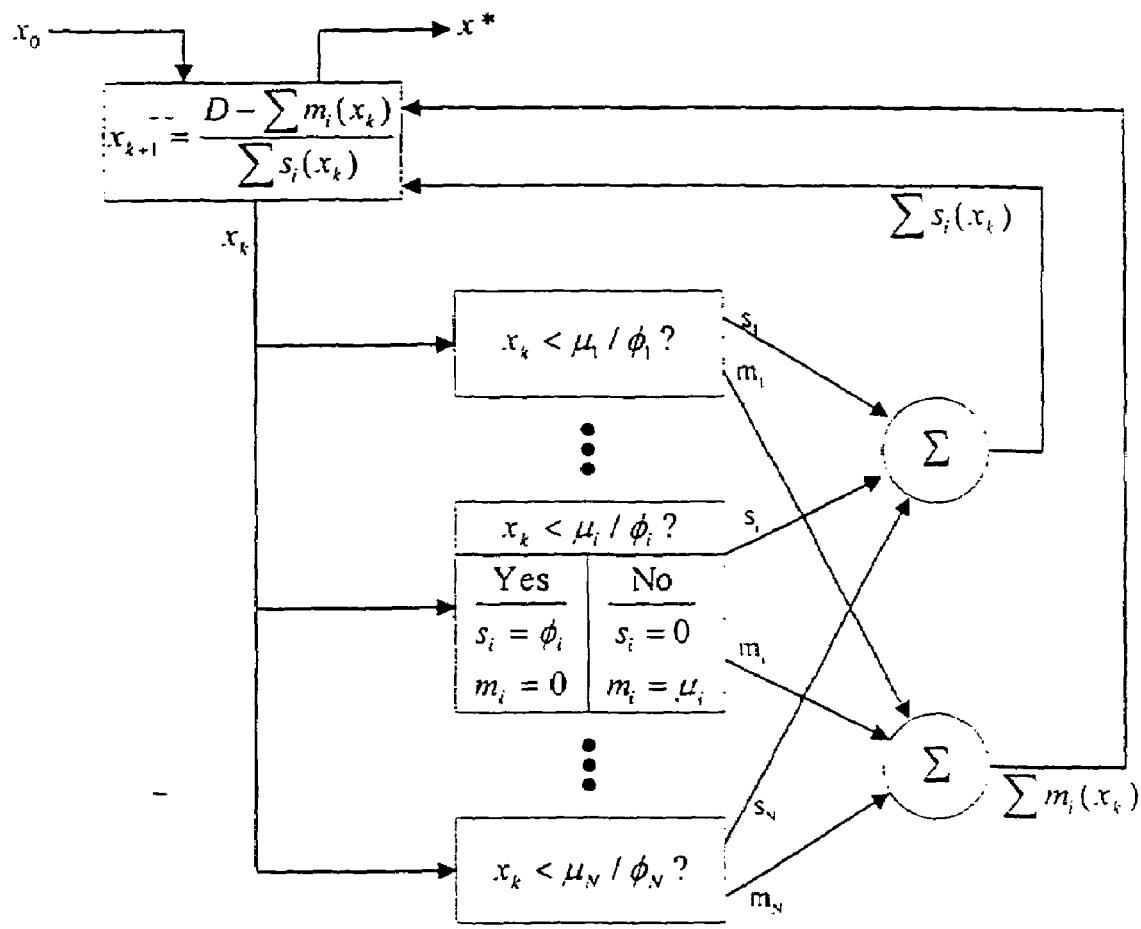
FIG. 24 is a block diagram showing one implementation of the Distribute Subroutine Module (DSM).

A block diagram of a Distribute Subroutine Module (DSM) is shown in FIG. 24. This module can be used to find x*. This figure shows one implementation of the Distribute blocks in FIG. 21. Note that all of the $\phi_i$ and $\mu_i$ values are input into the appropriate comparison blocks. The DSM could calculate the $\mu_i/\phi_i$ values or they could be read in. Note that the values $1/\phi_i$ can be predetermined and updated as the weights change, e.g., when connections are added or deleted.

Some method of stopping the iterations could be used to detect when $x_k$ reaches, or comes close to, x*. For now, it will be assumed that a fixed number of iterations, say five, will be run in all cases. While this many iterations may be more than necessary in some cases and not enough in others, this simplification allows the maximum run time to be consistent in all cases. The initial guess should be $$x_o = D \bigg/ \sum_{i=1}^{N} \phi_i. \qquad (60)$$

The value $1/\Sigma\phi_i$ can be predetermined to speed the operation of the process.

The main computational elements of this architecture are the two sums and the divide in the update eq. (59). If the adders are constructed using a cascade of two input adders, then N−1 adders are needed for each. A total of 2N−2 two-input adders would be needed. The complexity of the division will depend on the number of bits used for the data.

6.8 Rate Assignment: Process D

Process C runs the Distribute subroutine, or DSM, to pass out bandwidth to connections passing through each node. Process D details several possible implementations of the DSM. In all cases, it is assumed the DSM knows the following information:

X, the set of connections

BW, the set of current bandwidths for the connections

T, the set of thresholds for the connections $\phi$, the set of weights for the connections C, the capacity of the node.

Some or all of this information may be passed into the DSM with each call and some of it may be given to the DSM on a semi-permanent basis when a connection is established or removed.

The foregoing information is somewhat different from the information that is being passed to the DSM in process C. For instance, in process C, C−ΣBW(x) was passed. In process $B^{alive}$=set of connections that are still accepting additional bandwidth Step 1:

FOR All x, IF BW(x)<T(x) THEN put x in $B^{alive}$

{If BW(x)<T(x), then connection x can be allowed to grow. If BW(x)=T(x), connection x should not be given any more bandwidth.}

Step 2:

$$\text{FOR } x \, B^{alive}, \, b_x = \frac{T(x) - BW(x)}{\phi_x}$$

{For each non-frozen connection, calculate how much the connection's bandwidth could expand before reaching its limit.}

Step 3:

$$b^c = \frac{T(x) - \sum_{all\ x} BW(x)}{\sum_{X \in B^{alive}} \phi_x}$$

{Calculate how much all connections could expand before running out of bandwidth if no connection would reach its limit first.}

D, C and BW(x) values are passed separately and C−ΣBW(x) is determined in the DSM.

Connection x has bandwidth BW(x) ($\leq T(x)$) before the Distribute subroutine is run. The DSM will return a new set of bandwidths such that BW(x)$\leq$T(x) for all x and $$\sum_{all\ x} BW(x) = C.$$

The new rates are returned in the BW(x) variables. Note that the bandwidths assigned to a connection are not decreased by the DSM. The rates will only increase or stay the same.

6.8.1 First Implementation Of The DSM

The first process finds bandwidth in a manner similar to process A, i.e., it slowly grows the rates until they hit a limit or the total supply of bandwidth is exhausted. On every pass through the process, an expansion coefficient is determined for each connection. The lowest of these coefficients is found and all of the connections' bandwidths are expanded by this amount. The connections that have reached their limit are removed from the set of connections that are still accepting additional bandwidth. The process repeats until all of the bandwidth has been passed out. This process operates as follows:

Step 4:
$b^{min}$=min{$b_x$, for all x B$^{alive}$}
{Find the smallest amount of bandwidth expansion possible before some connection reaches its limit}

Step 5:
IF $b^c < b^{min}$ THEN GOTO Step 9
{If $b^c < b^{min}$, the node runs out of bandwidth to distribute before another connection would reach its limit.}

Step 6:
FOR x B$^{alive}$, BW(x)=BW(x)+$\phi_x \cdot b^{min}$
{The bandwidth of each non-frozen connection is increased by $\phi_x \cdot b^{min}$.}

Step 7:
FOR x B$^{alive}$, IF BW(x)=T(x) THEN remove x from B$^{alive}$
{Connections that reach their limit are frozen by removing them from the set of connections eligible to expand.}

Step 8:
FOR x B$^{alive}$, $b_x = b_x - b^{min}$
{Calculate how much non-frozen connections can now expand.}

Step 10:
GOTO Step 3

Step 11:
FOR x B$^{alive}$, BW(x)=BW(x)+$\phi_x \cdot b^c$
{The bandwidth of each non-frozen connection is increased by $\phi_x \cdot b^c$. Since there is no more bandwidth to distribute, the process ends.}

Step 2 may require up to N (N$\geq$1) (the number of VLs, more if connections, and not VLs, are being scheduled) divisions. This step only has to be performed once, however. In addition, step 2 involves dividing by the $\phi$ values. Since these weights do not change each time the DSM is called, it is possible to store a table of 1/$\phi$ values. This would reduce the worst case step 2 to N multiplies. Step 3 requires a single division but it has to be performed on each iteration. Since there can be up to N iterations in the worst case, this step could add up. A potentially large number of multiplications occur in steps 6 and 10 and a min{ } operation is performed in step 4.

6.8.2 Second Implementation Of The DSM

Bandwidth can be distributed using a calendar in a manner similar to process B. In fact, a single, slight modification to the single node process B is all that is needed. Instead of starting each Slots(x) value at 0, it should be started at the appropriate value for the bandwidth already awarded to connection x. (Total should not be started at 0 either) This process uses no divides, no multiplies, and no additions. It does use some IF-THEN's and some increments.

The amount of processing power needed for this process may vary greatly from one run to the next depending on the input variables. It may take a number of passes through the calendar to pass out all of the bandwidth. So, the worst case number of operations may be higher than the average number of operations. In addition to the work done in performing the process itself, the calendar needs to be constructed. This can occur in parallel to rate assignment.

It is possible to cap the number of times the process goes through the calendar. After this limit has been reached, the remaining slots can be assigned without regard to the connections' limiting values. This would give extra bandwidth to connections with large weights that have already reached their limits at the expense of connections with small weights that have not yet reached their limits.

6.8.3 Third Implementation Of The DSM

This process uses relatively few operations. After a quick check to find out what connections are already close to their threshold values, the bandwidth is divided up in a weighted fair fashion.

Step 1:

$$BW^{extra} = C - \sum_{All\ x} BW(x)$$

{Calculate how much extra bandwidth there is to divide up among connections.}

Step 2:
FOR All x, IF T(x)>BW(x)+$\gamma$ THEN put x in B$^{alive}$
{Only give more bandwidth to a connection if its current bandwidth is more that $\gamma$ below its limit.}

Step 3:

$$b = \frac{BW^{extra}}{\sum_{X \in B^{alive}} \phi_x}$$

{Calculate how much expansion is possible.}

Step 4:

FOR x $B^{alive}$, $BW(x)=BW(x)+\phi_x \cdot b$

{Give new bandwidth to eligible connections.}

This process requires a single division. One drawback of this process is that it is possible for connections to end up with bandwidths that exceed their thresholds. In particular, connections with large weights and thresholds slightly greater than $\gamma$ plus the current bandwidth will receive bandwidth far above their threshold values, where $\gamma$ is an adjustable parameter, possibly zero. The next process addresses this problem by examining each connection, limiting each connection to $T(x)$, and then making additional iterations to pass out any bandwidth this frees up.

6.8.4 Fourth Implementation Of The DSM

In this process, all of the remaining bandwidth is given to connections that are still accepting bandwidth without regard to the connections' bandwidth limits. Each of the connections is then examined. Connections that have been awarded bandwidth in excess of their limits have their bandwidth reduced to their limits. The extra bandwidth is returned to the unassigned bandwidth bucket to be passed out in the next iteration. These connections are also removed from the set of connections accepting more bandwidth. In short, the extra bandwidth is distributed to the connections and then any extra is returned. This is in contrast to the processes described above in sections 6.8.1 and 6.8.2. In those processes, bandwidth is distributed fairly. No connection receives bandwidth in excess of its limits.

Step 1:

$$BW^{extra} = C - \sum_{All\ x} BW(x)$$

{Calculate how much extra bandwidth there is to divide up among connections.}

Step 2:

FOR All x, IF $BW(x)<T(x)$ THEN put x in $B^{alive}$

{Only connections that have not reached their bandwidth limit are eligible to receive additional bandwidth.}

Step 3:

$$b = \frac{BW^{extra}}{\sum_{X \in B^{alive}} \phi_x}$$

{Calculate expansions factor.}

Step 4:

FOR x $B^{alive}$, $BW(x)=BW(x)+\phi_x \cdot b$

{Increase bandwidth of each non-frozen connection by $\phi_x \cdot b$.}

Step 5:

FOR x $B^{alive}$, IF $BW(x) \geq T(x)$ THEN $BW(x)=T(x)$, remove x from $B^{alive}$ {If a connection's bandwidth is now above its limit, set the connection's bandwidth to its limit and remove the connection from the set of connections eligible to receive more bandwidth.}

Step 6:

$$BW^{extra} = C - \sum_{All\ x} BW(x)$$

{Calculate how much non-allocated bandwidth is still left to distribute.}

Step 7:

IF $BW^{extra} \neq 0$ THEN GOTO Step 3

{If there is no unallocated bandwidth remaining, end the procedure. If not, perform another loop.}

There is only one division per iteration with this process (step 2), since all of the connections use the same b value. Since this process may have at most $N(N \geq 1)$ (the number of VLs, more if connections are being considered) iterations there can be at most N divisions. Step 3 involves a number of multiplications which could be costly.

One possible alteration to this process would be to cap the number of iterations that the process can perform. Although the worst case is N iterations, the process may be very close to the final values after many fewer steps. If the process were stopped after, e.g., 10 iterations, some of the connections would be above their threshold values. (Assuming the process is stopped between steps 4 and 5.) While this is unfair to the other connections it is not going to cause any fatal errors.

As a variation on this process, the $B^{alive}$ set could be eliminated. Bandwidth would be offered to all of the connections on each iteration. While this would eliminate the trouble of dealing with the $B^{alive}$ set, it would cause the convergence of the process to slow. This is especially true if several connections with large weights have reached their limits. They would keep being given large amounts of additional bandwidth, which they would keep giving back. This variation would resemble modification 2 in process B (section 6.5.4). In both processes, bandwidth is distributed to all of the connections, but then taken away from connections that exceed their limits.

6.9 Rate Assignment: Process E

Described here are two processes that perform the DSM of process C. They serve the same purpose as the process D subroutines. These two processes have been designed to reduce the number of memory accesses during rate assignment. This is done in order to reduce process run-time, thereby making a short update interval possible.

Each of these processes starts with the expansion coefficients, namely the $b_i$ values. If these coefficients are not sent by the input ports, then their values must be determined. This additional step will increase the time needed to run the process unless these values can be determined as the data arrives from the input ports.

6.9.1 Process I

The first process sorts the set of expansion coefficients and then works its way through this sorted list. The pseudocode for this process, set forth below, operates as follows. Although described here in terms of VLs, this process would also work for any switch connections or sets of connections.

$VL_j$ adds bandwidth at a rate of $\phi_j$ as the expansion factor grows until the VL reaches its limit. Once the VL has reached its limit, its bandwidth does not increase as b grows. Thus, if all of the VLs are below their limit, the total amount of bandwidth that has been distributed grows as $\Sigma \phi_j$ as b increases. If VL k is the first VL to reach its limit, the total bandwidth distributed grows as $\Sigma \phi_j - \phi_k$ after VL k reaches its limit until the next VL, say VL 1, reaches its limit. At this point, the bandwidth grows as $\Sigma\phi_j-\Sigma_k-\Sigma_l$, and so on. If VL k can grow by $b_k\phi_k$ before it reaches its limit, then b can only increase by $b_k$ before VL k stops accepting more bandwidth. The VL with the smallest $b_j$ will be the first VL to stop accepting more bandwidth as b grows. The VL with the second smallest will be the second, and so on. The following pseudocode increases b (called $b^{TOT}$) until either all of the extra bandwidth has been distributed or a VL reaches its limit ($b^{TOT}$ reaches the $b_j$ value of some VL). In the former case the procedure terminates. In the later case the code calculates how quickly the total bandwidth distributed will be increasing until the next VL reaches its limit.

```
1   Sort 128 b_j values.
    (Rename them b_j', b_1'<...< b_128', and call their associated
    weights φ_1', ... , φ_128'.) {Sort expansion coefficients
    from smallest to largest.}
2   s = Σφ_j {This is how fast the total bandwidth that has
    been distributed grows as b^TOT increases until the first
    VL reaches its limit.}
3   b^TOT=0 {b^TOT starts at zero.}
4   BW=0 {No additional bandwidth has been passed out yet.}
5   i=0 {Counter starts at zero.}
6   b_0'=0, φ_0'=0 {These are needed for steps 10 and 14 to
    work when i=0}
7   WHILE BW<C {As long as the additional bandwidth passed
    out hasn't exceeded the total amount available to pass
    out, perform loop below that passes more bandwidth out.}
8   BEGIN(WHILE LOOP)
9   i=i+1
10  Δb=b_i'-b_{i-1}' {Amount bandwidth may expand before next VL
    reaches its limit.}
11  BW'=BW+sΔb {Total bandwidth distributed increases by sΔb
    as long as BW' does not exceed C.}
12  IF BW'>C {check to see if this would pass out too much
    bandwidth.}
13  THEN Δb=(C-BW)/s, BW=C {BW' is too large. Expand by
    this Δb instead to pass out exactly C.}
14  ELSE BW=BW' {BW' is OK so BW=BW'. Reduce s by the φ
    value of the VL that reached its limit.}
15  b^TOT=b^TOT+Δb {Add additional expansion to running total
    of expansion so far.}
16  END (WHILE LOOP)
```

The sort in line 1 is a costly operation in terms of memory accesses. The number of memory accesses for this operation should be between $N \log_2 N$ and $\log_2 N!$ It should be noted that this sort could be performed as the data arrives at the processor if data is arriving slowly enough. For instance, if data from each input port is read from a separate data cell, then each item can be placed in the sorted list as the next cell is being read. This reduces the time needed to run this process.

6.9.2 Process II

As in Process I, this process would also work for any switch connections or sets of connections instead of VLs. As before, the bandwidth given to VL i grows at a rate of $\phi_i$ with respect to b as b is increased until VL i reaches its bandwidth limit at $b_i$. After VL i reaches its limit, VL i receives no additional bandwidth as b increases above $b_i$. Thus, the total additional bandwidth passed out grows as $\Sigma\phi_j$ with respect to b, where the sum only includes VLs for which $b<b_j$. Process II divides the b axis into a series of bins, each width $\Delta b$. VL i falls into bin k if $(k-1)\Delta b<b_i\leq k\Delta b$. (VL i is in bin 0 if $b_i=0$.) In effect, $b_i$ will be approximated by $k\Delta b$. The value b does not increase continuously in this process but rather increases in steps of $\Delta b$. As b steps from $(k-1)\Delta b$ to $k\Delta b$, the total additional bandwidth passed out to all of the VLs is $\Delta b\Sigma\phi_j$, where the sum is over VLs in bin k or greater. In the pseudocode below, $c_k=\Sigma\phi_j$, where the sum is over the VLs in bin k. The amount of additional bandwidth distributed by increasing b from $(k-1)\Delta b$ to $k\Delta b$ is $(\Sigma\phi_j-\Sigma c_i)\Delta b$, where the first sum is over all VLs and the second sum is over bins 0 through k−1.

```
1   Set c_i=0 in all bins
2   FOR j=1 TO 128, Add φ_j to the c value of bin dictated by
    b_j {Lines 1 and 2 find each c_k.} s = Σφ_j {Initial
    slope.}
3   
4   i=0 {Bin counter starts at zero.}
5   BW=0 {Bandwidth distributed starts at zero.}
6   s=s-c_i {Slope is reduced by sum of slopes of VLs in bin
    i}
7   BW=BW+sΔb {Bandwidth passed out so far increases by
    sΔb.}
8   IF BW<C
9       THEN i=i+1, GOTO 6 {Bandwidth has not exceeded limit
        so advance to the next bin.}
10  ELSE b=iΔb, END {Bandwidth too much, so quit.}
```

The FOR loop in line 2 requires a read and a write (read the current bin contents, $c_i$, and write the new contents, $c_i+\phi_j$) as well as search for the correct bin and an addition. The size of the bins ($\Delta b$) determines how long it will take to perform the process and how accurate the approximation is.

6.10 Rate Assignment: Process F

Process F is similar in structure to process C. Process F has a lower computational burden, however. It approximates the "Distribute" subroutine of process C using a single equation.

Like process C, process F includes an input node phase and an output node phase. Each of these phases utilizes a series of thresholds. There are two main differences between processes C and F. The manner in which the bandwidth is distributed to flows has been modified in process F to reduce the computational cost of the process. This process uses several approximations to the "Distribute" subroutine that give acceptable results. The other change from process C is the threshold values. The threshold values have been modified somewhat to enhance performance, reduce the number of operations required, and reduce the amount of communications required.

6.10.1 Input Node Phase

Each virtual link (or VP or VC or switch connection or set of connections) uses two rates to form a pair of thresholds. These two thresholds are used to form an estimate of the rate that a VL will be able to use in the next interval. This estimate takes into account both the amount of traffic the VL would like to send and the loading of the input node that this traffic must pass through. First, every VL x has a minimum guaranteed rate, $r^g(x)$ A VL will always receive a rate of at least $r^g(x)$ if it needs to use this much bandwidth. If the weights at a node are scaled so that they always sum up to one or less then this guaranteed rate is $$r^g(x)=\phi(x)C \qquad (61)$$

where C is the capacity of the node. It is also possible to set this rate to some other fixed value unrelated to the VL's weight. The rate only changes when connections are added and deleted from the VL. The second rate for a VL is re-determined for each interval. It is an estimate of the bandwidth the VL would like to receive for the next interval. For VL x, this desired rate is $r^{des}(x)$. This rate could depend on the queue depths and recent arrival patterns of the connections in the VL as well as other possible information.

The thresholds are as shown.

$$T_1(x)=\min\{r^{des}(x), r^g(x)\}$$

$$T_2(x)=r^{des}(x)$$

The input node does not award bandwidth beyond a VL's desired rate. The input node uses these thresholds to form bandwidth requests, $r^{req}(X)$, which are sent to the appropriate output nodes. $\Sigma T_1(y)$ should be less than or equal to C since $T_1(y)$ is at most $r^g(y)$ and $\Sigma r^g(y)<C$. If $\Sigma T_1(y)$ is greater than C, then an error in CAC (Connection Admissions Control) has occurred and too much traffic has been admitted. If $\Sigma T_1(y)<C\leq\Sigma T_2(y)$, then each VL gets at least its $T_1$ value. In addition, each VL gets additional bandwidth from the remaining bandwidth pool in proportion to the difference between it $T_2$ and $T_1$ thresholds. If $\Sigma T_2(y)<C$, each VL gets bandwidth equal to its $T_2$ value. Bandwidth is distributed in the following manner.

IF $\Sigma T_1(y)\geq C$
   THEN CAC Error {Too much traffic admitted.}
   ELSE IF $\Sigma T_1(y)\geq C$
     THEN {In this case $\Sigma T_1(y)<C\leq\Sigma T_2(y)$}
       $T_{ex}(X)=T_2(X)-T_1(x)$ for all x $$r^{req}(x) = T_1(x) + \frac{T_{ex}(x)}{\Sigma T_{ex}(y)}[C - \sum T_1(y)] \quad (62)$$

{Each VL gets $T_1$ bandwidth and additional bandwidth in proportion to $T_2-T_1$.}
     ELSE {In this case $\Sigma T_2(y)<C$}
       $r^{req}(x)=T_2(X)$ {Each VL receives its desired rate.}

Each $r^{req}(x)$ value is sent to the appropriate output port.

6.10.2 Output Node Phase

Each output node takes the bandwidth requests of all of the VLs passing through it and forms a peak cell rate that is sent back to the input nodes. The output node thresholds are as shown.

$$T_1(x)=\min\{r^{req}(x),r^g(x)\}$$

$$T_2(x)=r^{req}(X)$$

The peak rate for each VL can be found using the pseudocode shown below. This is similar to the Input node phase except when $\Sigma T_2(y)<C$. In this case, each VL receives $T_2$ and the remaining bandwidth is distributed in proportion to the $\phi_j$s. This gives VLs bandwidth in excess of $r^{req}$. This serves to overbook the inputs as discussed earlier.

IF $\Sigma T_1(y)\geq C$
   THEN CAC Error {Too much traffic admitted.}
   ELSE IF $\Sigma T_2(y)\geq C$
     THEN {In this case $\Sigma T_1(y)<C\leq\Sigma T_2(y)$}
       $T_{ex}(x)=T_2(x)-T_1(x)$ for all x $$r^{PCR}(x) = T_1(x) + \frac{T_{ex}(x)}{\Sigma T_{ex}(y)}[C - \sum T_1(y)] \quad (63)$$

{Each VL gets $T_1$ bandwidth and additional bandwidth in proportion to $T_2-T_1$.}
     ELSE {In this case $\Sigma T_2(y)<C$.}
       $T^{ex}(x)=C-T_2(x)$ for all x $$r^{PCR}(x) = T_2(x) + \frac{\phi(x)}{\Sigma \phi(y)}[C - \sum T_2(y)] \quad (64)$$

{This insures $\Sigma r^{PCR}=C$ for this case.}

In the foregoing process, all of the output port bandwidth is assigned. Note that in equations 62 and 63, the quantity $$\frac{1}{\Sigma T_{ex}(y)}[C - \sum T_1(y)]$$

is the same for all x. This quantity only needs to be scaled by Tex(x) for each VL. In equation 64, $$\frac{1}{\Sigma \phi(y)}[C - \sum T_2(y)]$$

is the same for each VL.

Process F depends on equations 62, 63, and 64 to produce good results. These equations can be viewed as members of a larger class of equations. In fact, it may be advantageous to replace one or more of them with another member of its class. In general, if the rates fall between two sets of thresholds, $T_j$ and $T_{j+1}$, then the bandwidth may be distributed using the general rule $$T_{ex}(x)=T_{j+1}(x)-T_j(x) \quad (65)$$

$$r(x) = T_j(x) + \frac{\phi^m(x)T_{ex}^n(x)}{\Sigma \phi^m(y)T_{ex}^n(y)}[C - \sum T_j(y)] \quad (66)$$

Note the m and n factors in this equation. Also note that each link will receive a rate of at least $T_j(x)$ and the sum of the rates will equal C. The properties of the distribution scheme will vary depending of the values of the exponents m and n.

The m=1, n=0 rule is set forth in process D (equation 66), section 6.8.3. This rule is fair in the sense that every link will receive extra bandwidth in proportion to its weight. The drawback of this rule is that the $T_{j+1}(x)$ thresholds do not come into play. In other words, some r(x) may exceed $T_{j+1}(x)$ even though other links may be below their (j+1) limit. This is especially true for links with small Tex values and larger weights.

The m=0, n=1 rule has the desirable property that no connection will exceed its $T_{j+1}$ threshold. (To see this note that $[C-\Sigma T_j]/\Sigma T_{ex}\leq 1$.) The distribution of bandwidth is not fair, however, because bandwidth is awarded proportionally to the $T_{ex}$ values, as opposed to the weights. Thus, links with large $T_{ex}$ values or small weights will receive bandwidth than they deserve.

One compromise between these two rules would be m=1, n=1. While this rule would not be perfectly fair and the rates may exceed the j+1 threshold, the m=1 advantages for small $T_{ex}$ values and large weights may be counterbalanced by the n=1 advantages for large $T_{ex}$ values and small weights. The optimal values of m and n and may depend on the traffic may not be integers.

In the rule for m=−1, n=1, since r(x)=bφ(x), this rule corresponds to distributing extra bandwidth based on how much each link may expand before it reaches the next threshold. Other rules are also possible. One class of rules has the form $$r(x) = T_{j+1}(x) - \frac{\phi^m(x)T_{ex}^n(x)}{\sum \phi^m(y)T_{ex}^n(y)}\left[\sum T_{j+1}(y) - C\right] \quad (7)$$

While this process may be less fair than process C, it is reasonably fair. The number of operations is reduced, which should make a shorter update interval possible. In addition, only a single piece of information is being passed from the input port to the output port, so the communications bandwidth is reduced.

7.0 Architecture

Figure 25:
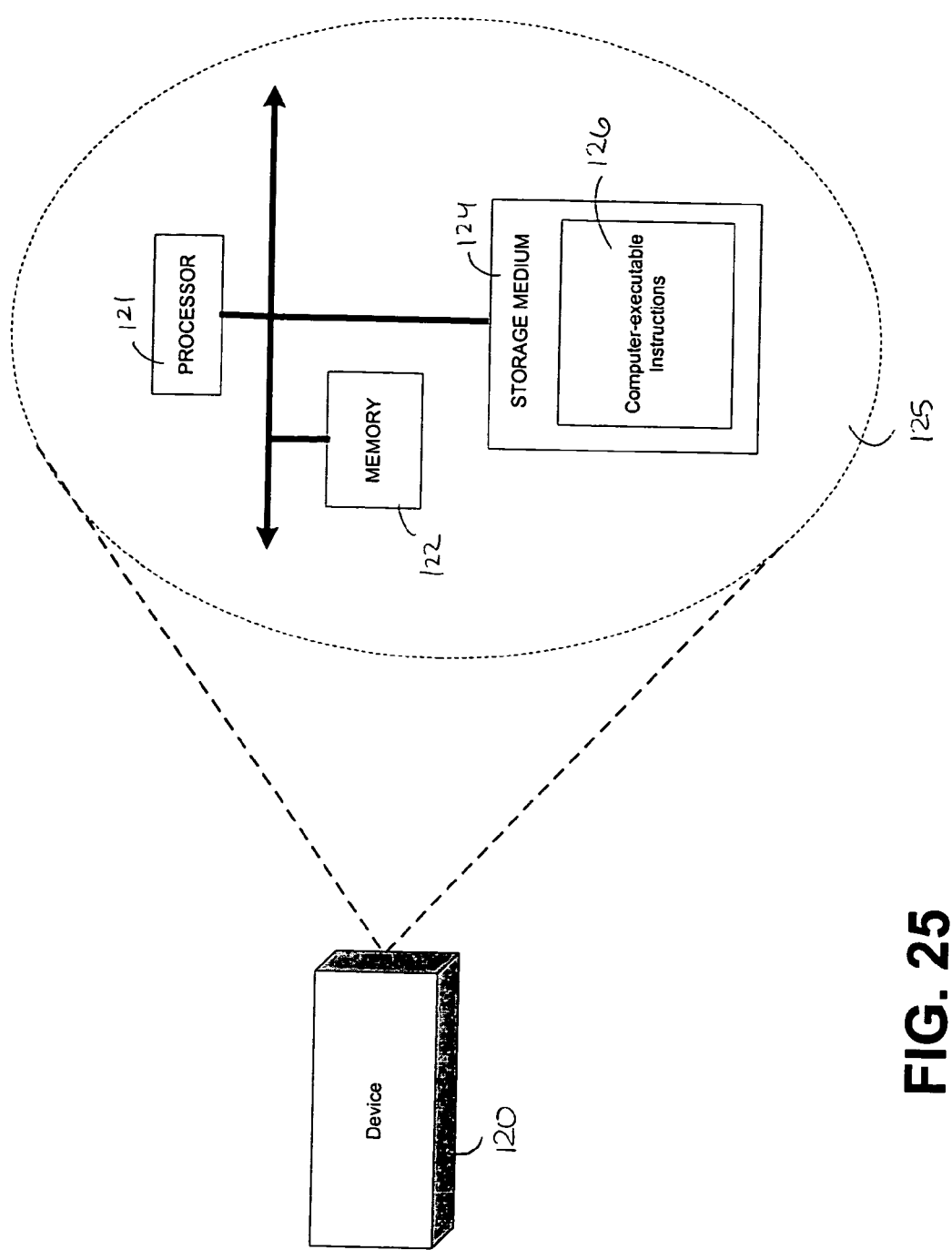
FIG. 25 is a block diagram and cut-away view of a device for performing the bandwidth allocation processes described herein.

FIG. 25 shows a device 120 (e.g., a computer, switch, router, etc.) for performing the processes of sections 1 to 6 above. Device 120 includes a processor 121, a memory 122, and a storage medium 124, e.g., a hard disk (see view 125). Storage medium 124 stores computer-executable instructions 126 for performing the processes of sections 1 to 6. Processor 121 executes computer-executable instructions (computer software) 126 out of memory 122 to perform the processes of sections 1 to 6.

The processes of sections 1 to 6, however, are not limited to use with the hardware/software configuration of FIG. 25; they may find applicability in any computing or processing environment. The processes of sections 1 to 6 may be implemented in hardware, software, or a combination of the two (e.g., using an ASIC (application-specific integrated circuit) or programmable logic). The processes of sections 1 to 6 may be implemented in one or more computer programs executing on programmable computers that each includes a processor, a storage medium readable by the processor (including volatile and non-volatile memory and/or storage elements), at least one input device, and one or more output devices. Program code may be applied to data entered to perform the processes of sections 1 to 6 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform the processes of sections 1 to 6. The processes of sections 1 to 6 may also be implemented as a computer-readable storage medium, configured with a computer program, where, upon execution, instructions in the computer program cause the computer to operate in accordance with the processes.

Other embodiments not described herein are also within the scope of the following claims. For example, any one or more facets of the processes of sections 1 to 6 may be combined, resulting in a new process.

APPENDIX

```
input = 0;
output = 1;
for (i = 0; i < num_inputs; i++){
```

APPENDIX-continued

```
    C[input][i] = input_capacity[i];
    for (j = 0; j < num_outputs; j++)
        C[input][i] -= demanded_rates[i][j];}
for (j = 0; j < num_outputs; j++) {
    C[output][j] = output_capacity[j];
    for (i = 0; i < num_inputs; i++)
        C[output][j] -= demanded_rates[i][j];}
for (j = 0; j < num_outputs; j++)
    x[output][j] = 0.0;
for (i = 0; i < num_inputs; i++)
    for (j = 0; j < num_outputs; j++)
        D[i][j] = desired_rates[i][j];
for (k = 1; k <= num_global_iterations; k++) {
    for (i = 0; 1 < num_inputs; i++) {
        for (j = 0; j < num_outputs; j++) {
            w[j] = weights[i][j];
            d[j] = D[i][j];}
        x[input][i] = dist(num_inputs, w, d, C[input][i],
    r);
        if (k == num_global_iterations)
            for (j = 0; j < num_outputs; j++)
                requested_rates[i][j] = r[j];
        else {
            freeze = 1;
            if (x[input][i] != inf)
                for (j = 0; j < num_outputs; j++)
                    if (x[output][i] != inf
                    && x[input][i] > x[output][j])
                        freeze = 0;
            if (freeze) {
                x[input][i] = inf;
                for (j = 0; j < num_outputs; j++)
                    D[i][j] = r[j];}}}
    if (k < num_global_iterations) {
    for (j = 0; j < num_outputs; j++) {
        for (i = 0; i < num_inputs; i++) {
            w[i] = weights[i][j];
            d[i] = D[i][j];}
        x[output][j] = dist(num_outputs, w, d,
    C[output][j], r);
        freeze = 1;
        if (x[output][j] != inf)
            for (i = 0; i < num_inputs; i++)
                if (x[input][i] != inf
                && x[output][j] > x[input][i])
                    freeze = 0;
        if (freeze) {
            x[output][j] = inf;
            for (i = 0; i < num_inputs; i++)
                D[i][j] = r[i];}}}
for (j = 0; j < num_outputs; j++) {
    for (i = 0; i < num_inputs; i++) {
        w[i] = weights[i][j];
            d[i] = requested_rates[i][j];}
    dist(num_outputs, w, d, C[output][j], r);
    for (i = 0; i < num_inputs; i++)
        allocated_rates[i][j] = r[i];}
```

What is claimed is:

1. A method of allocating bandwidth to committed and uncommitted data traffic flows for transfer through a network device, comprising:
   maintaining a queue size of a committed data traffic flow related to one or more committed data traffic flows for a virtual connection;
   maintaining a queue size of an uncommitted traffic flow queue related to one or more uncommitted data flows for the virtual connection;
   allocating bandwidth to a committed data traffic flow based on a guaranteed data transfer rate and the queue size of the committed data traffic flow in the network device; and
   allocating bandwidth to uncommitted data traffic flows using a weighted maximum/minimum process, wherein the weighted maximum/minimum process allocates bandwidth to the uncommitted data traffic flows in proportion to a weight associated with each uncommitted data traffic flow, and the weight corresponding to an amount of bandwidth needed by the uncommitted data traffic flow and determined based on a delay and an average rate requirement for each uncommitted data traffic flow.

2. The method of claim 1, wherein the bandwidth is allocated to the data traffic flows in discrete time intervals.

3. The method of claim 1, wherein the weighted maximum/minimum process increases bandwidth to the uncommitted data traffic flows in accordance with the weights associated with the uncommitted data traffic flows until at least one of the uncommitted data traffic flows reaches a maximum bandwidth allocation.

4. The method of claim 3, wherein the weighted maximum/minimum process allocates remaining bandwidth to remaining uncommitted data traffic flows based on weights associated with the remaining uncommitted data traffic flows.

5. The method of claim 1, wherein the bandwidth comprises data cell slots.

6. A method of allocating bandwidth to data flows passing through a network device, each of the data flows having an associated weight, the weight corresponding to an amount of bandwidth needed by an uncommitted data traffic flow, the method comprising:
increasing an amount of bandwidth to the data flows in proportion to weights of the data flows until one port through the network device reaches a maximum value;
freezing amounts of bandwidth allocated to data flows in the one port; and
increasing an amount of bandwidth to all remaining data flows passing through the network device in proportion to weights of the remaining data flows.

7. The method of claim 6, wherein bandwidth is allocated to the data flows in discrete time intervals.

8. The method of claim 6, further comprising:
increasing the amount of bandwidth to the remaining data flows until another port through the network device reaches a maximum value;
freezing amounts of bandwidth allocated to the data flows in the other port; and
increasing an amount of bandwidth to remaining data flows passing through the network device in proportion to weights of the remaining data flows.

9. The method of claim 6, further comprising assigning one or more of the data flows a minimum bandwidth, wherein the amount of bandwidth allocated to the one or more data flows is increased relative to the minimum bandwidth.

10. A method of allocating bandwidth to data flows passing through a network device, comprising:
allocating a predetermined amount of bandwidth to one or more of the data flows; and
distributing remaining bandwidth to remaining data flows using a weighted maximum/minimum process, wherein the weighted maximum/minimum process allocates bandwidth to the remaining data flows in proportion to a weight associated with each remaining data flow, and the weight corresponding to an amount of bandwidth needed by a data flow and being determined based on a delay and an average rate requirement for each remaining data flow.

11. The method of claim 10, wherein the weighted maximum/minimum process comprises:
increasing an amount of bandwidth to the remaining data flows in proportion to weights associated with the remaining data flows until one port through the network device reaches a maximum value.

12. The method of claim 11, wherein the weighted maximum/minimum process further comprises:
freezing amounts of bandwidth allocated to the remaining data flows in the one port; and
increasing an amount of bandwidth to still remaining data flows passing through the network device in proportion to weights of the still remaining data flows.

13. An apparatus for transferring data traffic flows through the apparatus, the apparatus comprising a memory to store executable code and a processor to execute the code to:
transfer a committed data traffic flow through the apparatus using a guaranteed bandwidth;
determine an amount of bandwidth that was used during a previous data traffic flow transfer; and
allocate bandwidth in the apparatus to uncommitted data traffic flows based on the amount of bandwidth that was used during the previous data traffic flow transfer.

14. The apparatus of claim 13, wherein allocating comprises:
determining a difference between the amount of bandwidth that was used during the previous data traffic flow transfer and an amount of available bandwidth; and
allocating the difference in bandwidth to the uncommitted data traffic flows.

15. A method of allocating bandwidth to data flows passing through a network device, comprising:
determining a character of the data flows, the character corresponding to a probability of the data flow in using the bandwidth; and
allocating bandwidth to the data flows in accordance with the character of the data flows, wherein the bandwidth is allocated to data flows according to which data flows have a highest probability of using the bandwidth.

16. The method of claim 15, wherein the character of the data flows includes peak cell rate, likelihood of bursts, and/or average cell rate.

17. A method of allocating bandwidth to data flows passing through a network device, comprising:
allocating the bandwidth using a weighted maximum/minimum process, wherein the weighted maximum/minimum process allocates bandwidth to uncommitted data traffic flows in proportion to a weight associated with each uncommitted data traffic flow, and the weight corresponding to an amount of bandwidth needed by the uncommitted data traffic flow and being determined based on a delay and an average rate requirement for each uncommitted data traffic flow.

18. The method of claim 17, wherein the bandwidth is allocated in discrete time intervals.

19. The method of claim 17, wherein allocating the bandwidth according to the weights comprises:
increasing an amount of bandwidth allocated to each data flow in proportion to a weight assigned to the data flow; and
freezing an amount of bandwidth allocated to a data flow when either (i) an input port or an output port of the network device reaches a maximum utilization, or (ii) the data flow reaches a maximum bandwidth.

20. The method of claim 19, further comprising:
increasing an amount of bandwidth to remaining data flows passing through the network device until either
(i) another input port or output port of the network device reaches a maximum utilization, or
(ii) one of the remaining data flows reaches a maximum bandwidth;
freezing an amount of bandwidth allocated to the remaining data flow that has reached a maximum bandwidth or to the remaining data flow passing through an input or output port reached that has reached a maximum utilization; and
increasing the amount of bandwidth to still remaining data flows passing through the network device in proportion to weights associated with the remaining data flows.

21. The method of claim 20, wherein, after all of the data flows passing through the network device are frozen, the method further comprises:
distributing remaining bandwidth at an output port to data flows passing through the output port.

22. The method of claim 20, wherein, after all of the data flows passing through the network device are frozen, the method further comprises:
distributing remaining bandwidth at an output port to data flows passing through the output port in proportion to weights of the data flows passing through the output port.

23. The method of claim 20, wherein, after all of the data flows passing through the network device are frozen, the method further comprises:
distributing remaining bandwidth at an output port to data flows passing through the output port according to which data flows have a highest probability of using the bandwidth.

24. The method of claim 19, further comprising:
allocating a predetermined amount of bandwidth to one or more of the data flows; and distributing remaining bandwidth to non-frozen remaining data flows by:
increasing an amount of bandwidth allocated to each remaining data flow in proportion to a weight assigned to the remaining data flow; and
freezing the amount of bandwidth allocated to a remaining data flow when either (i) an input port or an output port of the network device reaches a maximum utilization, or (ii) the remaining data flow reaches a maximum bandwidth.

25. A method of allocating bandwidth to data flows through a network device, comprising:
allocating bandwidth to the data flows using a weighted maximum/minimum process, wherein the weighted maximum/minimum process allocates bandwidth to uncommitted data traffic flows in proportion to a weight associated with each uncommitted data traffic flow, and the weight corresponding to a delay and an average rate requirement for each uncommitted data traffic flow;
wherein an amount of bandwidth allocated to data flows passing through an input port of the network device is greater than an amount of data that can pass through the input port of the network device.

26. A method of allocating bandwidth to data flows passing through a network device, comprising:
allocating bandwidth to data flows passing through input ports of the network device using a weighted maximum/minimum process, wherein the weighted maximum/minimum process allocates bandwidth to uncommitted data traffic flows in proportion to a weight associated with each uncommitted data traffic flow, and the weight corresponding to a delay and an average rate requirement for each uncommitted data traffic flow.

27. The method of claim 26, wherein allocating the bandwidth comprises:
increasing bandwidth allocated to data flows passing through each input port in proportion to a weight assigned to the data flow passing through the input port; and
freezing an amount of bandwidth allocated to a data flow passing through an input port when either (i) the input port reaches a maximum utilization, or (ii) the data flow reaches a maximum bandwidth.

28. The method of claim 27, further comprising:
continuing to increase the bandwidth allocated to non-frozen data flows in proportion to weights of the data flows until an amount of bandwidth is frozen at all of the data flows.

29. The method of claim 26, wherein the bandwidth is allocated in discrete time intervals.

30. The method of claim 26, further comprising:
allocating bandwidth to committed data traffic based on a guaranteed data transfer rate.

31. The method of claim 30, wherein bandwidth is allocated to the committed data traffic in response to a request for bandwidth such that any request that is less than or equal to the guaranteed data transfer rate is granted.

32. The method of claim 30, wherein bandwidth is allocated to the committed data traffic in response to a request for bandwidth such that any request that is greater than the guaranteed data transfer rate is granted at the guaranteed rate.

33. The method of claim 26, wherein:
the bandwidth is allocated to uncommitted data traffic and, for committed data traffic, bandwidth is allocated based on a guaranteed transfer rate; and
remaining bandwidth, not allocated to the committed data traffic, is allocated to the uncommitted data traffic.

34. A method of allocating bandwidth to data flows through a network device, comprising:
allocating bandwidth to the data flows passing through output ports of the network device using a weighted max/min process, wherein the weighted maximum/minimum process allocates bandwidth to uncommitted data traffic flows in proportion to a weight associated with each uncommitted data traffic flow, and the weight corresponding to a delay and an average rate requirement for each uncommitted data traffic flow.

35. The method of claim 34, wherein allocating the bandwidth comprises:
increasing an amount of bandwidth allocated to data flows passing through each output port in proportion to a weight assigned to a data flow passing through an output port; and
freezing the amount of bandwidth allocated to the data flow passing through the output port when either (i) the output port reaches a maximum utilization, or (ii) the data flow reaches a maximum bandwidth.

36. The method of claim 35, further comprising:
continuing to increase the amount of bandwidth allocated to non-frozen data flows in proportion to weights of the data flows until the amount of bandwidth allocated to all data flows is frozen.

37. The method of claim 36, wherein maximum values assigned to each data flow are based on the bandwidth allocations.

38. The method of claim 35, wherein, after the amount of bandwidth assigned to all output ports is frozen, the method further comprises:
distributing remaining bandwidth at an output port to data flows passing through the output port.

39. The method of claim 35, wherein, after the amount of bandwidth assigned to all output ports is frozen, the method further comprises:
distributing remaining bandwidth at an output port to data flows passing through the output port in proportion to weights of the data flows.

40. The method of claim 35, wherein after all of the data flows passing through the network device are frozen, the method further comprises:
distributing remaining bandwidth at an output port to data flows passing through the output port according to which data flows have a highest probability of using the bandwidth.

41. An apparatus for allocating bandwidth to data traffic flows through the apparatus, the apparatus comprising a memory to store executable code and a processor to execute the code to:
maintain a queue size of a committed data traffic flow related to one or more committed data traffic flows for a virtual connection;
maintain a queue size of the uncommitted traffic flow queue related to one or more uncommitted data flows for the virtual connection;
allocate bandwidth to a committed data traffic flow based on a guaranteed data transfer rate and a queue size of the committed data traffic flow in the apparatus; and
allocate bandwidth to uncommitted data traffic flows using a weighted maximum/minimum process, wherein the weighted maximum/minimum process allocates bandwidth to the uncommitted data traffic flows in proportion to a weight associated with each uncommitted data traffic flow, the weight corresponding to an amount of bandwidth needed by an uncommitted data traffic flow and being determined based on a delay and an average rate requirement for each uncommitted data traffic flow.

42. The apparatus of claim 41, wherein the bandwidth is allocated to the data traffic flows in discrete time intervals.

43. The apparatus of claim 41, wherein the bandwidth comprises data cell slots.

44. The apparatus of claim 41, wherein the weighted maximum/minimum process increases bandwidth to the uncommitted data traffic flows in accordance with the weights associated with the uncommitted data traffic flows until at least one of the uncommitted data traffic flows reaches a maximum bandwidth allocation.

45. The apparatus of claim 44, wherein the weighted maximum/minimum process allocates remaining bandwidth to remaining uncommitted data traffic flows based on weights associated with the remaining uncommitted data traffic flows.

46. An apparatus for allocating bandwidth to data flows passing through the apparatus, each of the data flows having an associated weight, the weight corresponding to an amount of bandwidth needed by an uncommitted data traffic flow, the apparatus comprising a memory to store executable code and a processor to execute the code to:
increase an amount of bandwidth to the data flows in proportion to the weights of the data flows until one port through the apparatus reaches a maximum value;
freeze the amounts of bandwidth allocated to the data flows in the one port; and
increase the amount of bandwidth to all the remaining data flows passing through the apparatus in proportion to the weights of the remaining data flows.

47. The apparatus of claim 46, wherein the bandwidth is allocated to the data flows in discrete time intervals.

48. The apparatus of claim 46, wherein the memory assigns one or more of the data flows a minimum bandwidth, wherein the amount of bandwidth allocated to the one or more data flows is increased relative to the minimum bandwidth.

49. The apparatus of claim 46, wherein the memory:
increases the amount of bandwidth to the remaining data flows until another port through the apparatus reaches a maximum value;
freezes the amounts of bandwidth allocated to the data flows in the other port; and
increases the amount of bandwidth to remaining data flows passing through the apparatus in proportion to the weights of the remaining data flows.

50. An apparatus for allocating bandwidth to data flows passing through the apparatus, the apparatus comprising a memory to store executable code and a processor to execute the code to:
allocate a predetermined amount of bandwidth to one or more of the data flows; and
distribute remaining bandwidth to remaining data flows using a weighted maximum/minimum process, wherein the weighted maximum/minimum process allocates bandwidth to the remaining data flows in proportion to a weight associated with each remaining data flow, and the weight corresponding to an amount of bandwidth needed by a data traffic flow and being determined based on a delay and an average rate requirement for each uncommitted data traffic flow.

51. The apparatus of claim 50, wherein the weighted maximum/minimum process comprises:
increasing an amount of bandwidth to the remaining data flows in proportion to weights associated with the remaining data flows until one port through the apparatus reaches a maximum value.

52. The apparatus of claim 51, wherein the weighted maximum/minimum process further comprises:
freezing the amounts of bandwidth allocated to the remaining data flows in the one port; and
increasing the amount of bandwidth to still remaining data flows passing through the apparatus in proportion to weights of the still remaining data flows.

53. A apparatus for allocating bandwidth to data flows passing through the apparatus, the apparatus comprising a memory to store executable code and a processor to execute the code to:
determine a character of the data flows, the character corresponding to a probability of the data flow in using the bandwidth; and
allocate bandwidth to the data flows in accordance with the character of the data flows;
wherein the bandwidth is allocated to data flows according to which data flows have a highest probability of using the bandwidth.

54. The apparatus of claim 53, wherein the character of the data flows includes peak cell rate, likelihood of bursts, and/or average cell rate.

55. An apparatus for allocating bandwidth to data flows passing through the apparatus, the apparatus comprising a memory to store executable code and a processor to execute the code to:

allocate the bandwidth using a weighted maximum/minimum process, wherein the weighted maximum/minimum process allocates bandwidth to uncommitted data traffic flows in proportion to a weight associated with each uncommitted data traffic flow, and the weight corresponding to an amount of bandwidth needed by an uncommitted data traffic flow and being determined based on a delay and an average rate requirement for each uncommitted data traffic flow.

56. The apparatus of claim 55, wherein the weighted maximum/minimum process comprises:

assigning weights to the data flows; and allocating the bandwidth to the data flows according to the weights.

57. The apparatus of claim 56, wherein allocating the bandwidth according to the weights comprises:

increasing an amount of bandwidth allocated to each data flow in proportion to a weight assigned to the data flow; and freezing the amount of bandwidth allocated to a data flow when either
    (i) an input port or an output port of the apparatus reaches a maximum utilization, or
    (ii) the data flow reaches a maximum bandwidth.

58. The apparatus of claim 57, wherein the memory:

increases an amount of bandwidth to remaining data flows passing through the apparatus until either
    (i) another input port or output port of the apparatus reaches a maximum utilization, or
    (ii) one of the remaining data flows reaches a maximum bandwidth;

freezes an amount of bandwidth allocated to the remaining data flow that has reached a maximum bandwidth or to the remaining data flow passing through an input or output port reached that has reached a maximum utilization; and increases the amount of bandwidth to still remaining data flows passing through the apparatus in proportion to weights associated with the remaining data flows.

59. The apparatus of claim 58, wherein, after all of the data flows passing through the apparatus are frozen, the memory distributes remaining bandwidth at an output port to data flows passing through the output port.

60. The apparatus of claim 58, wherein, after all of the data flows passing through the apparatus are frozen, the memory distributes remaining bandwidth at an output port to data flows passing through the output port in proportion to weights of the data flows passing through the output port.

61. The apparatus of claim 58, wherein, after all of the data flows passing through the apparatus are frozen, the memory distributes remaining bandwidth at an output port to data flows passing through the output port according to which data flows have a highest probability of using the bandwidth.

62. The apparatus of claim 57, wherein the memory:

allocates a predetermined amount of bandwidth to one or more of the data flows; and distributes remaining bandwidth to non-frozen remaining data flows by:

increasing an amount of bandwidth allocated to each remaining data flow in proportion to a weight assigned to the remaining data flow; and freezing the amount of bandwidth allocated to a remaining data flow when either
    (i) an input port or an output port of the apparatus reaches a maximum utilization, or
    (ii) the remaining data flow reaches a maximum bandwidth.

63. The apparatus of claim 55, wherein the bandwidth is allocated in discrete time intervals.

64. An apparatus for allocating bandwidth to data flows through the apparatus, the apparatus comprising a memory to store executable code and a processor to execute the code to:

allocate bandwidth to the data flows using a weighted max/min process, wherein the weighted maximum/minimum process allocates bandwidth to uncommitted data traffic flows in proportion to a weight associated with each uncommitted data traffic flow, and the weight corresponding to a delay and an average rate requirement for each uncommitted data traffic flow;

wherein an amount of bandwidth allocated to data flows passing through an input port of the apparatus is greater than an amount of data that can pass through the input port of the apparatus.

65. An apparatus for allocating bandwidth to data flows passing through the apparatus, the apparatus comprising a memory to store executable code and a processor to execute the code to:

allocate bandwidth to data flows passing through input ports of the apparatus using a weighted maximum/minimum process, wherein the weighted maximum/minimum process allocates bandwidth to uncommitted data traffic flows in proportion to a weight associated with each uncommitted data traffic flow, and the weight corresponding to a delay and an average rate requirement for each uncommitted data traffic flow.

66. The apparatus of claim 65, wherein allocating the bandwidth comprises:

increasing bandwidth allocated to data flows passing through each input port in proportion to a weight assigned to the data flow passing through the input port; and freezing an amount of bandwidth allocated to a data flow passing through an input port when either
    (i) the input port reaches a maximum utilization, or
    (ii) the data flow reaches a maximum bandwidth.

67. The apparatus of claim 66, wherein the memory:

continues to increase the bandwidth allocated to non-frozen data flows in proportion to weights of the data flows until an amount of bandwidth is frozen at all of the data flows.

68. A method of transferring data traffic flows through a network device, comprising:

transferring a committed data traffic flow through the network device using a guaranteed bandwidth;

determining an amount of bandwidth that was used during a previous data traffic flow transfer; and allocating bandwidth in the network device to uncommitted data traffic flows based on the amount of bandwidth that was used during the previous data traffic flow transfer.

69. The method of claim 68, wherein allocating comprises:

determining a difference between the amount of bandwidth that was used during the previous data traffic flow transfer and an amount of available bandwidth; and allocating the difference in bandwidth to the uncommitted data traffic flows.

70. An apparatus for allocating bandwidth to data flows through the apparatus, the apparatus comprising a memory to store executable code and a processor to execute the code to:

allocate bandwidth to the data flows passing through output ports of the apparatus using a weighted max/min process, wherein the weighted maximum/minimum process allocates bandwidth to uncommitted data traffic flows in proportion to a weight associated with each uncommitted data traffic flow, and the weight corresponding to a delay and an average rate requirement for each uncommitted data traffic flow.

71. The apparatus of claim 70, wherein allocating the bandwidth comprises:

increasing an amount of bandwidth allocated to data flows passing through each output port in proportion to a weight assigned to a data flow passing through an output port; and freezing the amount of bandwidth allocated to the data flow passing through the output port when either
   (i) the output port reaches a maximum utilization, or
   (ii) the data flow reaches a maximum bandwidth.

72. The apparatus of claim 71, wherein the memory:

continues to increase the amount of bandwidth allocated to non-frozen data flows in proportion to weights of the data flows until the amount of bandwidth allocated to all data flows is frozen.

73. The apparatus of claim 72, wherein maximum values assigned to each data flow are based on the bandwidth allocations.

74. The apparatus of claim 71, wherein, after the amount of bandwidth assigned to all output ports is frozen, the apparatus distributes remaining bandwidth at an output port to data flows passing through the output port.

75. The apparatus of claim 71, wherein, after the amount of bandwidth assigned to all output ports is frozen, the apparatus distributes remaining bandwidth at an output port to data flows passing through the output port in proportion to weights of the data flows.

76. The apparatus of claim 71, wherein after all of the data flows passing through the apparatus are frozen, the apparatus distributes remaining bandwidth at an output port to data flows passing through the output port according to which data flows have a highest probability of using the bandwidth.

77. The apparatus of claim 76, wherein the bandwidth is allocated in discrete time intervals.

78. The apparatus of claim 70, wherein the memory:

allocates bandwidth to committed data traffic based on a guaranteed data transfer rate.

79. The apparatus of claim 78, wherein bandwidth is allocated to the committed data traffic in response to a request for bandwidth such that any request that is less than or equal to the guaranteed data transfer rate is granted.

80. The apparatus of claim 70, wherein:

the bandwidth is allocated to uncommitted data traffic and, for committed data traffic, bandwidth is allocated based on a guaranteed transfer rate; and remaining bandwidth, not allocated to the committed data traffic, is allocated to the uncommitted data traffic.

81. The apparatus of claim 78, wherein bandwidth is allocated to the committed data traffic in response to a request for bandwidth such that any request that is greater than the guaranteed data transfer rate is granted at the guaranteed rate.

82. A computer program stored on a computer-readable medium for transferring data traffic flows through a network device, the computer program comprising instructions that cause a computer to:

transfer a committed data traffic flow through the network device using a guaranteed bandwidth;

determine an amount of bandwidth that was used during a previous data traffic flow transfer; and allocate bandwidth in the network device to uncommitted data traffic flows based on the amount of bandwidth that was used during the previous data traffic flow transfer.

83. A computer program stored on a computer-readable medium for allocating bandwidth to data flows through a network device, the computer program comprising instructions that cause the computer to:

allocate bandwidth to the data flows passing through output ports of the network device using a weighted max/min process, wherein the weighted maximum/minimum process allocates bandwidth to uncommitted data traffic flows in proportion to a weight associated with each uncommitted data traffic flow, and the weight corresponding to a delay and an average rate requirement for each uncommitted data traffic flow.

84. A computer program stored on a computer-readable medium for allocating bandwidth to data flows passing through a network device, the computer program comprising instructions that cause the computer to:

allocate bandwidth to data flows passing through input ports of the network device using a weighted max/min process, wherein the weighted maximum/minimum process allocates bandwidth to uncommitted data traffic flows in proportion to a weight associated with each uncommitted data traffic flow, and the weight corresponding to a delay and an average rate requirement for each uncommitted data traffic flow.

85. A computer program stored on a computer-readable medium for allocating bandwidth to data flows through a network device, the computer program comprising instructions that cause the computer to:

allocate bandwidth to the data flows using a weighted max/min process, wherein the weighted maximum/minimum process allocates bandwidth to uncommitted data traffic flows in proportion to a weight associated with each uncommitted data traffic flow, and the weight corresponding to a delay and an average rate requirement for each uncommitted data traffic flow; wherein an amount of bandwidth allocated to data flows passing through an input port of the network device is greater than an amount of data that can pass through the input port of the network device.

86. A computer program stored on a computer-readable medium for allocating bandwidth to data flows passing through a network device, the computer program comprising instructions that cause the computer to:

allocate the bandwidth using a weighted maximum/minimum process, wherein the weighted maximum/minimum process allocates bandwidth to uncommitted data traffic flows in proportion to a weight associated with each uncommitted data traffic flow, and the weight corresponding to an amount of bandwidth needed by an uncommitted data traffic flow and being determined based on a delay and an average rate requirement for each uncommitted data traffic flow.

87. The apparatus of any of claims 41, 46, 50, 53, 55, 64, 65, 70 and 13, wherein the memory comprises:

a memory which stores a computer program; and a processor which executes the computer program.

88. The apparatus of any of claims 41, 46, 50, 53, 55, 64, 65, 70 and 13, wherein the memory comprises discrete hardware elements and/or programmable logic.

89. A computer program stored on a computer-readable medium for allocating bandwidth to data traffic flows for transfer through a network device, the computer program comprising instructions that cause a computer to:
  maintain a queue size of a committed data traffic flow related to one or more committed data traffic flows for a virtual connection;
  maintain a queue size of the uncommitted traffic flow queue related to one or more uncommitted data flows for the virtual connection;
  allocate bandwidth to a committed data traffic flow based on a guaranteed data transfer rate and a queue size of the committed data traffic flow in the network device; and
  allocate bandwidth to uncommitted data traffic flows using a weighted maximum/minimum process, wherein the weighted maximum/minimum process allocates bandwidth to the uncommitted data traffic flows in proportion to a weight associated with each uncommitted data traffic flow, and the weight corresponding to an amount of bandwidth needed by the uncommitted data traffic flow and determined based on a delay and an average rate requirement for each uncommitted data traffic flow.

90. A computer program stored on a computer-readable medium for allocating bandwidth to data flows passing through a network device, each of the data flows having an associated weight, the weight corresponding to an amount of bandwidth needed by an uncommitted data traffic flow, the computer program comprising instructions that cause a computer to:
  increase an amount of bandwidth to the data flows in proportion to the weights of the data flows until one port through the network device reaches a maximum value;
  freeze the amounts of bandwidth allocated to the data flows in the one port; and
  increase the amount of bandwidth to all the remaining data flows passing through the network device in proportion to the weights of the remaining data flows.

91. A computer program stored on a computer-readable medium for allocating bandwidth to data flows passing through a network device, the computer program comprising instructions that cause the computer to:
  allocate a predetermined amount of bandwidth to one or more of the data flows; and
  distribute remaining bandwidth to remaining data flows using a weighted maximum/minimum process, wherein the weighted maximum/minimum process allocates bandwidth to the remaining data flows in proportion to a weight associated with each remaining data flow, and the weight corresponding to an amount of bandwidth needed by a data traffic flow and being determined based on a delay and an average rate requirement for each uncommitted data traffic flow.

92. A computer program stored on a computer-readable medium for allocating bandwidth to data flows passing through a network device, the computer program comprising instructions that cause the computer to:
  determine a character of the data flows, the character corresponding to a probability of the data flow in using the bandwidth; and
  allocate bandwidth to the data flows in accordance with the character of the data flows;
wherein the bandwidth is allocated to data flows according to which data flows have a highest probability of using the bandwidth.

* * * * *